US012779685B2

(12) United States Patent
Olle et al.

(10) Patent No.: US 12,779,685 B2
(45) Date of Patent: Nov. 3, 2026

(54) SYSTEM AND METHOD FOR OPERATING A ROBOT TO PERFORM TASKS WITHIN A WORKSPACE WITH SAFETY PROTOCOLS

(71) Applicant: Robot on Rails, Inc., Boston, MA (US)

(72) Inventors: Chase R. Olle, Boston, MA (US); Nitin Mahadeo, Boston, MA (US)

(73) Assignee: Robot on Rails, Inc., Boston, MA (US)

( * ) Notice: Subject to any disclaimer, the term of this patent is extended or adjusted under 35 U.S.C. 154(b) by 0 days.

(21) Appl. No.: 19/319,465

(22) Filed: Sep. 4, 2025

(65) Prior Publication Data

US 2026/0151915 A1 Jun. 4, 2026

Related U.S. Application Data

(60) Provisional application No. 63/760,544, filed on Feb. 19, 2025, provisional application No. 63/690,705, filed on Sep. 4, 2024.

(51) Int. Cl.
*B25J 9/16* (2006.01)

(52) U.S. Cl.
CPC ........... *B25J 9/1661* (2013.01); *B25J 9/1697* (2013.01)

(58) Field of Classification Search
CPC ....... B25J 9/1674; B25J 9/1676; B25J 9/1697
See application file for complete search history.

(56) References Cited

U.S. PATENT DOCUMENTS 2,656,753 A * 10/1953 Montgomery ........... B23Q 5/52 82/137
10,956,739 B2 * 3/2021 Thomasson ............ B25J 9/1671
11,040,450 B2 * 6/2021 Vu .......................... B25J 9/1694
12,205,188 B2 * 1/2025 Chavez ................. G06T 1/0014
12,643,237 B2 * 6/2026 Vu .......................... B25J 9/1694
2010/0152895 A1 6/2010 Dai
2011/0010009 A1 1/2011 Saito
2011/0050878 A1 3/2011 Wells et al.
2012/0072023 A1 3/2012 Ota
2013/0346348 A1 * 12/2013 Buehler ............... G05B 19/423 901/31

(Continued)

FOREIGN PATENT DOCUMENTS

CN 120313654 A * 7/2025 ............... G06N 3/04
WO 2026055377 A1 3/2026

OTHER PUBLICATIONS

Machine translation of CN-120313654-A.*

(Continued)

*Primary Examiner* — Robert T Nguyen
(74) *Attorney, Agent, or Firm* — Greenberg Traurig, LLP

(57) ABSTRACT

Techniques are provided for operating a robot to perform tasks within a workspace that allow components to be freely placed within the workspace. The techniques allow for the components to be placed at any desired location within a workspace. For instance, laboratory components can be placed anywhere on a laboratory bench, and tasks involving those components may be automatically performed irrespective of which components are present, and irrespective of their positions. Moreover, the process of instructing a robot to perform these tasks does not require programming, as the system may identify tasks available for that component and allow a user to choose from these tasks. A robot may then perform the selected task(s).

27 Claims, 26 Drawing Sheets

(56) References Cited

U.S. PATENT DOCUMENTS

| | | | | |
|---|---|---|---|---|
| 2014/0067121 | A1* | 3/2014 | Brooks | B25J 9/1676 700/255 |
| 2020/0122331 | A1* | 4/2020 | Jules | B25J 9/1682 |
| 2020/0364639 | A1 | 11/2020 | Vadayadiyil Raveendran et al. | |
| 2021/0187728 | A1* | 6/2021 | Holmes | B25J 9/0096 |
| 2021/0205984 | A1 | 7/2021 | Hafner | |
| 2021/0220997 | A1 | 7/2021 | Unno et al. | |
| 2023/0249345 | A1 | 8/2023 | Sivanath et al. | |
| 2023/0372050 | A1* | 11/2023 | Blondel | A61B 34/20 |
| 2023/0415363 | A1* | 12/2023 | Nakada | B25J 9/1697 |
| 2024/0165806 | A1* | 5/2024 | Denenberg | B25J 9/1671 |
| 2024/0189996 | A1 | 6/2024 | Lu | |
| 2025/0091211 | A1* | 3/2025 | Franke | B25J 5/00 |
| 2026/0077505 | A1* | 3/2026 | Gruenstein | B25J 9/1661 |
| 2026/0115911 | A1 | 4/2026 | Olle et al. | |

OTHER PUBLICATIONS

International Search Report and Written Opinion in PCT International Application PCT/US2025/044927 mailed Jan. 29, 2026.

* cited by examiner

SYSTEM AND METHOD FOR OPERATING A ROBOT TO PERFORM TASKS WITHIN A WORKSPACE WITH SAFETY PROTOCOLS

CROSS-REFERENCE TO RELATED APPLICATIONS

The present application claims the benefit under 35 U.S.C. § 119(e) of U.S. Provisional Patent Application No. 63/690,705, filed Sep. 4, 2024, titled "SYSTEM AND METHOD FOR OPERATING A ROBOT TO PERFORM TASKS WITHIN A WORKSPACE," and claims the benefit under 35 U.S.C. § 119(e) of U.S. Provisional Patent Application No. 63/760,544, filed Feb. 19, 2025, titled "SYSTEM AND METHOD FOR OPERATING A ROBOT TO PERFORM TASKS WITHIN A WORKSPACE," each of which is hereby incorporated by reference in its entirety.

BACKGROUND

The automation of tasks using robots is performed in numerous types of workspaces to enhance efficiency, precision and productivity. Robots may be used to manipulate small objects quickly and accurately, and are often employed to perform repeated tasks. One field in which robots are employed in this way is in laboratory automation. For example, genomics or cell biology labs may operate robots to automatically sort samples, dispense reagents, or operate a centrifuge.

SUMMARY

According to some aspects, the techniques described herein relate to a method including: by at least one processor: determining, based on image data depicting a workspace, that a first component arranged in the workspace is a first type of component; identifying one or more tasks associated with the first type of component; displaying at least part of the image data in a graphical user interface; receiving user input, via the graphical user interface, indicative of a first task of the one or more tasks associated with the first type of component; and generating a sequence of instructions based on the image data that, when executed by a robot, performs the first task.

According to some aspects, the techniques described herein relate to a system including: one or more imaging devices arranged above a workspace and configured to produce image data of the workspace; a display device; a user input device; a robot; and at least one processor configured to: determine, based on the image data produced by the one or more imaging devices, that a first component depicted in the image data is a first type of component; identify one or more tasks associated with the first type of component; display, via the display device, at least part of the image data; receive, via the user input device, input indicative of a first task of the one or more tasks associated with the first type of component; and control the robot, based on the image data, to perform the first task.

According to some aspects, the techniques described herein relate to a system including: one or more imaging devices arranged to produce image data of at least a workspace and an area proximate to the workspace; a robot arranged at least partially within the workspace; and at least one processor configured to: determine whether or not a human is present within the workspace based on the image data produced by the one or more imaging devices; when it is determined that no human is present within the workspace, control the robot, based on the image data, in a full operation mode; and when it is determined that the human is present within the workspace, control the robot, based on the image data, in a first reduced operation mode.

According to some aspects, the techniques described herein relate to a method including: by at least one processor: determining whether or not a human is present within a workspace based on image data depicting at least a workspace and an area proximate to the workspace; in response to determining that no human is present within the workspace, generating a first sequence of instructions based on the image data that, when executed by a robot, performs a first task within the workspace in a full operation mode; and in response to determining that the human is present within the workspace, generating a second sequence of instructions based on the image data that, when executed by the robot, performs the first task within the workspace in a first reduced operation mode.

According to some aspects, the techniques described herein relate to a method including: by at least one processor: generating image data depicting at least part of an automated laboratory using a plurality of imaging devices; obtaining a semantic request describing one or more tasks to be performed within the automated laboratory; and generating, based at least in part on the image data and information indicating available resources within the automated laboratory, a plurality of instructions that, when executed by one or more robots, causes the one or more robots to perform the one or more tasks.

According to some aspects, the techniques described herein relate to a system including: a plurality of imaging devices each arranged to produce image data depicting respective parts of an automated laboratory including a plurality of workspaces; a plurality of robots; and at least one processor configured to: obtain a semantic request describing one or more tasks to be performed within the automated laboratory; and control one or more robots of the plurality of robots to perform the one or more tasks based at least in part on the image data produced by the plurality of imaging devices and information indicating available resources within the automated laboratory.

According to some aspects, the techniques described herein relate to a method including: by at least one processor: determining that a first component arranged in a workspace is a first type of component based on image data depicting at least the workspace and a cart including a plurality of storage locations; selecting a first storage location associated with the first type of component from the plurality of storage locations on the cart; and generating a sequence of instructions based on the image data that, when executed by a robot, causes the robot to move at least part of the first component from the workspace to the first storage location on the cart.

According to some aspects, the techniques described herein relate to a method including: by at least one processor: generating a first sequence of instructions that, when executed by a robotic cart, maneuvers the robotic cart to a workspace while carrying a first component; selecting a destination location within the workspace associated with a component type of the first component; and generating, based on image data at least in part depicting the workspace and the robotic cart, a second sequence of instructions that, when executed by a robot, causes the robot to move the first component from the robotic cart to the destination location within the workspace.

According to some aspects, the techniques described herein relate to a system including: one or more imaging devices arranged to produce image data of at least a workspace and an area proximate to the workspace; a first robot; a robotic cart including a plurality of storage locations; and at least one processor configured to: determine, based on the image data produced by the one or more imaging devices, that a first component depicted in the image data within the workspace is a first type of component; select a first storage location associated with the first type of component from the plurality of storage locations on the robotic cart; and control the first robot, based on the image data, to move at least part of the first component from the workspace to the first storage location on the robotic cart.

According to some aspects, the techniques described herein relate to a system including: one or more imaging devices arranged to produce image data of at least a workspace and an area proximate to the workspace; a first robot; a robotic cart including a plurality of storage locations; and at least one processor configured to: maneuver the robotic cart to the workspace while carrying a first component; selecting, based on the image data at least in part depicting the workspace and the robotic cart, a destination location within the workspace associated with a component type of the first component; and generating a second sequence of instructions based on the image data that, when executed by a robot, causes the robot to move the first component from the robotic cart to the destination location within the workspace.

According to some aspects, the techniques described herein relate to at least one computer-readable medium including instructions that, when executed by at least one processor, perform a method including: determining, based on image data depicting a workspace, that a first component arranged in the workspace is a first type of component; identifying one or more tasks associated with the first type of component; displaying at least part of the image data in a graphical user interface; receiving user input, via the graphical user interface, indicative of a first task of the one or more tasks associated with the first type of component; and generating a sequence of instructions based on the image data that, when executed by a robot, performs the first task.

According to some aspects, the techniques described herein relate to at least one computer-readable medium including instructions that, when executed by at least one processor, perform a method including: determining whether or not a human is present within a workspace based on image data depicting at least a workspace and an area proximate to the workspace; in response to determining that no human is present within the workspace, generating a first sequence of instructions based on the image data that, when executed by a robot, performs a first task within the workspace in a full operation mode; and in response to determining that the human is present within the workspace, generating a second sequence of instructions based on the image data that, when executed by the robot, performs the first task within the workspace in a first reduced operation mode.

The foregoing apparatus and method embodiments may be implemented with any suitable combination of aspects, features, and acts described above or in further detail below. These and other aspects, embodiments, and features of the present teachings can be more fully understood from the following description in conjunction with the accompanying drawings.

BRIEF DESCRIPTION OF DRAWINGS

Various aspects and embodiments will be described with reference to the following figures. It should be appreciated that the figures are not necessarily drawn to scale. In the drawings, each identical or nearly identical component that is illustrated in various figures is represented by a like numeral. For purposes of clarity, not every component may be labeled in every drawing.

DETAILED DESCRIPTION

Figure 1:
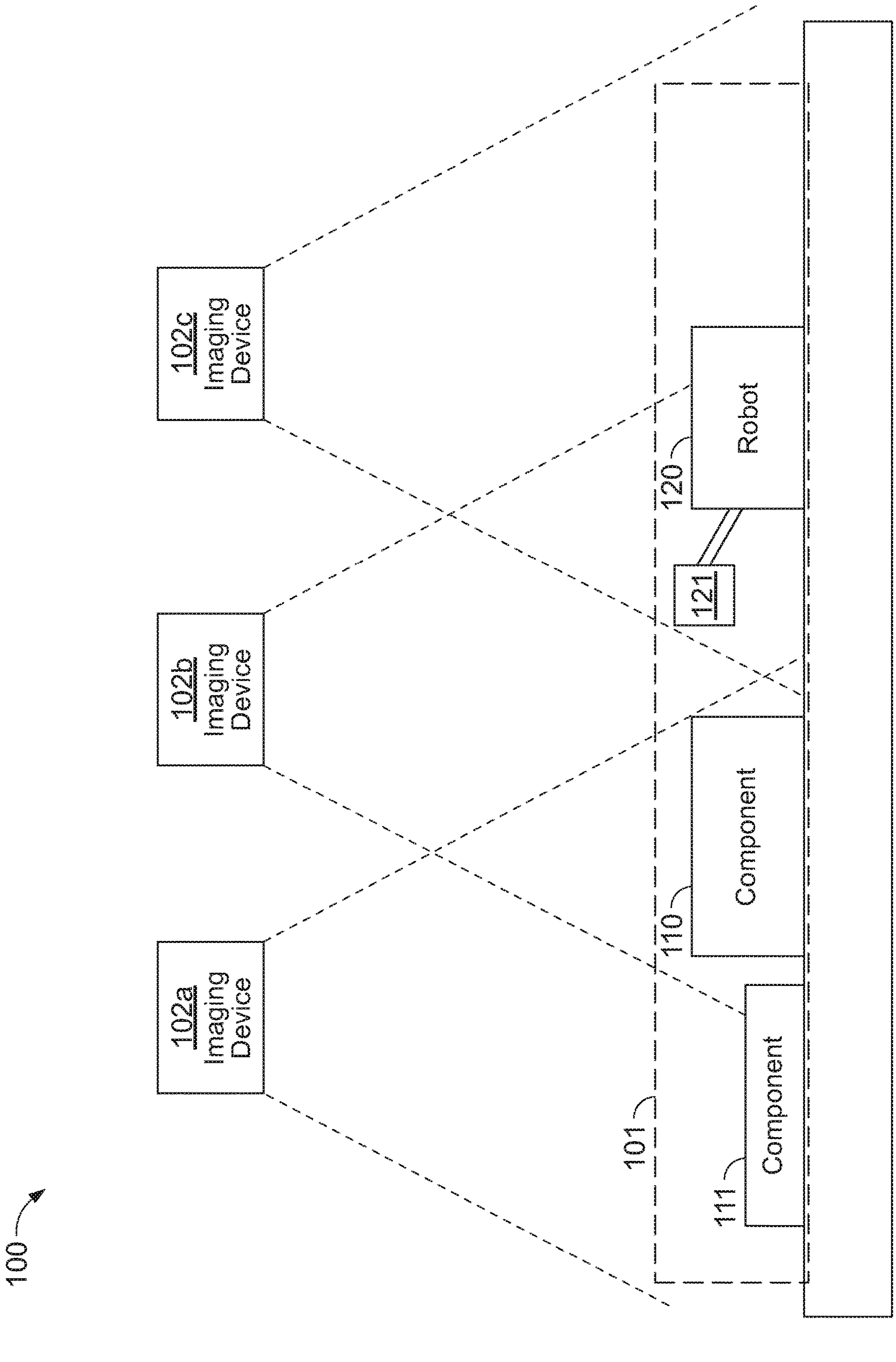
FIG. 1 depicts an illustrative system suitable for practicing aspects of the technology described herein, according to some embodiments.

As described above, robots are often operated to perform tasks within a workspace, such as in laboratory automation.

Typically such workspaces are set up with components in fixed or otherwise known locations so that a robot can navigate between various components to perform tasks. For example, a laboratory automation system may comprise a box in which a robot is arranged with standardized plates that each represent a particular component, such as a well plate or a bottle. The locations of these components are fixed within the box so that a robot knows where elements such as pipettes or wells are located when it performs tasks involving those elements. Typically, these automation systems also require users to define tasks manually through programming tools.

The inventor has recognized and appreciated techniques for operating a robot to perform tasks within a workspace, which allow components to be freely placed within the workspace. Unlike approaches in which components are arranged at known locations, the techniques described herein allow for the components to be placed at any desired location within a workspace. For instance, laboratory components can be placed anywhere on a laboratory bench, and tasks involving those components may be automatically performed irrespective of which components are present, and irrespective of their positions. Moreover, the techniques also allow a user to instruct a robot to perform tasks without complex programming, since the system may identify tasks available for a given component and allow a user to select one of these tasks to be perform. A robot may then perform the selected task(s) according to the user's instructions.

According to some embodiments, an imaging system may be arranged above a workspace and image data captured by the imaging system may be analyzed to identify the types of components in the workspace. A system may access a library of components and determine the types of tasks that may be performed with an identified component. The system may also present a user with an interface that allows the user to select one of these tasks to be performed by a robot that interacts with the component. In some embodiments, the library of components may provide geometrical information on a type of component so that a robot can be directed to a desired location on the component without that location necessarily being clearly visible to the imaging system. In this manner, guidance of the robot to perform tasks in the workspace is constructed from the image data captured by the imaging system and a library of component data, rather than by relying on fixed locations of components.

In some embodiments, guidance of the robot to perform tasks in the workspace may be modified based on whether a user (or other non-robot entity) is detected in proximity to the robot, and thereby operating the robot safely in a workspace when the workspace is cohabitated by the robot and a user. For instance, when a user is not detected in the workspace, the robot may be instructed to operate in a full operation mode. When a user is detected in the workspace, however, the robot may be instructed to operate in a reduced operation mode. In some embodiments, one of multiple reduced operation modes may be selected based on the proximity of the robot to the user. For instance, the robot may be instructed to operate in a first reduced operation mode when the user is detected but not within a proximate threshold of the robot, and to operate in a second, further reduced operation mode when the user is detected to be within the proximate threshold of the robot. Any number of such degrees of proximity may be considered when selecting a suitable operating mode of the robot for safety. A reduced operation mode of a robot as referred to herein, refers to a mode of operation in which the robot's motion is inhibited in some manner.

In some embodiments, the system may analyze image data captured by the imaging system to identify the position of the one or more users in the workspace. The system may also determine the position of one or more robots in the workspace by analyzing image data generated by the imaging system and/or from odometry data or other positional data provided by the robot. The system may assign envelopes around each user, and around each robot, which represent regions around each entity that represent safety margins. The system may determine whether the envelope of a user and the envelope of a robot overlap, and may selected a reduced operation mode (or full operation mode) based on whether the envelopes overlap or not.

In some embodiments, a system may be configured to control an automated laboratory according to the techniques for operating robots to perform tasks based on image data described herein. In particular, a number of workspaces and robots may be arranged within an automated laboratory and controlled according to these techniques to perform tasks. In some embodiments, the robots may include one or more robotic carts that may be maneuvered (e.g., driven) between workspaces to transport laboratory components from one workspace to another, or from a storage location to a workspace (or vice versa). The automated laboratory may comprise a plurality of imaging devices arranged around the laboratory and configured to capture image data of respective regions of the laboratory. By applying the techniques for operating robots to perform tasks based on image data described herein, the locations of robots and components within the laboratory may be tracked.

In some embodiments, the availability of resources within an automated laboratory may be tracked based on image data, and accessed when controlling one or more robots to perform a task in the laboratory. Some systems may expect items to be in certain locations when seeking to pick up that item, but the techniques described herein are instead based on image data, which allows for objects (e.g., robots, carts, components, etc.) to be in arbitrary locations while providing for real-time tracking of the objects in the laboratory space. In addition, this type of tracking allows for each individual object to be tracked, which may be important to comply with current good manufacturing practices (cGMP) for laboratory experiments. For example, each test tube with the laboratory may be individually tracked over time using image data captured over time, with a given test tube being associated with a unique identifier that distinguishes it from other test tubes identified in the image data. In some embodiments, operations and transfers of objects in the laboratory may be logged in a chain-of-custody ledger, which may be cryptographically signed to ensure reliability.

In some embodiments, instructions to perform one or more tasks (e.g., in a workspace and/or in an automated laboratory) may be provided as natural language (NL) input. A system may translate that NL input into a structured task list, also referred to herein as a semantic request, or a collection of semantic tasks. The semantic tasks may be a list of tasks that are understood by the system, and which can be used to generate instructions to control one or more robots to perform said tasks. In some embodiments, the system may further translate the semantic tasks into a set of "atomic" steps, which dictate how the semantic tasks will be carried out by the system, based on information describing the resources available to the system. For instance, a user input may be "screen Vector X across N cell lines," and the system may generate a plurality of semantic tasks that will fulfill this request. For example, the semantic tasks may include "wash plate with 50 uL EtOH" and "heat sample to 45° C.

for 60 s." The system may then obtain data indicating the resources available and determine a set of atomic steps that will perform these tasks with the resources available. In general, there may be multiple ways to perform a set of semantic tasks; that is, different sets of atomic steps may be generated from the same semantic tasks, depending on what resources are available to the system at the time, and/or which process is expected to be the most efficient. For example, an automated laboratory may comprise pipettes at different workspaces, and a system controlling the automated laboratory may determine which workspace is preferable to wash a plate based on where the plate is located, its distance to the different workspaces, and/or the availability of a robotic cart to transport the plate to another workspace, etc.

In some embodiments, transfers of components between a robotic cart and a workspace, or vice versa, in an automated laboratory may be performed by the system controlling the automated laboratory based on image data captured of the cart and the workspace. A component arranged in the workspace, or on the cart, may be identified through image data as described herein, and the system may control a robot to make a transfer of the component based on the image data. In some cases, the component may be arranged within a vessel (e.g., a refrigerator, an oven) at the time of the transfer, though image data previously captured of the component may nonetheless indicate to the system how to generate instructions for a robot to transfer the component from that location. In some embodiments, the system may perform a transfer by controlling one robot to open and close a vessel while another robot picks up a component within the vessel. In some embodiments, a robotic cart may comprise a robotic arm that is controlled during a transfer to move a component from the cart to a workspace or vice versa.

In some embodiments, a transfer of a component between a robotic cart and a workspace, or vice versa, in an automated laboratory may be performed by the system controlling the automated laboratory by identifying the type of the component and selecting a destination for the component based on the identified type. For instance, a robotic cart may comprise a plurality of storage locations (e.g., a test tube rack, a heating block, a water bath, a refrigerator, etc.) and the system may control one or more robots to transfer a component from a workspace to one of the plurality of storage locations based at least in part on the type identified type of component. As one example, the system may, when instructed to transfer a cryovial from a workspace to a robotic cart, control one or more robots to transfer the cryovial from the workspace to a refrigerator on the robotic cart. The system need not be explicitly instructed to perform such a movement, as an atomic step as general as "transfer cryovial X to cart Y" may be translated by the system into specific instructions for one or more robots to move the cryovial from its present location (as identified at least in part from image data) to a refrigerator on the cart (as also identified at least in part from image data).

FIG. 1 depicts an illustrative system suitable for practicing aspects of the technology described herein, according to some embodiments. In the example of FIG. 1, system 100 includes a workspace 101 and imaging devices 102*a*, 102*b* and 102*c*, which are each arranged over the workspace and directed so that at least part of the workspace is in each imaging device's field of view. When images produced by imaging devices 102*a*, 102*b* and 102*c* are taken together, an entirety of the workspace 101 may be collectively imaged. In the example of FIG. 1, the field of view of each of the imaging devices is depicted with dotted lines. System 100 also includes workspace components 110 and 111, in addition to robot 120 which includes an end effector 121. Although the robot 120 is depicted in FIG. 1 as being entirely within the workspace, this is not a requirement so long as the robot is able to manipulate components within the workspace. A workspace, as referred to herein, refers to a three-dimensional region of space in which tasks are to be performed, and typically includes a surface (e.g., workbench) on which components may rest.

As described further below, the imaging devices 102*a*, 102*b* and 102*c* may include various types of imaging devices, including color cameras, depth cameras and/or motion-detection cameras, and may thereby in some cases produce multiple types of image data (e.g., stereoscopic views, depth measurements, color images, video, still frames, etc.). Imaging devices 102*a*, 102*b* and 102*c* may be configured in any of the ways described below in relation to imaging device(s) 402 in FIGS. 4 and 5.

In operation, a computing system (not shown in FIG. 1) may receive image data from the imaging device 102*a*, 102*b* and 102*c* and identify the components 110 and/or 111 as being particular types of components using the image data. For instance, the component 111 might be recognized, based on the image data, as a well plate. The system may then generate a user interface to be displayed to a user, which allows the user to select any of a number of tasks associated with the well plate. The user can then instruct the computing system to perform this task, and as a result the system controls the robot 120 (or generates suitable data to allow another device to control the robot) to perform the selected task. For example, the robot 120 may operate its end effector 121 to aspirate liquid from the well plate and deposit the liquid into component 110.

Figure 2:
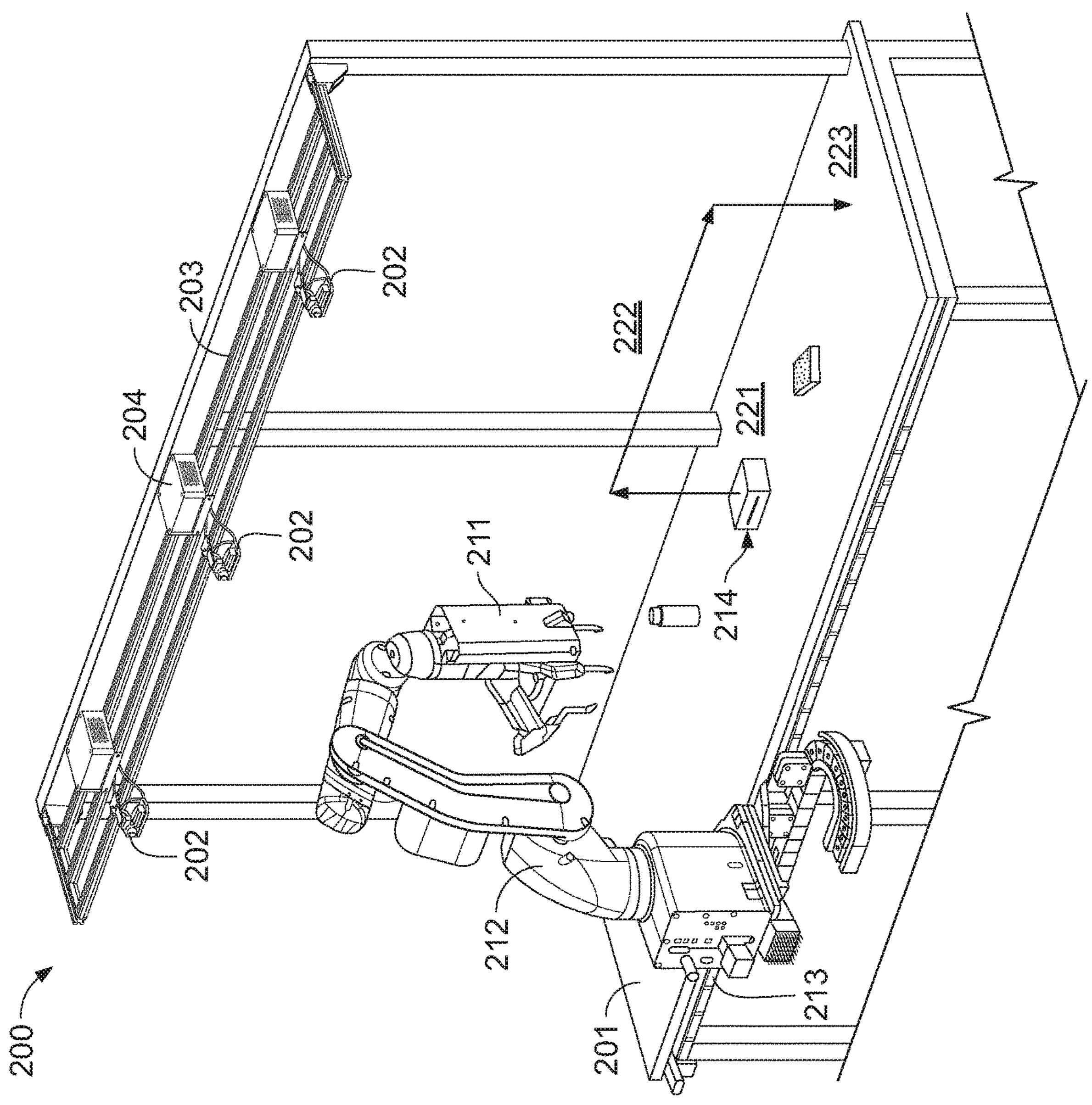
FIG. 2 depicts an illustrative workspace, according to some embodiments.

FIG. 2 depicts another illustrative workspace for purposes of explanation, according to some embodiments. In the example of FIG. 2, a workspace 200 includes workbench 201. A series of cameras (e.g., 3D cameras) 202 are arranged over the workspace and are arranged to face downward so that their combined field of view covers the workbench. In a laboratory setting, a lab bench generally includes, or is coupled to, vertical struts where shelves can be attached, and in this example those slots are repurposed to support a camera frame 203. The camera frame supports the cameras, the camera wiring, and computing devices 204 that are coupled to respective cameras 202. Each computing device may be configured to perform image analysis of image data produced by its respective camera. Cameras 202 may be configured in any of the ways described below in relation to imaging device(s) 402 in FIGS. 4 and 5.

In the example of FIG. 2, the system may include additional computing resources not shown, such as a system controller, robot controller and/or device for generating a user interface. Data may be communicated between any of these computing resources, and the computing devices 204, via any combination of wired and/or wireless connections.

Based on image data produced by the cameras 202, the system may identify components such as tray 214, and may obtain information on the tray from a component library. The system may further present a graphical user interface (which may include a view of the workbench generated from cameras 202) to a user, who may interact with the components on the workbench to initiate actions by the robot 212, which is arranged on rail 213 and includes a robotic hand 211. For instance, the user may initiate an action of moving the tray 214 to a new location. In this instance, the system may generate a motion path for the robot to complete the task, which in this example may include motion of the robot along the rail and/or motion of the robotic hand. For example, the robot may move along the rail to the tray's starting location, move the arm to the tray and grab the tray at location 221. The robot may then lift the hand and move along the rail so that the tray follows the path 222. The hand may be lowered and the tray placed on the workbench at location 223.

Figure 3:
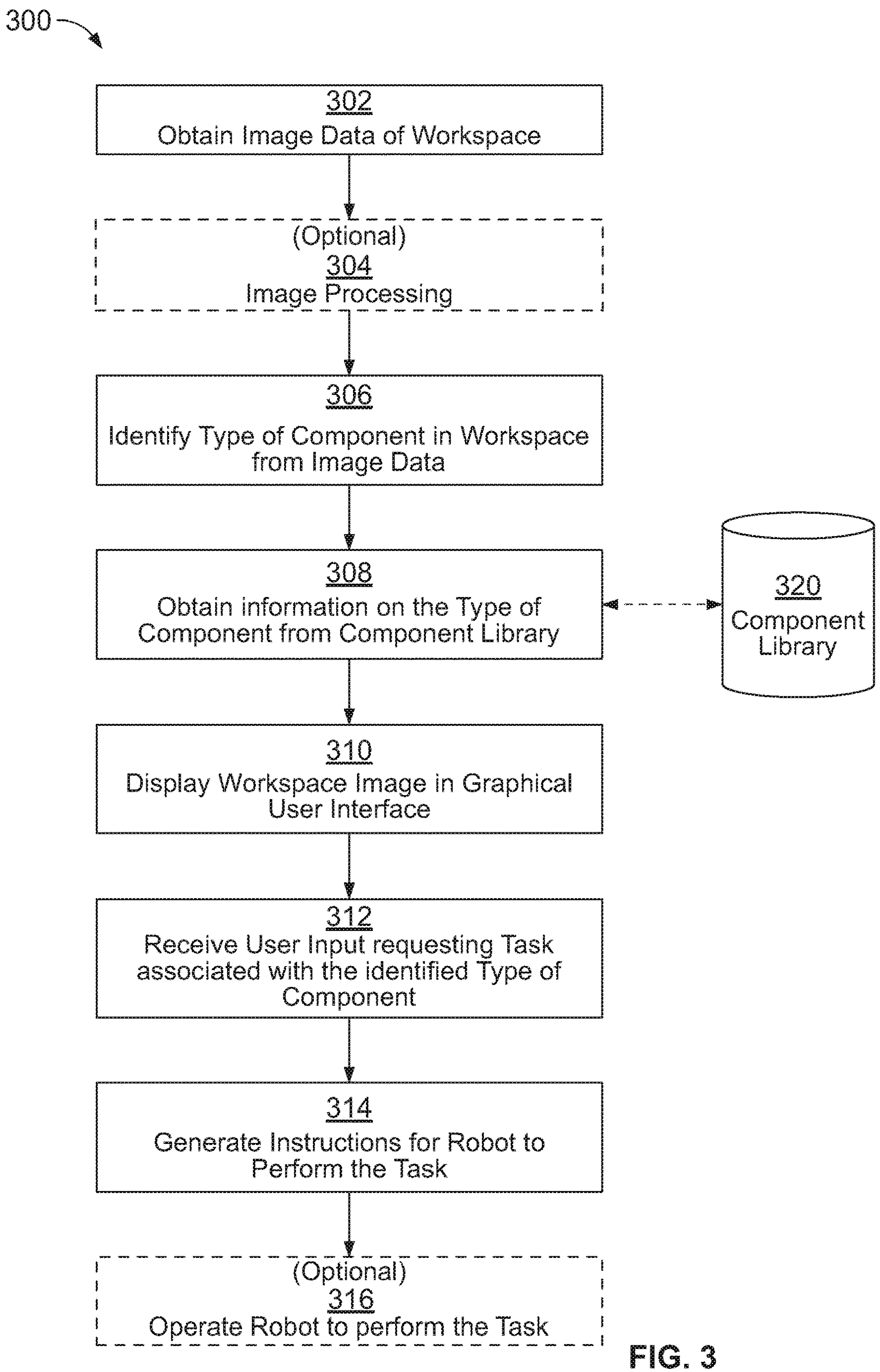
FIG. 3 is a flowchart of a method of generating instructions for a robot to perform a task within a workspace, according to some embodiments.

FIG. 3 is a flowchart of a method of generating instructions for a robot to perform a task within a workspace, according to some embodiments. Method 300 may be performed by a system comprising one or more processors that performs the acts of the method through any combination of software and/or hardware. In the example of FIG. 3, the system performing method 300 is communicatively coupled to: one or more imaging devices arranged to view a workspace, a component library 320, and one or more robots that are arranged to perform tasks in the workspace.

Method 300 includes act 302 in which image data of a workspace is obtained by the system performing method 300. Act 302 may comprise operating one or more imaging devices to produce image data, receiving image data from one or more imaging devices, and/or accessing stored image data previously produced by one or more imaging devices.

Irrespective of how it is received by the system performing method 300, the image data may take various forms and may include any number of different types of image data. For instance, the image data obtained in act 302 may include any one or more of: color or grayscale images (e.g., an RGB pixel array, a lossless image format such as PNG, a lossy image format such as JPG), color or grayscale video frames (e.g., a series of RGB pixel arrays, a lossless video format such as RAW or H.265, a lossy video format such as MPEG), depth images (e.g., an array of depth values associated with various points on co-generated images or video frames), stereoscopic images, motion data (e.g., images of bounding boxes of detected motion), or other suitable types of image data. Where multiple such types of image data are generated by an imaging device, the different types of image data may have the same or different resolutions.

Optionally, the image data may be processed via one or more image processing operations in act 304, either prior to or after the system performing method 300 obtaining the image data in act 302 (although in the example of FIG. 3 this act is shown following act 302, purely as an example). Such image processing operations may be performed by the system performing method 300 and/or by one or more processors coupled to the imaging device(s), such as one or more on-board processors. Further details of illustrative image processing operations are described below in relation to FIG. 5, and may include stitching together images produced by multiple imaging devices to produce a single image of the workspace, blurring or filtering one or more images or frames, detecting changes and/or movement between images or frames, detecting contours of regions of motion, or combinations thereof.

In act 306, the system performing method 300 identifies a type of at least one component in the workspace based on the image data obtained in act 302. Any number of components may be identified in this act, and identifying a component may be performed based on a single image, on multiple images or frames, and/or from depth information. Suitable processes for identifying a component from the image data may include feature detection and/or supervised learning models such as single shot detection (SSD). For example, an SSD model that has been trained on a large dataset of labeled components may be applied to one or more color images, depth images and/or motion data obtained in act 302 to identify the type of a component present in the workspace, and in some cases also determine its orientation in the workspace and/or other spatial attributes. For example, an SSD model may have been trained on a large dataset of labeled laboratory equipment. Image data obtained in act 302 may be applied to this SSD model, which may for instance be able to identify a particular type of well plate in the image data, and in some cases may determine the orientation of the well plate in the workspace.

As referred to herein, a component may include, but is not limited to, a well plate, a reagent (e.g., in a bottle), a heater, a refrigerator, a pipette, a pipette tip, a beaker, a flask, a test tube, a test tube rack, a petri dish, a glass slide, a centrifuge tub, a vortex mixer, a centrifuge, a hot plate, a stirrer, a balance, a graduated cylinder, a stir bar, media culture, a hemocytometer, an enzyme, a powder, a buffer solution, a sharps container, a biohazard disposal container, a cryovial, a desiccator, or an incubator.

As referred to herein, the "type" of a component may relate to a component category, or may further relate to particular instances of a component in that category. For example, in a laboratory setting, the type of a component may simply be "well plate." However, the type of a component may more particularly be a "96-well plate," a "190 μL 96-well plate," a "1 mL 96-well plate with round wells," a "0.5 mL 96-well plate with round wells, V-shaped," and/or may refer to a part number from a particular manufacturer. In some embodiments, the type of a component may be associated with a unique identifier.

According to some embodiments, act 306 may comprise monitoring of a type of component in the workspace based on the image data obtained in act 302. For instance, once a component has been identified in act 306, subsequent instances of performing method 300 (or at least act 306) may comprise tracking the movement of the already-identified component rather than identifying the component in the exact same manner as in the first instance of act 306. Such motion analysis is described further below in relation to FIG. 5. Motion analysis may allow the system performing method 300 to track the location of a single component in the workspace, even as that component moves around the workspace (whether by the system performing actions or by a user manually moving the component).

According to some embodiments, method 300 (whether in act 306 or otherwise) may comprise determining a position of a robot in the workspace. In some embodiments, the position of a robot may be determined based on the image data obtained in act 302, such as by performing any of the above-described techniques for detecting at least one component in the workspace based on the image data (e.g., by applying feature detection and/or supervised learning models to the image data). In some embodiments, the position of a robot is determined in method 300 based on sensor data provided to the system by the robot. For example, the position of the robot can be determined, in whole or in part, from odometry data provided by the robot, through dead reckoning techniques, by inertial measurement units positioned on the robot, or through simultaneous localization and mapping (SLAM) techniques. In some embodiments, an optical or electromagnetic tracker can be coupled to the robot, and the position of the robot can be identified with an optical or electromagnetic localization system. The position of the robot can be determined from such sensor data alone, or in addition to image data. In some embodiments, the robot may be a robotic cart, which is maneuvered through a space (e.g., a laboratory) at least in part using SLAM techniques.

In act 308, the system performing method 300 determines information on the type of component based in part on accessing data in component library 320. In some embodiments, the system may access or communicate with the component library using data determined when performing act 306, to obtain information relating to the type of component that was identified. For example, a lookup into the component library may be performed with a unique identifier associated with the type of component. Information that is determined in act 308 may be directly obtained from the component library or determined based on data obtained from the component library. In either case, the determined information may include geometric data such as dimensions (including but not limited to height, width, thickness), spatial positions and/or orientations of various features of the component (and/or geometrical data such as a 3D model, e.g., CAD file), physical properties such as the weight, or hardness or software of a component or portion of a component (which may inform how a robot is programmed to interact with the component), metadata relevant to the type of component (e.g., a number of tips in a pipette rack), or combinations thereof. In addition, the information determined in act 308 may include data describing one or more tasks that may be performed with the component. At least some of these tasks may be displayed to a user in act 310, as described below.

In act 310, the system performing method 300 generates and displays a graphical user interface (GUI). The GUI is generated to include a view of the workspace based on the image data obtained in act 302. For instance, the GUI may include a top-down color view of at least part of the workspace.

According to some embodiments, the GUI may include an image of the workspace that includes portions imaged by different imaging devices. That is, the image of the workspace may have been 'stitched' together from multiple images in the case where multiple imaging devices are included in the system (or otherwise accessible to the system).

According to some embodiments, the GUI may comprise one or more graphical overlays generated to be arranged over the image of the workspace. Such overlays include any graphical shapes, coloring, and/or text that is combined with image(s) of the workspace to provide information on the workspace to the user. In some cases, an overlay or some other type of visual indicator may provide information regarding a component in the workspace. For example, the GUI may be generated to include an image of the workspace with a label identifying (e.g., naming) a component arranged on or in proximity to the component in the image. In some cases, an overlay may highlight a component in the workspace. For example, the system may generate a GUI that includes an image of the workspace in which one or more components have an outline added to make them more visible (e.g., a color outline), and/or are shaded with a partially transparent layer of color. In some cases, an overlay may identify one or more portions of a robot present within the workspace and/or may identify a status of the robot. For example, the GUI may be generated to highlight (e.g., through shading and/or an outline) portions of the robot and/or to note the status of the robot (e.g., the task it is currently performing and its progress through that task).

According to some embodiments, the GUI may comprise a digital rendering of the workspace. Such a rendering may be presented in addition to, or as an alternative to, one or more graphical overlays arranged over an image as described above. Geometrical data on one or more components and/or robots may be gathered by the system and a 3D model of at least part of the workspace may be generated based on said geometrical data. A digital rendering of the workspace, which may be 2-dimensional or 3-dimensional, may then be generated by the system based on one or more generated 3D models of the workspace In act 312, the system performing method 300 receives user input (via the GUI or otherwise) requesting that a robot performs a task involving the component identified in act 306. User input may include, for instance, any one or more of: clicking on a component or other portion of the workspace in the GUI, entering text, speaking into a microphone, or combinations thereof. One example of user input is the user clicking (e.g., using a mouse) on the component in the GUI (as it is visible in the workspace) and selecting the task from a list of available tasks for that component. The list of available tasks displayed in this example may be generated by the system based on information determined in act 308 that includes data describing tasks that may be performed with the component. The GUI may then be updated to display the generated list of available tasks in response to the user input clicking on the component. Other methods for user input that requests a task associated with a component may also be envisioned.

In some cases, a list of available tasks for a given component is determined at least in part on data relating to parts of the system other than that component. For example, some tasks may only be performed when other components are present; if the system has not identified those components as being present, the list of available tasks may not include those tasks (e.g., tasks requiring pipettes may not be available if no pipettes are available in the workspace). As another example, some tasks may require particular inventory to be available to be performed (e.g., a sufficient number of pipettes). Method 300 may comprise accessing inventory data and determining whether or not such a task may be completed using the available inventory, and including it in the list of tasks from which a user may select as task only when there is sufficient inventory. Alternatively, when a task may not be completed using available inventory, the task may be included in the list of tasks from which a user may select, although presented in some way that conveys this option is currently unavailable (e.g., grayed out).

In act 314, the system performing method 300 generates instructions to perform the task requested in act 312 such that the instructions, when executed by a robot, will perform the task. In some embodiments, act 314 comprises converting the user input(s) received in act 312, or otherwise received, into standardized, machine-executable commands. Such a process may for instance be performed by executing a large language model (LLM) or other deep learning algorithm and providing the user input as input to the model/algorithm.

Figure 8:
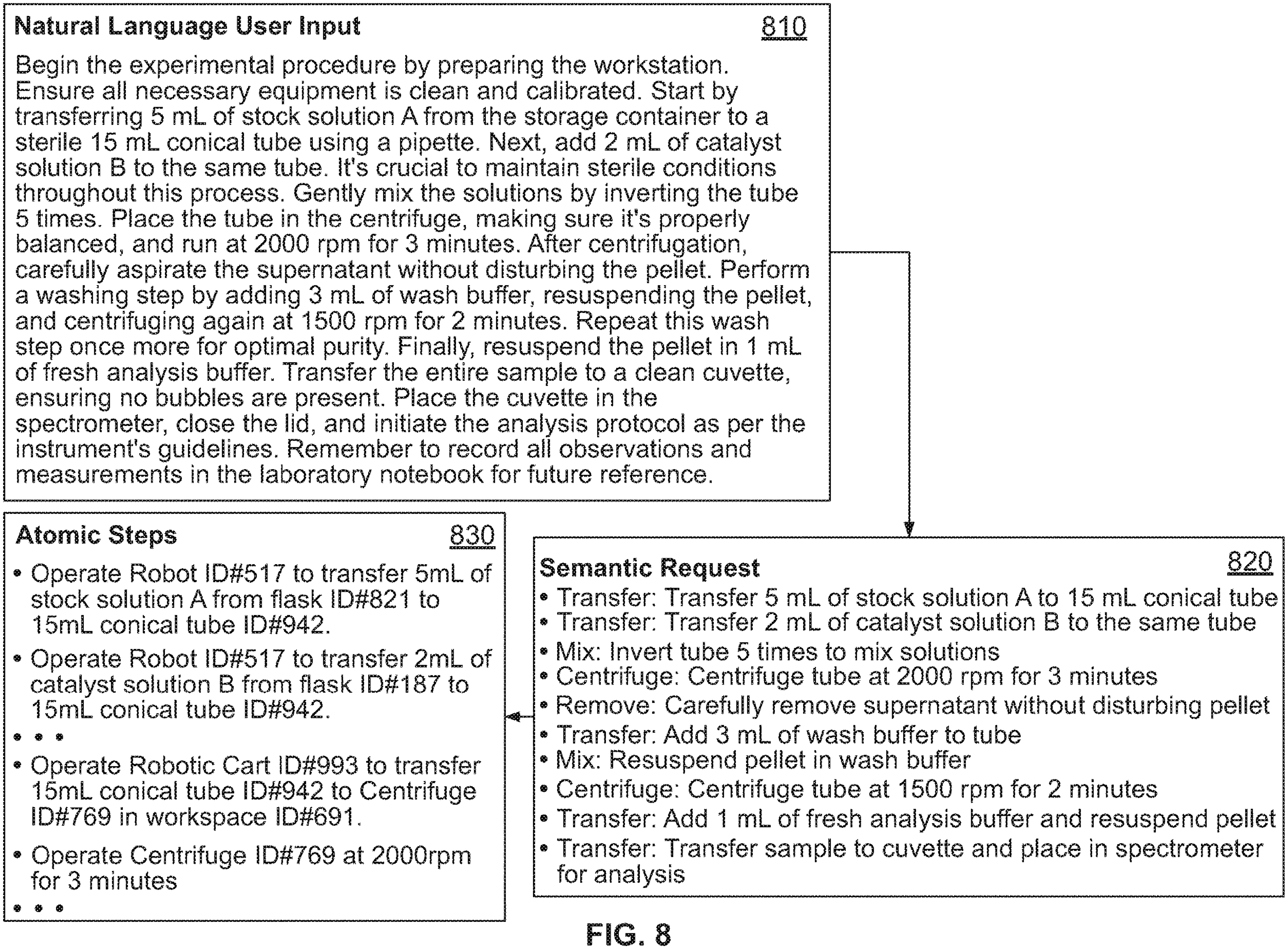
FIG. 8 depicts an example of converting natural language user input into a structural list of tasks, according to some embodiments.

In some embodiments, the user input(s) received in act 312, or otherwise received, may comprise natural language input, and act 314 may comprise translating the natural language input into instructions corresponding to tasks for one or more robots to perform. FIG. 8 depicts an example of such a process in which a natural language input provided by a user (810) is translated into a semantic request (820), also referred to herein as a collection of semantic tasks, or a structured task list. The semantic request may not be suitable for execution by one or more robots, and in some cases an additional step of converting the semantic request into a plurality of (e.g., sequence) of instructions is performed in act 314. This additional step of conversion may comprise determining how to achieve each individual task in terms of which robots and/or machines are operated, and further the way in which to operate motors and/or servos, etc. of one or more robots so that the robot performs the task in question, then generating executable instructions that, when executed by the one or more robots, cause the one or more robots to perform the task. As described above, such an additional step of conversion may comprise converting the semantic request into a set of atomic steps, which indicate how, in particular, the system will perform the given semantic request.

In the example of FIG. 8, for instance, atomic steps (830) may be generated based on semantic request 820, which indicate which specific components (e.g., flasks, tubes, machines, etc.) are utilized and/or operated, and which robots are operated, to perform the semantic request. As also described above, such a step of conversion into atomic steps may be based on data indicating resources that are available to the system (e.g., in an automated laboratory). In the illustrative example of FIG. 8, the fourth task in the semantic request of operating a centrifuge leads to the generation of an atomic step in which the conical tube is transferred by robotic cart to another workspace due to the centrifuge at the workspace where the tube was initially located being busy, or due to there being no centrifuge at that workspace. In either case, the system generating the atomic steps 830 may, based on data indicating the current availability of a centrifuge, determine that an atomic step to move the conical tube to another workspace using a robotic cart is needed to efficiently perform the semantic request.

In some embodiments, the system performing method 300 may store or otherwise have access to data representing a plurality of tasks that each represent a state change for an object. Said data may also represent tasks that do not represent a state change for an object, as well as include other, non-task, data. In some embodiments, the data representing the plurality of tasks includes data indicative of a hierarchy for the tasks, such that the tasks are each associated with a position in a hierarchical classification scheme. For instance, one level of the hierarchy may classify the different types of tasks (e.g., "transfer," mix," "centrifuge" or "remove" task types in the example of FIG. 8), whereas another part of the hierarchy may relate to more specific aspects of each of these types of tasks. In some embodiments, the hierarchical classification scheme may be configured to align with a hierarchical tokenization scheme in a large language model (LLM) or other deep learning algorithm. For example, in such a scheme the objects upon which the tasks are to be performed may be recognized as nouns, and the tasks as verbs. Accordingly, such an LLM or other deep learning algorithm may be applied to natural language user input to generate a structured task list or translate the natural language user input into some other form from which the system can generate a sequence of instructions.

In some embodiments, the system performing method 300 may, in act 314, be configured to generate a structured task list by sending a request to a suitable application programming interface (API), which may respond with the structured task list. In some embodiments, the API may access a generative AI ("Gen AI") API interface and provide a user's natural language as input, which may cause the Gen AI system to generate a structured task list based on the input. For instance, the Gen AI system may have been previously trained to generate a structured task last with the desired format based on natural language input. In some cases, an API request to a Gen AI system may comprise configuration information that the system performing method 300 adds (e.g., as a prefix) to the user's natural language input. That is, rather than the Gen AI system being trained to generate a structured task list with the desired format, the API request itself may inform the Gen AI system how to generate the output in the desired format. The configuration information may define constraints and/or rules that the Gen AI system is to follow when generating the output based on the provided input.

In some embodiments, the system performing method 300 may, in act 314, be configured to generate function calls for execution by a system comprising one or more robots (e.g., system 100 shown in FIG. 1). The function calls may be generated either directly from a natural language input, or by first generating a structured task list via any of the techniques described herein, then providing the structure task list as input to a process for generating the function calls. In either case, generating the function calls may comprise sending an API request to a system configured to generate function calls from a structured task list or from natural language input, which generates the function calls and respond to the API request with the generated function calls. In some embodiments, the system configured to generate function calls from a structured task list or from natural language input may be a Gen AI system. As with the generation of structured task lists described above, the API request to a Gen AI system may comprise configuration information that the system performing method 300 adds (e.g., as a prefix) to the API request, or the Gen AI system may have been previously trained to generate function calls based on the input. According to some embodiments, function calls generated in act 314 may be executed by a robot (e.g., robot 420 described below) and/or by a computing device controlling the robot (e.g., vision/robot hub 404, or robot hub 520, both described below). In either case, the function calls may provide instructions for an operation that the robot and/or computing device processes to generate instructions for the robot to execute. Alternatively, the function calls themselves may be the instructions generated for the robot to execute in act 314.

As one example of how the system performing method 300 may, in act 314, generate function calls for execution by a system comprising one or more robots, consider a scenario in which the user input instructs the system to aspirate liquid from a well. In some cases, the user input may comprise natural language that instructs the system to aspirate liquid from a particular part of the well. For instance, the natural language could include "aspirate liquid from the top surface of well X," or "aspirate liquid from the bottom of well X". As described above, one or more function calls may be generated either directly from such natural language input or by first generating a structured task list then providing this list as input to a process for generating the one or more function calls. While both example natural language inputs relate to aspirating liquid, the system performing method 300 may generate different function calls for each example due to the specific location within the well identified in the respective inputs. In embodiments in which the system performing method 300 accesses a Gen AI system (which may be included in the system or accessed remotely), API requests to the Gen AI system in this example may cause the Gen AI system to generate different function calls in each example, as the Gen AI system may recognize the distinction between well locations indicated by the different inputs. As a result, the Gen AI system may generate one or more function calls that will either cause a robot to aspirate liquid from the top surface or aspirate liquid from the bottom of a well, depending on which of the example user inputs above are provided.

In some embodiments, the system performing method 300 may, in act 314, generate a plurality of function calls that, when executed, cause a robot to perform a complex task. In some cases, user input may instruct a robot to perform a task that is sufficiently complex that performing this task comprises the robot performing a number of other, simpler tasks. As one example, if a user input instructs the robot to shake an object, the system performing method 300 may generate a plurality of function calls that each move the robot a short distance in one direction when executed. The function calls may for instance be generated to be executed in a sequence in which the direction alternates between two directions (e.g., opposing directions). By executing this plurality of function calls that each produce a single movement, therefore, the robot may be caused to perform the shake task. Other examples of complex tasks that may be produced through a suitable sequence of simpler tasks may also be envisioned. In some embodiments, a Gen AI system accessed by system 300 may be configured to break down certain complex tasks in this manner and produce appropriate function calls that, when executed in sequence, cause a robot to perform the task.

In some embodiments, the system performing method 300 may utilize multiple different Gen AI models to generate one or more function calls. For instance, through a process of AI stacking, the same user input (or structured data) may be input to multiple Gen AI models, which each produce a respective output, and one of the outputs may be selected for subsequent use. Additionally, or alternatively, the system performing method 300 may utilize one of a plurality of Gen AI models to generate one or more function calls based on an analysis of the user input. For instance, some Gen AI models may be better at recognizing certain tasks and generating appropriate function calls for these tasks, while other Gen AI models may perform worse at these tasks, and vice versa. The system performing method 300 may accordingly select one of a plurality of Gen AI models for use in performing act 314 based on the user input.

With respect to any of the references to Gen AI systems or technology herein, these systems generally utilize generative models such as Generative Adversarial Networks (GANs), transformer-based models, diffusion models (e.g., stable diffusion models), and/or Variational Autoencoders (VAEs), etc., which are based on artificial neural networks and deep learning. Deep Learning (DL) is a subset of machine learning (ML) that focuses on artificial neural networks (ANN) and their ability to learn and make decisions. Deep Learning involves the use of complex algorithms to train ANNs to recognize patterns and make predictions based on large amounts of data. The key difference between DL and traditional ML algorithms is that DL algorithms can learn multiple layers of representations, allowing them to model highly nonlinear relationships in the data. This makes them particularly effective for applications such as image and speech recognition, natural language processing (NPL), etc.

Most DL methods use ANN architectures, which is why DL models are often referred to as deep neural networks (DNNs). The term "deep" refers to the number of hidden layers in the neural network. For example, a traditional ANN may only contain 2-3 hidden layers, while DNNs can have as many as 150 layers (or more). DL uses these multiple layers to progressively extract higher-level features from the raw input. For example, in image processing, lower layers may identify edges, while higher layers may identify the concepts relevant to a human, such as digits or letters or faces. DL models are trained by using large sets of labeled data and ANN architectures that learn features directly from the data without the need for manual feature extraction.

In many Gen AI systems, the generative model that generates content is a large language model (LLM). A large language model (LLM) is a type of ML model that can perform a variety of natural language processing (NLP) tasks such as generating and classifying text, answering questions in a conversational manner, and translating text from one language to another. The term 'large' refers to the number of values (parameters) the language model can change autonomously as it learns. Some LLMs have hundreds of billions of parameters. In general, LLMs are neural network models that have been trained using deep learning techniques to recognize, summarize, translate, predict, and generate content using very large datasets.

Many state-of-the-art LLMs use a class of deep learning architectures called transformer neural networks ("transformer networks" or "transformers"). A transformer is a neural network that learns context and meaning by tracking relationships between data units, such as the words in a sentence. A transformer can include multiple transformer blocks, also known as layers. For example, a transformer may have self-attention layers, feed-forward layers, and normalization layers, all working together to decipher input to predict (or generate) streams of relevant output. The layers can be stacked to make deeper transformers and powerful language models.

Two innovations that make transformers particularly adept for large language models are positional encodings and self-attention. Positional encoding embeds the order in which the input occurs within a given sequence. Rather than feeding words within a sentence sequentially into the neural network, with positional encoding, the words can be fed in non-sequentially. Self-attention assigns a weight to each part of the input data while processing it. This weight signifies the importance of that portion of the input in the context of the rest of the input. The use of the attention mechanism enables models to focus on the parts of the input that matter the most. This representation of the relative importance of different inputs to the neural network is learned over time as the model sifts and analyzes data. These two techniques in conjunction allow for analyzing the subtle ways and contexts in which distinct elements influence and relate to each other over long distances, non-sequentially. The ability to process data non-sequentially enables the decomposition of the complex problem into multiple, smaller, simultaneous computations.

"Completion" may refer to the process of a generative model generating additional content (e.g., text) based on a provided prompt (e.g., text), e.g., providing the next word in a sentence. The additional content (e.g., text) provided by the generative model may be referred to herein as a "completion." Completions generated by generative models may include text, audio data (e.g., speech, music, etc.), image data (e.g., images), video data (e.g., videos), time-series data, or any other suitable type of data. "Prompting" may refer to a technique in which a generative model (e.g., an LLM) is matched to a desired downstream task by formulating the task as natural language text explaining the desired behavior, such that a generative model can carry out the task by performing text completion. Often these instructions are split into a "system message" containing general task instructions providing general guidance about the desired behavior and a "prompt template" containing the portion of the prompt that contains indicator values that are substituted in each use. "Fine-tuning" may refer to the process whereby a generative model is adapted to a particular task by changing its parameters by providing prompts with desired completions.

Generative models can analyze existing content, identify patterns in the content, and combine or modify the identified patterns to generate new content. The new content can include text, images, video, music, or any other suitable type of content. Some non-limiting examples of generative models include generative adversarial networks (GANs), variational autoencoders (VAEs), autoregressive models (e.g., large language models (LLMs)), recurrent neural networks (RNNs), transformer-based models, reinforcement learning models for generative tasks, etc. Transformer-based models generally have an encoder-decoder architecture, use an attention mechanism (e.g., scaled dot-product attention, multi-head attention, masked attention, etc.) to model the relationships between different elements in a sequence of content, and perform well when processing long sequences of content. Some non-limiting examples of transformer-based models include Generalized Pre-trained Transformer 4 (GPT-4), DALL-E3, etc. Other examples of generative models with text-processing capability include Jurassic-1, Command, and Paradigm. Generative models can benefit from hyperparameter tuning to tweak the model's performance for desired results.

In some embodiments, the system performing method 300 may not immediately generate instructions to perform the task. In some cases, the system may be configured to wait until a user triggers performance of the task, and as such it may be preferable to generate the instructions at the time the user triggers performance of the task, so that the instructions may be generated based on the most up-to-date state of the system. In some embodiments, the system performing method 300 may allow a user to 'queue' multiple tasks, then upon suitable receiving user input triggering performance, generate instructions to perform each of the queued tasks.

Optionally in method 300, the system performing method 300 may operate a robot to perform a task for which instructions were generated in act 314. Operating the robot in act 316 may comprise sending the instructions generated in act 314 to the robot and/or directly controlling the robot to execute the instructions generated in act 314.

Figure 4:
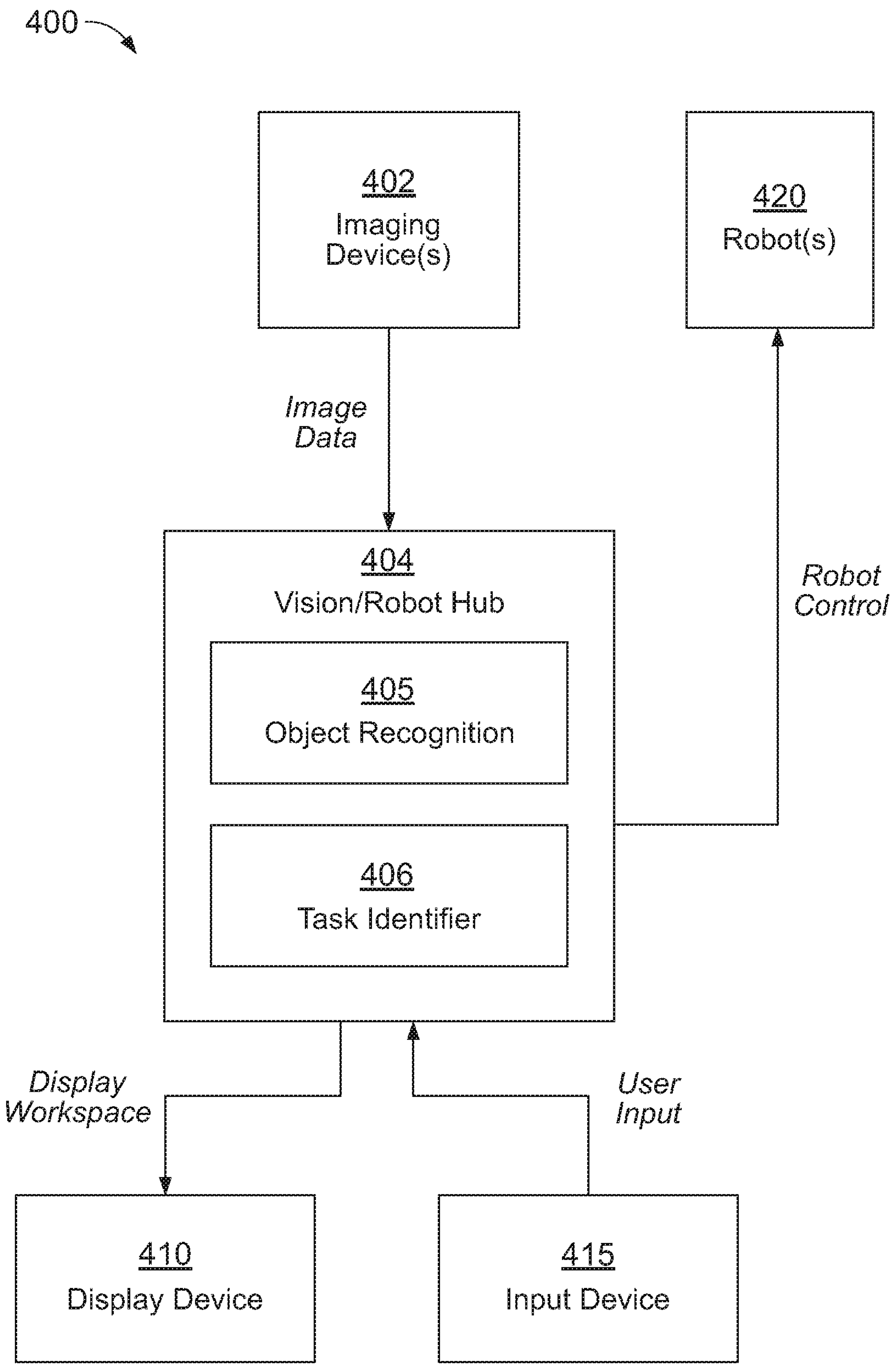
FIG. 4 is a block diagram of an illustrative system for generating instructions for a robot to perform a task within a workspace, according to some embodiments.

FIG. 4 is a block diagram of an illustrative system for generating instructions for a robot to perform a task within a workspace, according to some embodiments. System 400 comprises one or more imaging devices 402, a vision/robot hub 404 that may be implemented in any suitable combination of hardware and/or software, and one or more robots 420. System 400 also includes a display device 410 and input device 415.

According to some embodiments, the vision/robot hub 404 may be configured to perform any or all of method 300 as described above. For instance, the vision/robot hub 404 may obtain image data from an imaging device 402, identify a type of component present in a workspace based on the image data using object recognition module 405, generate a GUI for display on display device 410, and generate instructions that when executed by a robot 420 will perform a task as requested by a user providing input to input device 415.

According to some embodiments, the one or more imaging devices 402 may include any suitable cameras or other devices capable of producing an image of an object. In some cases, a single imaging device 402 may comprise multiple lenses, shutter and/or sensors. In some cases, one or more imaging devices 402 may comprise one or more on-board processors; as described below, this may allow system 400 to perform some operations on board the imaging device and others at a separate device (e.g., in FIG. 4 the operations of the vision/robot hub 404 could be split up across two physically distinct devices).

As shown in the example of FIG. 4, the vision/robot hub 404 includes an object recognition module 405 and a task identifier module 406. As noted above with respect to vision/robot hub 404, these modules may be implemented in any combination of hardware and/or software.

In the example of FIG. 4, object recognition module 405 is configured to detect objects (e.g., in a workspace) based on image data (e.g., of the workspace) received from the one or more imaging devices 402. Object recognition module 405 may be configured to perform one or more suitable processes for identifying an object from the image data, such as but not limited to feature detection and/or supervised learning models such as single shot detection (SSD). An object, as referred to herein, may include any of: a component (e.g., in a workspace, proximate to a workspace, or in a cart), a user (or some other non-robot entity subject to a safety concern), and/or a robot (e.g., a robotic cart, a robot on a rail). While objects (particularly components and robots) are described herein as being present within a workspace, the object recognition module 405 may not be limited to detecting objects within a workspace, and may more generally be configured to detect objects within a physical space, such as a laboratory, which may include multiple workspaces in addition to other regions that are not in a workspace.

In the example of FIG. 4, task identifier module 406 is configured to determine one or more tasks that may be performed for one or more of the robot(s) 420 based at least in part on the components that are present in a workspace, as determined by the object recognition module 405. The task identifier module 406 may determine a list of available tasks (which may in some cases be zero tasks) for each component that is currently recognized as being in the workspace by the object recognition module 405. As described above in relation to FIG. 3, determining the tasks available may comprise accessing a component library (not shown in FIG. 4) and obtaining data relating to a particular component.

As described above, in some cases a list of available tasks for a given component is determined at least in part on data relating to parts of the system other than that component. For example, some tasks may only be performed when other components are present; if the system has not identified those components as being present, the list of available tasks may not include those tasks (e.g., tasks requiring pipettes may not be available if no pipettes are available in the workspace). As another example, some tasks may require particular inventory to be available to be performed (e.g., a sufficient number of pipettes). In some embodiments, task identifier module 406 may be configured to access inventory data and determine whether or not such a task may be completed using the available inventory, and including it in the list of available tasks only when there is sufficient inventory.

In the example of FIG. 4, when the vision/robot hub generates a user interface (such as a graphical user interface) for display on the display device 410, a portion of this interface may be generated based on the lists of tasks identified by the task identifier module 406. For instance, the list of tasks may be displayed in a GUI next to a component to show a user that they have the option to select one of those tasks for a robot to perform. The list of tasks may in some cases be generated for the GUI in response to a user interacting with the associated component via the GUI.

In some embodiments, task identifier module 406 is configured to determine an operation mode in which to perform the one or more tasks determined by the task identifier module based on the objects detected in a workspace. For instance, the task identifier module 406 may determine that the one or more tasks are to be performed an operation mode based on whether or not a user is detected in the workspace (or proximate to the workspace) and/or how proximate a detected user is to a robot. As one example, the task identifier module 406 may determine that the one or more tasks are to be performed in a full operation mode (i.e., with no safety-related changes) when no user is detected in the workspace (or when no user is detected proximate to any robots in the workspace), and that the one or more tasks are to be performed in a reduced operation mode when a user is detected in the workspace (or when a user is detected proximate to a robots in the workspace). Such an approach is described in more detail below in relation to FIG. 9.

In some embodiments, the task identifier module 406 may be configured to determine that the one or more tasks determined by the task identifier module should not be performed at this time based on the objects detected in the workspace. For example, if a user is detected in close proximity to a robot, the task identifier module 406 (or some other part of the vision/robot hub 404) may be instructed not to generate any control signals to send to the robot(s) 420 as a result of such a detection.

In the example of FIG. 4, robot(s) 420 may include any type of robot capable of interacting with components in a workspace such as, but not limited to, robots that include any one or more of: one or more movable arms, a gantry or rail on which a portion of the robot moves, a cart or other wheeled structure that may be operated to move at least part of the robot, and/or one or more end effectors (e.g., robotic hands or other grasping devices). In some embodiments, robot(s) 420 comprises a cart or other wheeled structure comprising a robotic arm mounted to the structure.

According to some embodiments, the vision/robot hub 404 may be configured to generate high level instructions for a robot 420 to execute. These high level instructions may be provided to an on-board controller or other suitable device on the robot 420, which may compile and execute these instructions. According to some embodiments, the vision/robot hub 404 may be configured to generate instructions that, when sent to a robot 420 may be immediately executed by the robot 420 to perform a task. In either of these configurations, the vision/robot hub 404 is considered for the purposes of this disclosure to be generating instructions that, when executed by a robot 420, will perform a particular task. Instructions may be generated by the vision/robot hub 404 in accordance with an operational mode determined by the task identified 406 (e.g., a reduced operation mode when detecting a user in the workspace, or a full operation mode otherwise). For instance, the instructions may be generated with a reduced speed when in a reduced operation mode compared with the same instructions generated in the full operation mode.

According to some embodiments, the display device 410 and input device 415 are remotely coupled to the vision/robot hub 404. The imaging device(s) 402 and robot(s) 420 may be co-located an automated laboratory, with the vision/robot hub 404 arranged within, or proximate to, the laboratory to control the robot(s) based on the image data received from the imaging device(s). User input from the input device 415 may be received from a remote user (e.g., via the Internet), and data describing the workspace may be optionally provided to a remote display device 410. Implementations of system 400 without the display device 410, or generation and communication of a display of the workspace to the display device, are also possible. For instance, when system 400 is configured to control an automated laboratory, input to control the one or more robots 420 may be received in text form only from a remote input device 415, and no display of the workspace may be provided to a user. For example, the automated laboratory may be operated as a cloud-based resource, wherein a user submits a request (e.g., "Screen Vector X across N cell lines") and system 400 controls the one or more robots 420 based on the received request, without provided any display information to the user.

Figure 5:
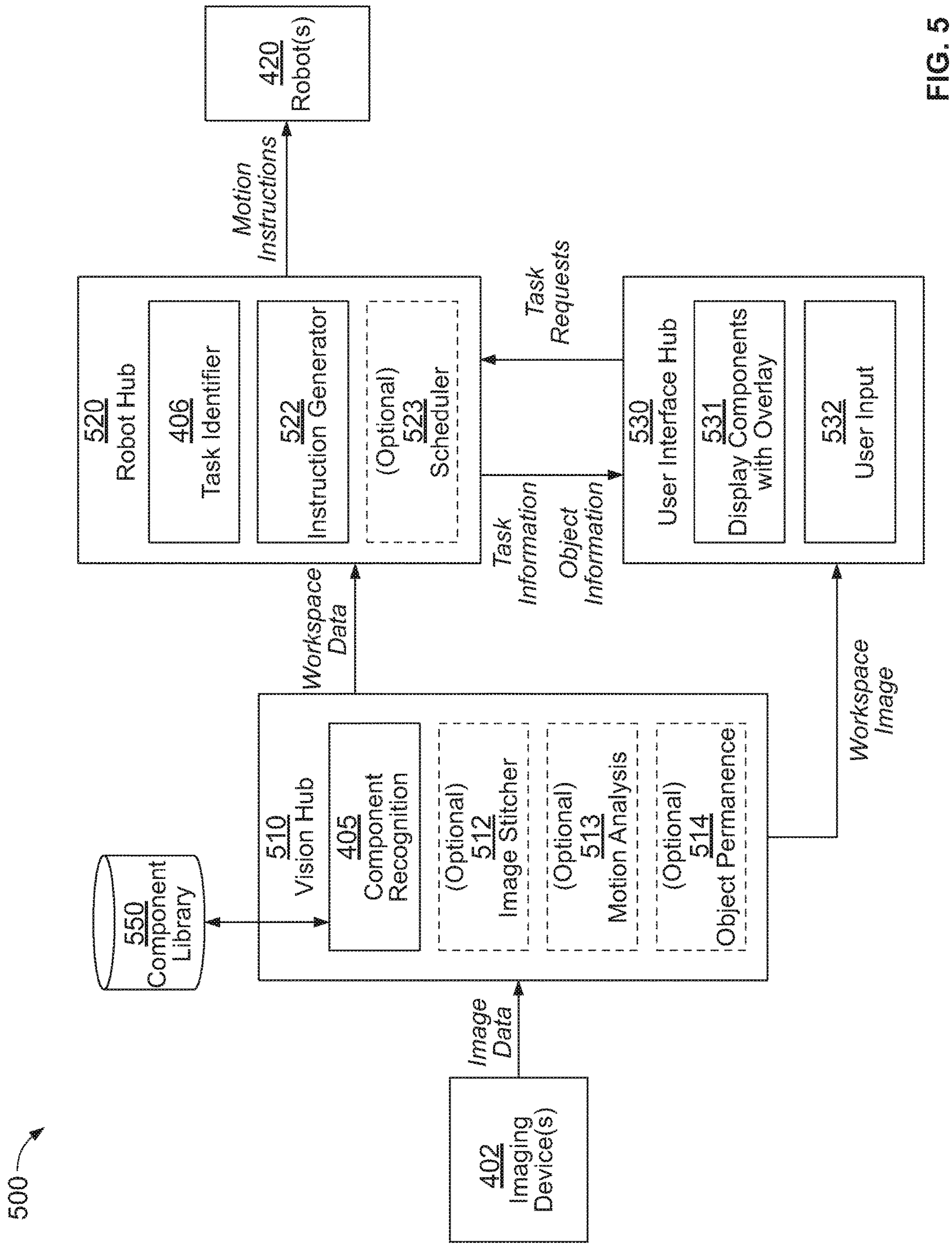
FIG. 5 is a block diagram of a second illustrative system for generating instructions for a robot to perform a task within a workspace, according to some embodiments.

FIG. 5 is a block diagram of a second illustrative system for generating instructions for a robot to perform a task within a workspace, according to some embodiments. System 500 may be viewed as an implementation of system 400 with the vision/robot hub 404 implemented as a vision hub 510, a robot hub 520, and a user interface hub 530. Any one or more of the optional modules image stitcher 512, motion analysis 513, object permanence 514, and scheduler 523, may be included in system 500 in any combination. System 500 also includes component library 550, which may be utilized at least in the manner described above in relation to component library 320.

According to some embodiments, the vision hub 510, robot hub 520 and user interface hub 530 may together be configured to perform any or all of method 300 as described above. For instance, the vision hub 510 may obtain image data from an imaging device 402, the object recognition module 405 of vision hub 510 may identify a type of component, a user, and/or a robot present in a workspace based on the image data, the module 531 of user interface hub 530 may generate a GUI for display on a display device, and the instruction generator module 522 of robot hub 520 may generate instructions that when executed by a robot 420 will perform a task as requested by a user providing input processed by user input module 532.

Descriptions of the imaging device(s) 402, robot(s) 420, object recognition module 405, and task identifier module 406 provided above in relation to FIG. 4 may be presumed to apply to the same elements shown in FIG. 5.

According to some embodiments, image stitcher module 512 may be configured to, in the case where there are multiple imaging devices 402, stitch together images from the different devices to produce a single image. An illustrative example of how the image stitcher module 512 may be configured is as follows. Initially, multiple images of the workspace may be aligned by transforming the images through cylindrical projection onto a common surface, making them easier to align. Next, distinct features within overlapping regions of the images are identified. Any suitable feature matching process could be used for this purpose, including but not limited to techniques such as SIFT (Scale-Invariant Feature Transform) or SURF (Speeded-Up Robust Features). Once features in the overlapping regions are identified, they may be matched across the overlapping images to align the images. This process may for instance be performed using the RANSAC (Random Sample Consensus) algorithm. Subsequent to matching the features, the images may be aligned onto a single plane using a homography transformation. Finally, the images may be merged to produce a panoramic image. In some cases, an image seaming technique may be applied to produce smooth transitions between the images (e.g., application of a Sobel filter). The resulting image, referred to herein as a panoramic image or a stitched image, or at least a portion of it, may be provided to the user interface hub 530 for display to a user in a graphical user interface.

According to some embodiments, motion analysis module 513 is configured to perform tracking of components, users, and/or robots to track their movement across multiple image frames captured at different times by the imaging device(s) 402. For instance, motion analysis module 513 may be configured to perform multi-object tracking (MOT) to track the movements of one or more components, users, and/or robots in the workspace (e.g., by performing Kalman filtering for state estimation and predicting the future positions of a component and/or a robot based on their current position and velocity). In some embodiments, a detected component, user, and/or robot may be matched with its corresponding track by determining an Intersection over Union (IoU) metric.

According to some embodiments, the motion analysis module 513 is configured to generate a predicted trajectory for a robot as it moves. When the imaging device(s) produce image data that indicates that the robot is moving, and said movement is tracked as described above, the motion analysis module 513 may generate a predicted trajectory for the robot's movement within the image data. At the same time, a trajectory of the robot's intended motion is also expected based on the generated instructions being sent to (or otherwise executed by) the robot. Ideally, these would match, but the motion analysis module 513 may be configured to compare the predicted movement implied by the image data with the expected movement that should be produced based on the instructions, and determine whether or not these match.

As one example of comparing these trajectories, an estimation of how the robot's intended motion should appear in the image data may be generated by determining where the three-dimensional points along the robot's intended path will appear in images captured by the imaging device(s). Such a determination may for example be performed based on information regarding optics of the imaging device(s) 402, the position(s) of imaging devices 402, and geometric information describing a robot 420. This generated two-dimensional (2D) trajectory representing the intended path of the robot may be compared with the actual 2D trajectory observed in the image data to determine if the two trajectories have a sufficiently high similarity. When the similarity is below a desired threshold, this robot may be said to exhibit "unexpected motion."

According to some embodiments, when unexpected motion is detected by the motion analysis module 513 for a robot, one or more safety procedures may be executed by the robot hub 520. Safety procedures may include lowering the operational speed and/or power of the robot, or halting all movement of the robot for a period of time.

According to some embodiments, the vision hub 510, whether via motion analysis module 513 or otherwise, may generate a 3D model of the workspace based on information on one or more recognized components and/or users and the known position of one or more robots within the workspace. As described above, the object recognition module may obtain data describing the geometry of a component and/or user recognized by the object recognition module 405. Furthermore, the vision hub 510 may access data describing the geometry of a robot (e.g., one or more 3D models). Together, the geometrical data on the component(s), user(s), and robot(s) may be utilized by the vision hub to generate a 3D model of the workspace. In some embodiments, a 3D rendering of the workspace may be generated by the vision hub 510 based on one or more generated 3D models of the workspace, and may be displayed to the user via the user interface hub 530. As components, users, and/or robots move within the workspace, this 3D rendering may be updated so that the user has the ability to see an up-to-date view of the system's understanding of the workspace. This 3D rendering may be presented as a view of the workspace that is available to the user, separately from the view that utilizes images from the imaging device(s) as described above.

In the example of FIG. 5, the object permanence module 514 is configured to maintain continuity in tracking components, users, and/or robots (hereinafter 'objects') in the workspace, even in situations where an object temporarily disappears from the field of view of the imaging device(s) 402. For instance, a user's hand or a tool may temporarily obscure a component or robot. The object permanence module 514 is configured to examine motion tracking data for a first object prior to a period in which the first object could no longer be successfully tracked, and to examine motion tracking data for a second object that is currently being tracked to determine whether the first and second objects are in fact the same object. This determination may comprise determining whether the trajectory of the first object exhibited in the motion tracking data of the first object and the trajectory of the second object exhibited in the motion tracking data of the second object align sufficiently to be two unconnected portions of a single trajectory.

In the example of FIG. 5, the robot hub 520 receives task requests from the user interface hub, and provides task information produced by the task identifier 406 to the user interface hub 530. The robot hub 520 also provides information on components and/or robots (which hereinafter may be referred to as "object information") to the user interface hub, which may include information on the positions of objects in the workspace. The user interface hub 530 also receives a workspace image from the vision hub (e.g., a panoramic image produced by the image stitcher module 512). The module 531 of user interface hub 530 may thereby generate a graphical user interface that includes a workspace image with information overlayed on the image such as outlines of objects (components and/or robots), and which can display available tasks for a given component to a user.

As described above in relation to FIG. 3, an overlay may include any graphical shapes, coloring, and/or text that is combined with a workspace image to provide information on the workspace to a user. In some cases, an overlay may provide information regarding a component in the workspace. For example, the module 531 may generate a graphical user interface (GUI) to include an image of the workspace with a label identifying (e.g., naming) a component arranged on or in proximity to the component in the image. In some cases, an overlay generated by module 531 may highlight a component in the workspace. For example, the GUI may be generated to include an image of the workspace in which one or more components have an outline added to make them more visible (e.g., a color outline), and/or are shaded with a partially transparent layer of color. In some cases, an overlay generated by module 531 may identify one or more portions of a robot present within the workspace and/or may identify a status of the robot. For example, the module 531 may generate a GUI that highlights (e.g., through shading and/or an outline) portions of the robot and/or to note the status of the robot (e.g., the task it is currently performing and its progress through that task).

In the example of FIG. 5, at least some of the user input that is provided to the GUI may be used to generate one or more task requests, which are provided to the robot hub 520. The instruction generator module 522 generates instructions based on the received one or more tasks requests that, when executed by a robot 420, performs the requested task(s). Various techniques to generate these instructions are described above in relation to the vision/robot hub 404 shown in FIG. 4, and any or all of the above-described techniques may be performed by instruction generator module 522.

In some embodiments, the instruction generator module 522 generates instructions based on geometrical data describing one or more aspects of a component with which a robot will interact while performing a task. These aspects may for instance relate to dimensions, physical features and their location, weight, how hard or soft the component is, or combinations thereof. For example, data indicating a location of a component and a location on the component at which the robot is to perform a task may be provided to the instruction generator module 522, which generates instructions that, when executed, move the robot to the intended location. As another example, a weight of a component and an indication that the component has a hard surface may be provided to the instruction generator module 522, which generates instructions that, when executed, operate the robot to pick up the component in a manner appropriate for a hard object with the given weight.

In the example of FIG. 5, the robot hub 520 includes a scheduler module 523, which is configured to schedule tasks that they can be executed at a desired later time, rather than immediately upon request by a user through the GUI. For instance, the scheduler module 523 may be configured to manage queueing, sequencing and/or dispatching of tasks to the instruction generator module 522. In some embodiments, tasks requests received by the robot hub 520 from the user interface hub 530 may indicate that the tasks are not to be performed immediately, but are to be queued until a further instruction indicates that this task is to be initiated. In some cases, multiple such tasks may be queued in a sequence and subsequently the user interface hub may generate a request in response to user input indicating that the tasks should be performed, in response to which the scheduler 523 initiates the tasks to be performed in the defined sequence.

In some embodiments, the scheduler module 523 is configured to manage queueing, sequencing and/or dispatching of tasks to the instruction generator module 522 based on data describing available resources. In some use cases, there may be multiple sequences of operations that could each perform a given task with the resources available to system 500, and the scheduler module 523 may be configured to access such data and select one of these sequences based on the resources available. In some embodiments, the scheduler module 523 may be configured to determine a measure of efficiency associated with each sequence of operations, and to select one of the sequences based on the determined measures of efficiency. Such a measure may be an estimated time to perform the task, or some other metric. For example, two robots may both be available to move a component (as indicated by data describing these robots as being available resources), and scheduler module 523 may estimate how long each robot would take to move the component to its destination (e.g., based on the current relative positions of the robots and the component), and select the robot that is expected to complete the task more quickly. The scheduler module 523 may then dispatch a task to the instruction generator module 522, where the task is for the selected robot to move the component.

In some embodiments, the scheduler module 523 is configured to generate a sequence of tasks based on a task request, and based on data describing available resources. In some use cases, the requested task may be a complex task that could be achieved in multiple different ways, and the scheduler module 523 may be configured to select one of these ways to complete the task based on available resources. For instance, a task request for an automated laboratory to "screen Vector X across N cell lines" may be broken down in smaller tasks, as described above, by the robot hub 520 (whether by the task identifier 406 and/or the scheduler 523). However, there may be multiple ways to break down this task request into smaller tasks that would each nonetheless result in the requested task being performed. The scheduler module 523 may be configured to generate, based on data describing available resources, a plurality of task sequences that would each fulfill the task request. The scheduler module 523 may be further configured to determine a measure of efficiency associated with each sequence of tasks, and to select one of the sequences based on the determined measures of efficiency. For example, an automated laboratory may comprise multiple workspaces each including one or more robots, and only some workspaces and robots may be available, or expected to be available, during a time period in which the task request may be fulfilled. The scheduler may determine, for each identified sequence of tasks that would utilize the available resources during this time period, a measure of efficiency, and select one of the sequences of tasks based on the determined measures of efficiency (e.g., the shortest expected time to completion).

It will be appreciated that while the illustrative system of FIG. 5 is depicted as being arranged with distinct hubs and modules, that the system need not necessarily be implemented in this manner, and various configurations of hardware and software may be envisioned that perform the same operations described above, including any number of devices or processors. In cases where the system comprises hubs on separate hardware (e.g., a vision hub implemented in an on-camera processor, and a robot hub implemented on a connected server), messages may be sent between modules and/or hubs in an asynchronous or synchronous manner and via any suitable wired and/or wireless communication link.

Figure 6A:
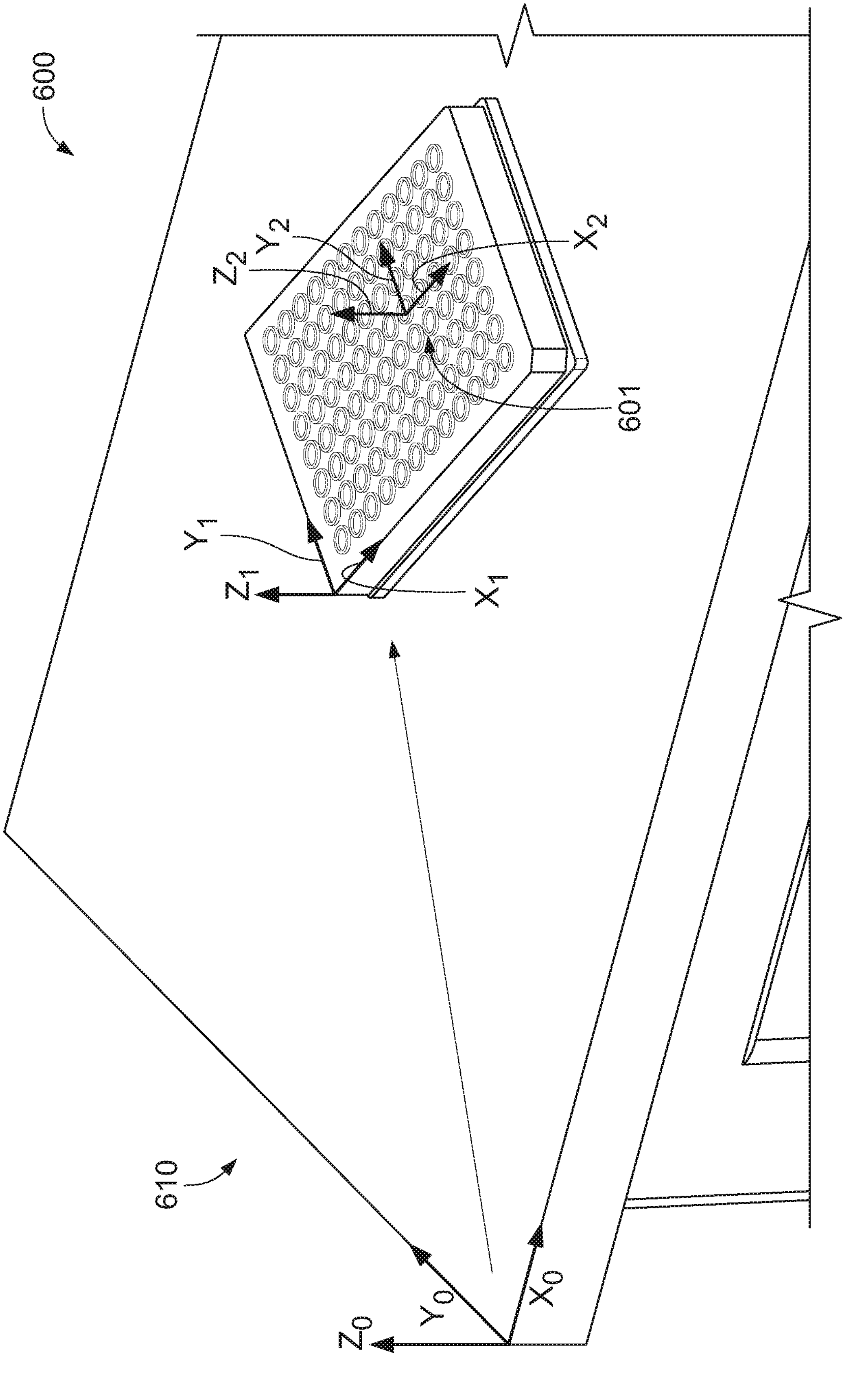
FIGS. 6A-6B depict illustrative positional information for a workspace, according to some embodiments.

As described above, instructions to operate a robot may be generated based on various geometrical data regarding a component when performing a task. In some cases, at least some of this data may come from a manufacturer of a component and be stored in a component library, examples of which are provided above. To further illustrate the types of geometrical information on which instructions to operate a robot may be based, FIG. 6A depicts a well plate 600 arranged within a workspace, wherein a workbench 610 is used to define the bounds of the workspace. The coordinate system of the workbench in this example is shown at bottom left with axes ($X_0$, $Y_0$, $Z_0$). The relative position of the tray in the workspace is specified by ($X_1$, $Y_1$, $Z_1$), which may have been determined by the system (e.g., system 400 of FIG. 4 or system 500 of FIG. 5) based on image data of the workbench 610 (e.g., $X_1$ and $Y_1$ may be determined from visual image data, and $Z_1$ may be determined from depth image data).

In the example of FIG. 6A, the task to be executed is for a robot to aspirate liquid from a particular well 601 in the well plate 600. This well has coordinates ($X_2$, $Y_2$, $Z_2$), which may be determined by the system based on the measured position ($X_1$, $Y_1$, $Z_1$) of the component and by information on the well plate 600 obtained from a component library when identifying the component on the workbench, as described above. For instance, the component library may indicate, for each well on a well plate, the position of that well in each of the three coordinate directions from the coordinate origin on the component (e.g., the position relative to ($X_1$, $Y_1$, $Z_1$) in the example of FIG. 6A).

Obtaining dimensions of a component in this manner may be more accurate and less complicated to determine than inspecting a physical object with imaging devices, even imaging devices mounted to a robot. This may be particularly true when attempting to determine the position of the bottom of a well, which may be obscured from an imaging device.

Figure 6B:
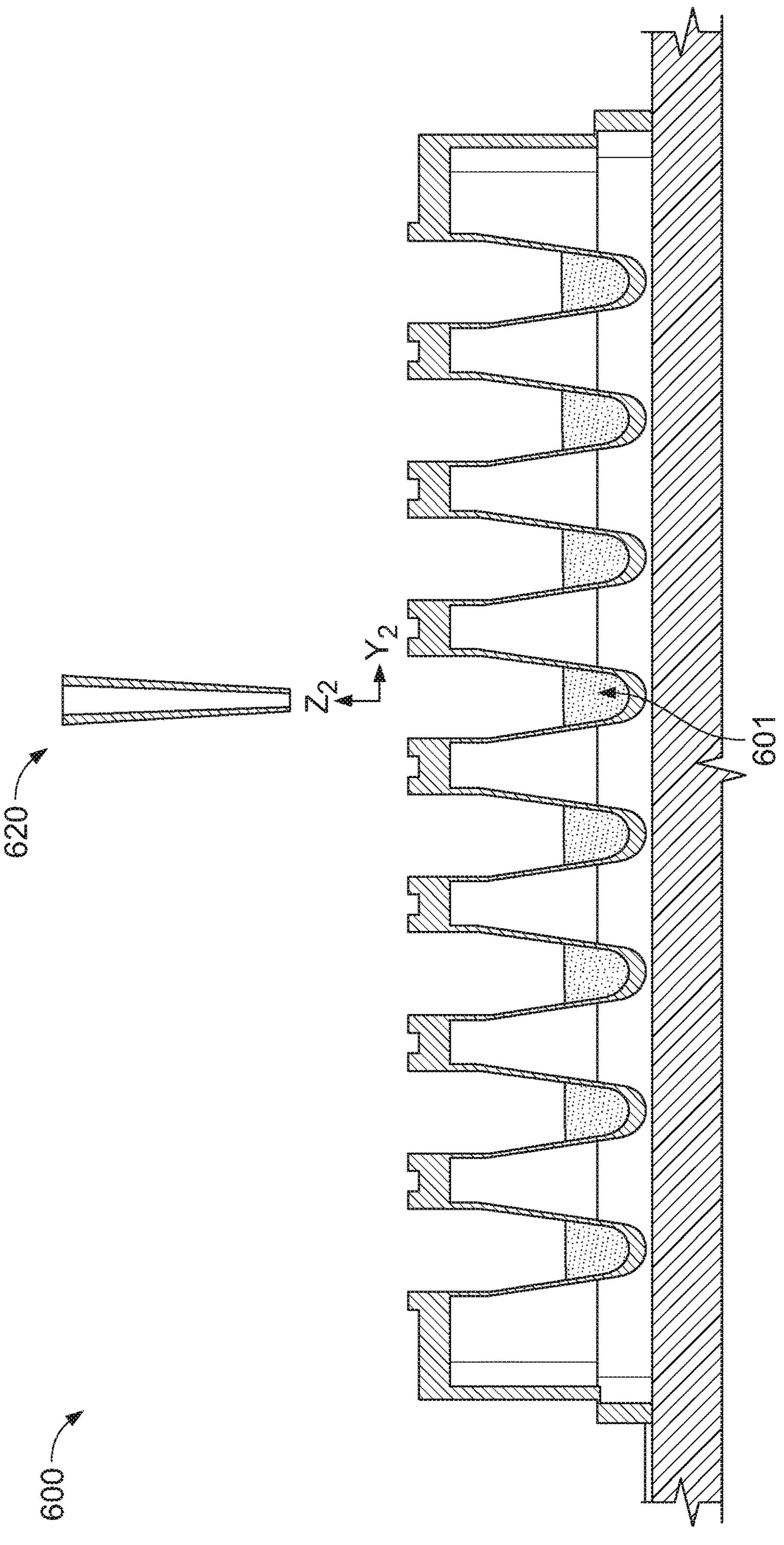

To continue illustrating this process, FIG. 6B depicts the wells of well plate 600 in cross-section, along with a pipette 620, which is coupled to a robot (not shown). In the example of FIG. 6B, the pipette 620 is positioned over the well at $X_2$, $Y_2$ and the depth of the well is determined from information on the well plate as obtained from the component library, as indicated above. As a result of obtaining this dimensional information, instructions may be generated to operate the robot so that the robot can accurately aspirate a desired volume of liquid from the well (i.e., be directed to the proper position along the $Z_2$ direction).

FIGS. 7A-7E depict a sequence of operations being performed in a graphical user interface, according to some embodiments. To further illustrate a process by which a user may instruct a system to perform tasks with components in a workspace, FIGS. 7A-7E depict five states of a graphical user interface 700.

Figure 7A:
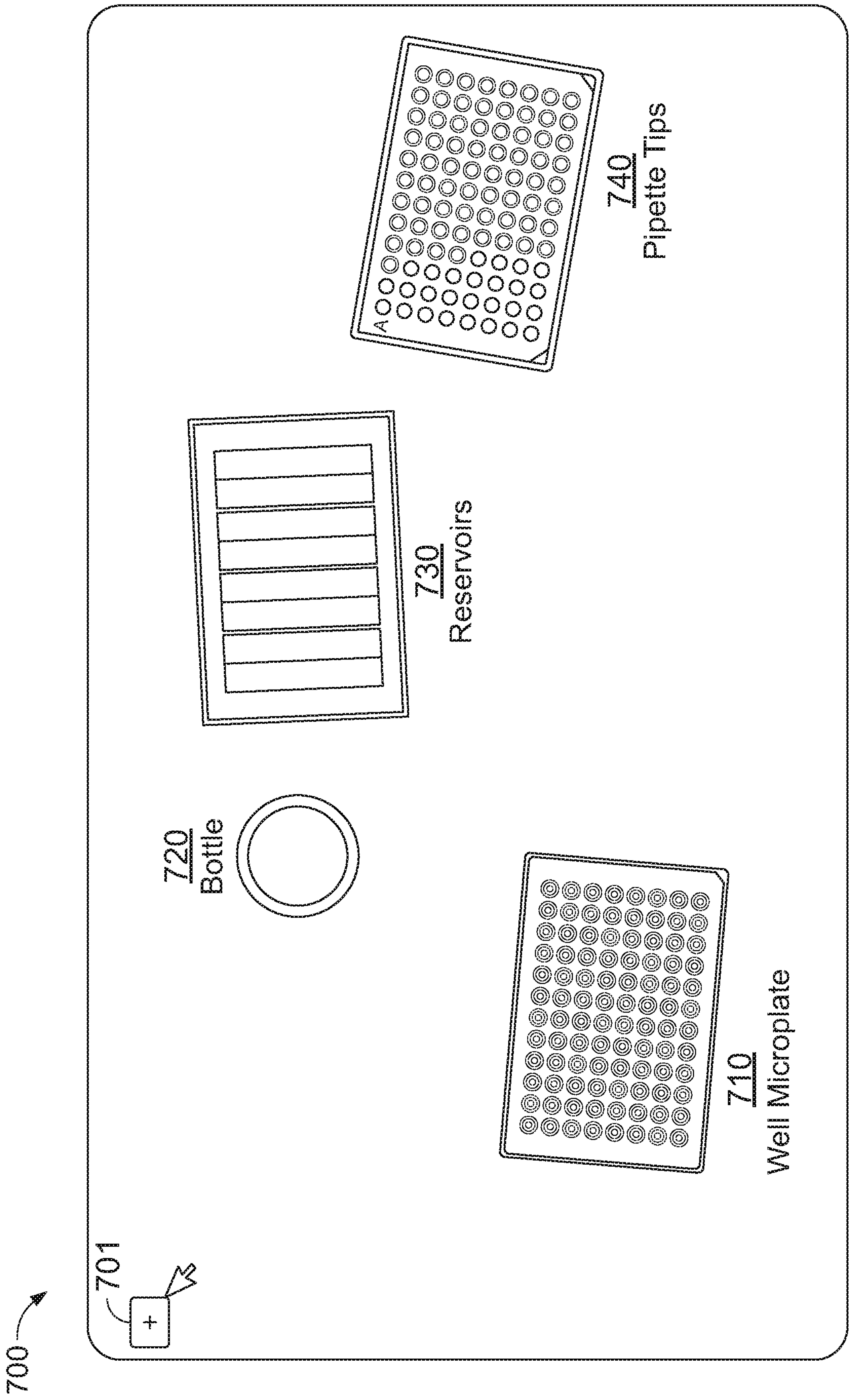
FIGS. 7A-7E depict a sequence of operations being performed in a graphical user interface, according to some embodiments.

As shown in FIG. 7A, the GUI 700 depicts a workspace that comprises four components that have recognized by the system generating the GUI. These components are a well microplate 710, a bottle 720, a set of reservoirs 730, and a tray of pipette tips 740. The GUI 700 may display an image of the workspace generated from one or more imaging devices, as described above, and any one or more of the components 710, 720, 730 and 740 may be highlighted in this image through overlays (e.g., shading, added boundaries) applied over the image.

Figure 7B:
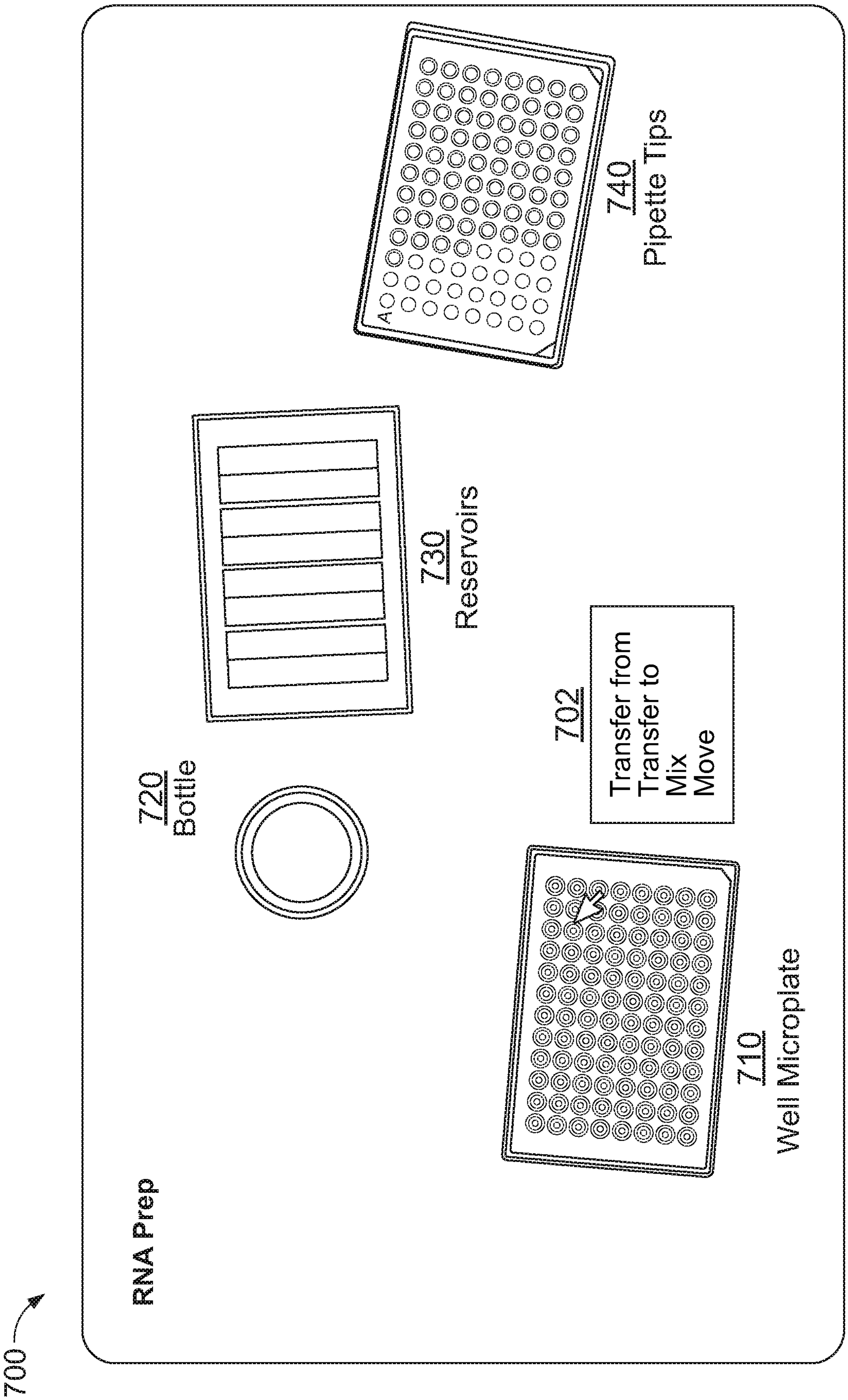

In the example of FIG. 7A, a user directs a pointer to the plus sign 701 and interacts with it (e.g., clicks on it with a mouse), which indicates a new sequence of tasks (henceforth a "process') is to be initialized. The user names this process "RNA Prep," and selects the well microplate 710, as shown in FIG. 7B. As shown in FIG. 7B, this selection causes the well microplate to be highlighted (or further highlighted) in the GUI relative to FIG. 7A, and a list of four available tasks 702 is shown next to the component 710. The user selects the "Transfer to" task from this list, and the system prompts the user to select the component from which the transfer will be performed.

Figure 7C:
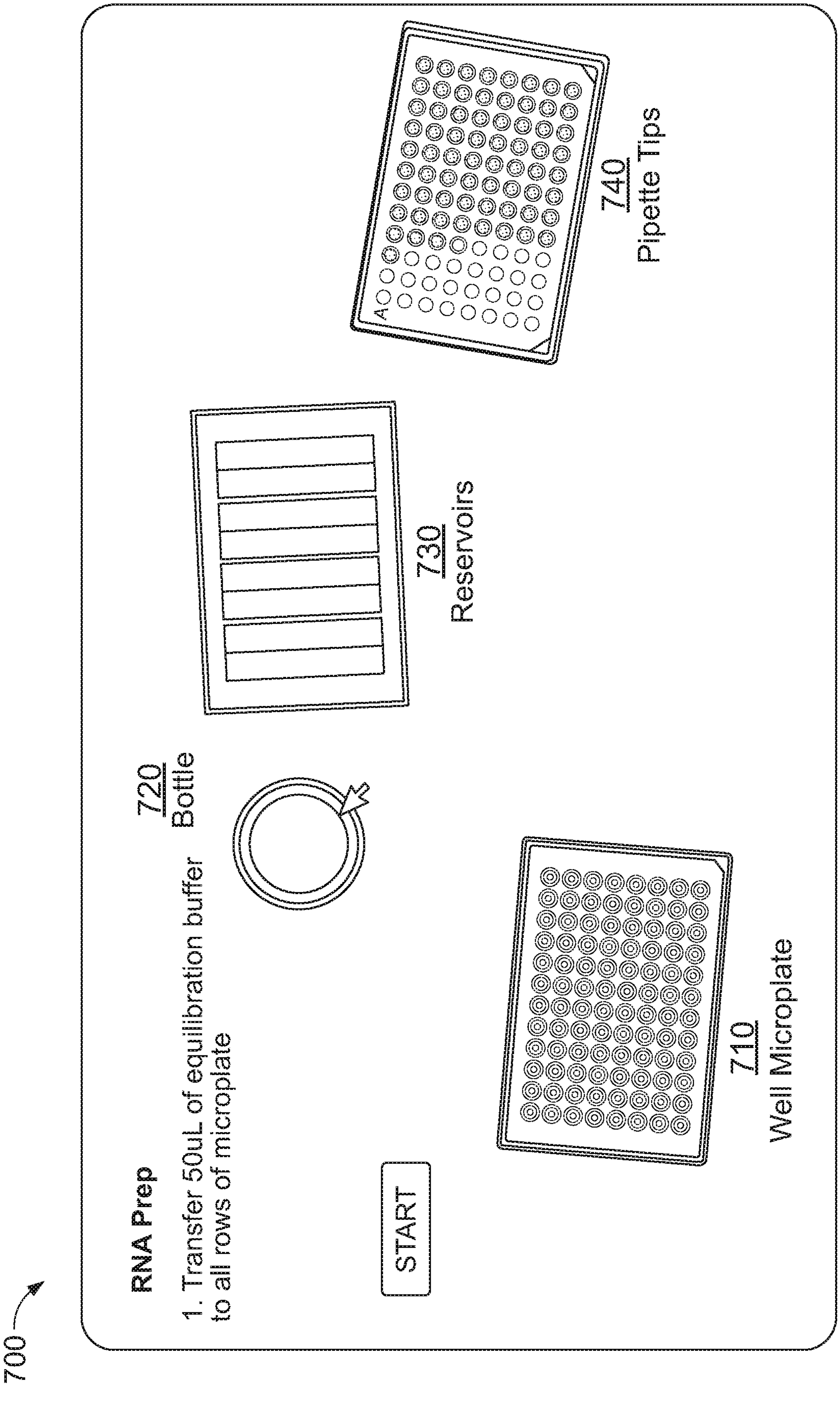

As shown in FIG. 7C, the user selects the bottle 720 as the source for the transfer. The system generating the GUI contains, or otherwise has access to, data that indicates the bottle 720 contains equilibration buffer. The user also provides input indicating that the transfer should be of 50 uL and should be transferred to all wells of the well microplate 710. This sequence of user inputs generates a task of transferring 50 uL of equilibration buffer to all rows of the microplate from the bottle, as shown at the top left of the GUI 700. In addition, a "START" button is also generated, which when selected by user input would initiate performing of the process, which so far contains a single task.

Figure 7D:
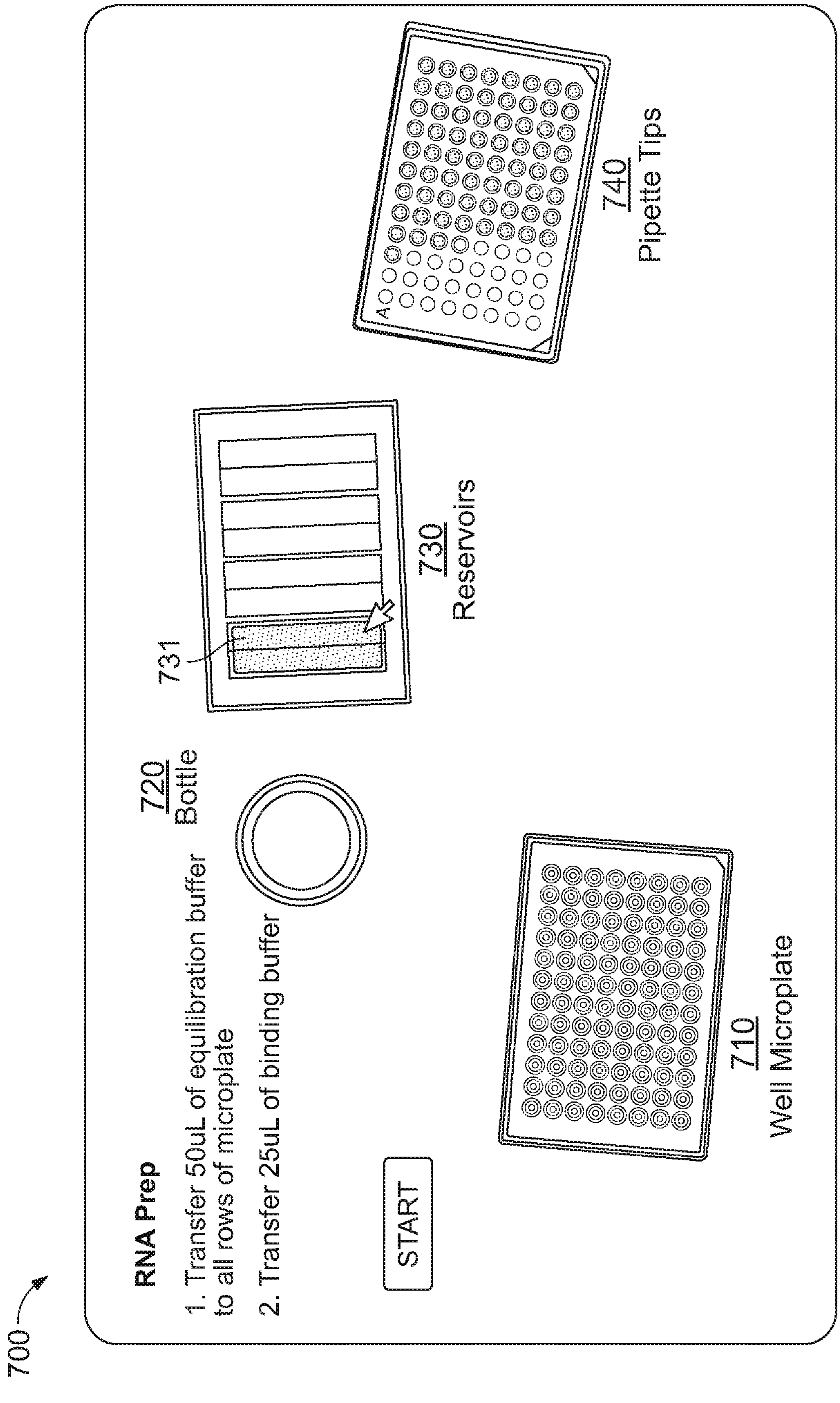
Figure 7E:
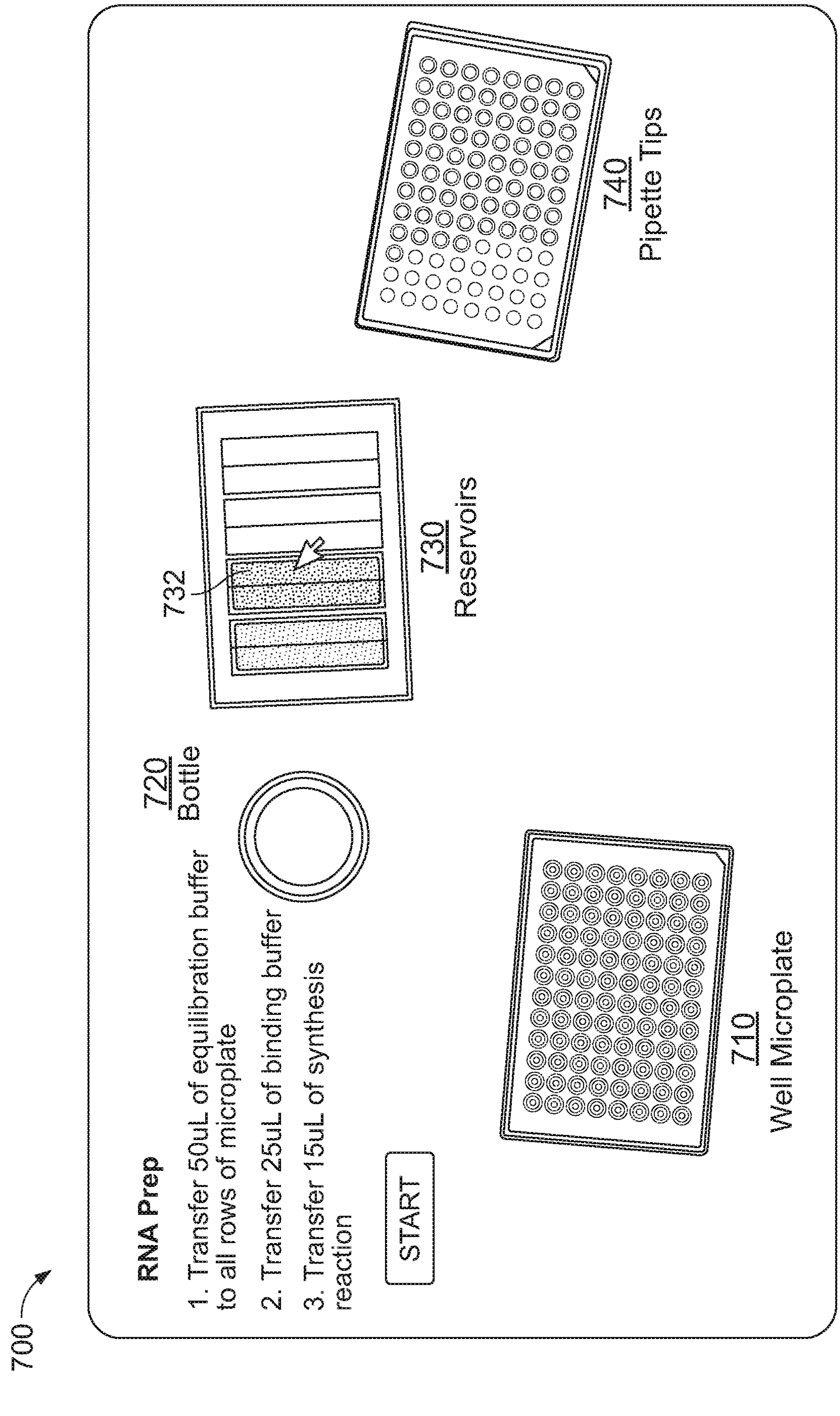

The user subsequently repeats the sequence of user inputs (selecting a component, selecting an available tasks representing liquid transfer, and selecting a source and target for the transfer) twice, as shown in FIGS. 7D and 7E. In FIG. 7D, the user has selected a first reservoir 731 of the reservoirs 730 (731 is shown highlighted) from which to transfer 25 uL of binding buffer to the microplate wells. In FIG. 7E, the user has selected a second reservoir 732 of the reservoirs 730 (732 is shown highlighted) from which to transfer 15 uL of synthesis reaction reagent to the microplate wells. The user may then initiate the process, now comprising three tasks, which will cause the system to generate instructions to operate a robot to perform these tasks in the indicated sequence.

Figure 9:
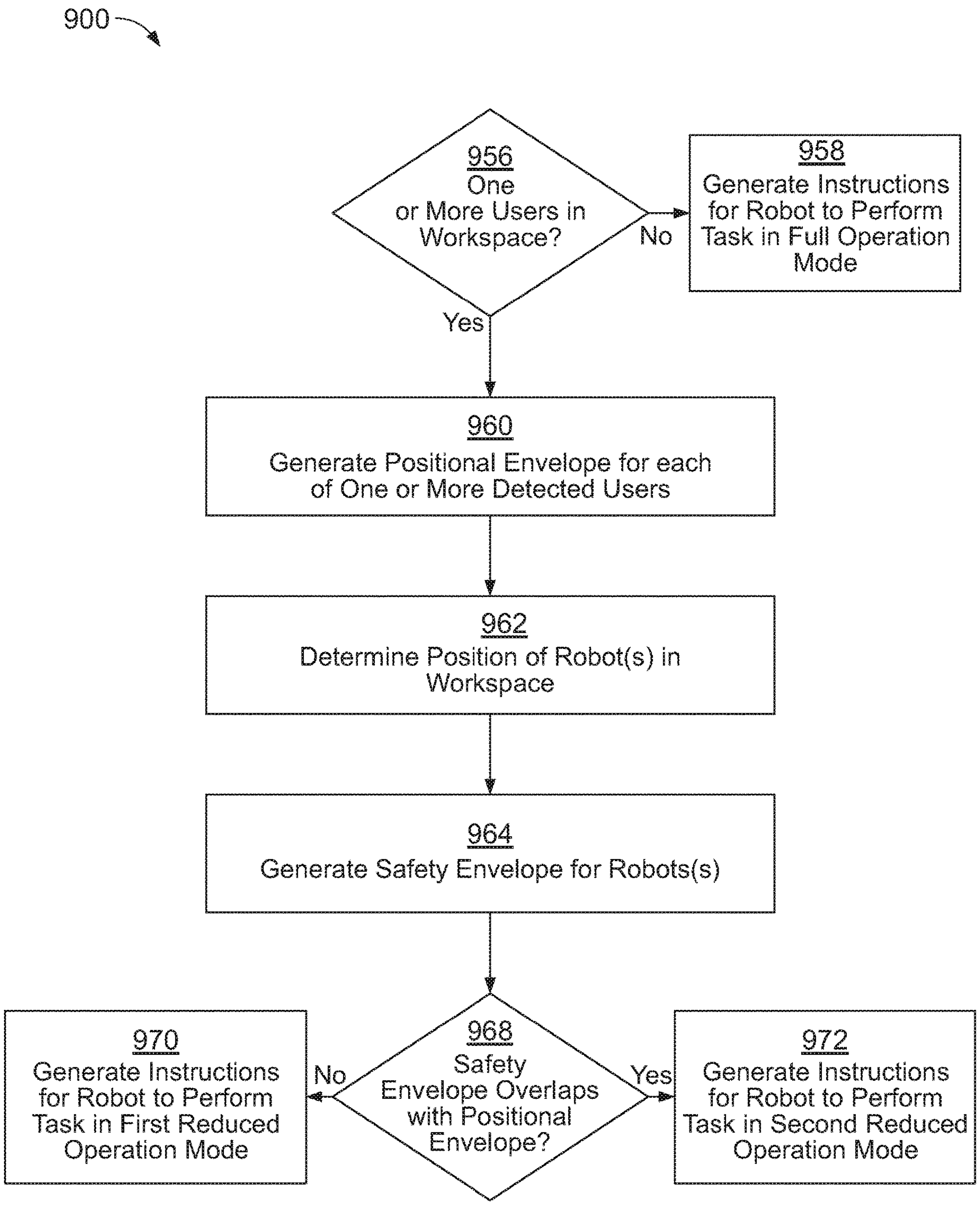
FIG. 9 is a flowchart of a method of generating instructions for a robot to operate in one or more operation modes when performing a task, according to some embodiments.

FIG. 9 is a flowchart of a method of generating instructions for a robot to perform a task within a workspace (such as the tasks described with respect to FIG. 3) in one of a plurality of operating modes, according to some embodiments. In some embodiments, the method 900 is performed as part of a safety routine. Method 900 may be performed by a system comprising one or more processors that performs the acts of the method through any combination of software and/or hardware. In the example of FIG. 9, the system performing method 900 is communicatively coupled to: one or more imaging devices arranged to view a workspace and one or more robots that are arranged to perform tasks in the workspace.

In some embodiments, the system configured to perform the method 300 discussed with respect to FIG. 3 can also be configured to perform the method 900. For instance, system 400 shown in FIG. 4 or system 500 shown in FIG. 5 may be operated to perform the method 900.

In some embodiments, method 900 may be part of method 300, such as part of act 314 in which the system performing method 300 generates instructions to perform the task requested in act 312 such that the instructions, when executed by a robot, will perform the task. In such embodiments, method 900 selects one of three operating modes based on image data and generates instructions for a robot to perform a task in accordance with method 300, where the generated instructions are generated such that the robot will operate in the selected operating mode.

The operating modes in the example of FIG. 9 are a full operating mode, a first reduced operating mode, and a second reduced operating mode. According to some embodiments, robots operating in the full operating mode will perform the task as determined by the system executing method 900, whereas robots operating in either of the reduced operating modes will perform the same task, but adjusted in some way to increase safety. For example, in the first reduced operating mode the generated instructions may, when executed by the robot, cause the robot to perform the task more slowly that would be performed in the full operating mode; whereas in the second reduced operating mode the generated instructions may, when executed by the robot, cause the robot to perform the task even more slowly that would be performed in the first reduced operating mode. In some embodiments, the second reduced operating mode is a stopped operating mode; that is, the instructions generated to operate the robot in the second reduced operating mode may be instructions that cause the robot to halt all movement (which may include simply generating no instructions, which causes the robot to stop moving).

Method 900 includes act 956 in which the system executing method 900 determines whether one or more intruding objects, such as users or mobile robots, are present in the workspace. While identification of a user will be discussed as a non-limiting example with respect to method 900, it should be appreciated that one or more other intruding objects can be determined to be present in the workspace that may also impact the operating mode of a robot assigned to work in the workspace. That is, while the below processing steps are discussed with respect to determining a user is present in the workspace and operating the robot assigned to the workspace to perform the task accordingly, the same processing steps can be applied to determining one or more other intruding objects are in the workspace and in turn operating the robot assigned to the workspace to perform the task accordingly. Act 956 may be performed based on image data, such as image data obtained in act 302 during performance of method 300 or otherwise. The image data accessed in act 956 may be produced by the system performing method 900 operating one or more imaging devices to produce image data, receiving image data from one or more imaging devices, and/or accessing stored image data previously produced by one or more imaging devices. Image data may take various forms and may include any number of different types of image data, as described above in relation to act 302 of method 300. Moreover, the image data accessed in act 956 may be processed via one or more image processing operations either prior to or after the system performing method 900 obtains the image data. Illustrative examples of image processing operations are described above.

As described above, image data may include any one or more of: color or grayscale images, color or grayscale video frames, depth images, stereoscopic images, motion data, or other suitable types of image data. Act 956 may comprise determining whether any one or more users are present in a workspace based on any one or more of such types of image data. For example, act 956 may comprise identifying a user from the image data through feature detection and/or supervised learning models such as single shot detection (SSD). For example, an SSD model that has been trained on a large dataset of positively identified users may be applied to one or more color images, depth images and/or motion data to identify the one or more users present in the workspace, and in some cases also determine the orientation of the one or more users in the workspace and/or other spatial attributes. For example, an SSD model may have been trained on a large dataset of positively identified persons in image data. Image data may be applied to this SSD model, which may for instance be able to identify a user in the image data, and in some cases may determine the orientation of the user in the workspace.

Identifying a user in act 956 may comprise identifying the body of a user and/or part of a user's body, such as the user's head, neck, shoulder, arm, leg, or torso. Similarly, when another intruding object (e.g., another robot) is identified in act 956, it may comprise identifying the base, cart, arm or other part of the robot.

According to some embodiments, act 956 may comprise monitoring a user in the workspace based on the image data. For instance, once a user has been identified in act 956, subsequent instances of performing method 900 (or at least act 956) may comprise tracking the movement of the already-identified user rather than identifying the user in the exact same manner as in the first instance of act 956. Such motion analysis is described above in relation to FIG. 5. Motion analysis may allow the system performing method 900 to track the location of a single user in the workspace, even as that user moves around the workspace. In some embodiments, the movement of each user identified in the workspace can be tracked. If one or more users are identified in the workspace based on the imaging data, the method 900 can continue to act 960, discussed further below.

If, in act 956, no users are identified in the workspace based on the image data, method 900 proceeds to act 958 in which the system performing method 900 generates instructions to perform a task in a full operation mode. For instance, act 958 may generate instructions using any combination of the techniques described above in relation to act 314 described above. The task for which instructions are generated in act 958 may be, for instance, the task a robot R1 (e.g., a robot assigned to the workspace) is operated to perform in act 316 of the method 300. In the full operation mode, the robot R1's full suite of functionality can be available to the robot R1 to perform the task. For example, the robot R1's movement, speed, and motion may be unrestricted to perform the task. As a further example, in the full operation mode, the robot R1 can be free to move anywhere in the workspace. As a further example, in the full operation mode, the robot R1 can move at its maximum speed to perform the task. This can include the robot R1 base moving at full speed in the workspace (for instance on the rail 213) and/or an arm of the robot R1 being operated at full speed in the workspace. It should be appreciated that the robot R1 need not operate at full speed, as an example, when operating in full operation mode. For instance, to increase precision of the robot R1, the robot R1 may perform a task at a reduced speed. However, the robot R1's full suite of functionality is available to the robot R1, as needed, for performing the task, when generating instructions in act 958.

Figure 10A:
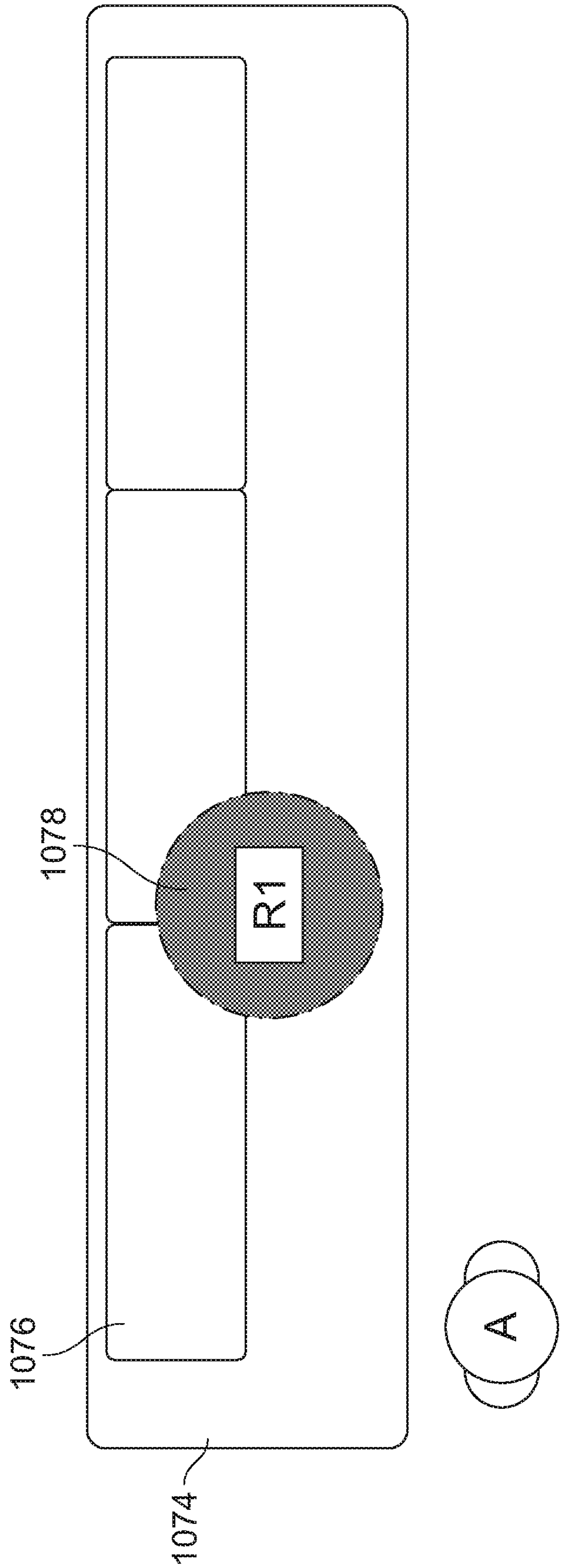
FIG. 10A depicts an illustrative workspace, without an intruding object positioned in the workspace, according to some embodiments.
Figure 10B:
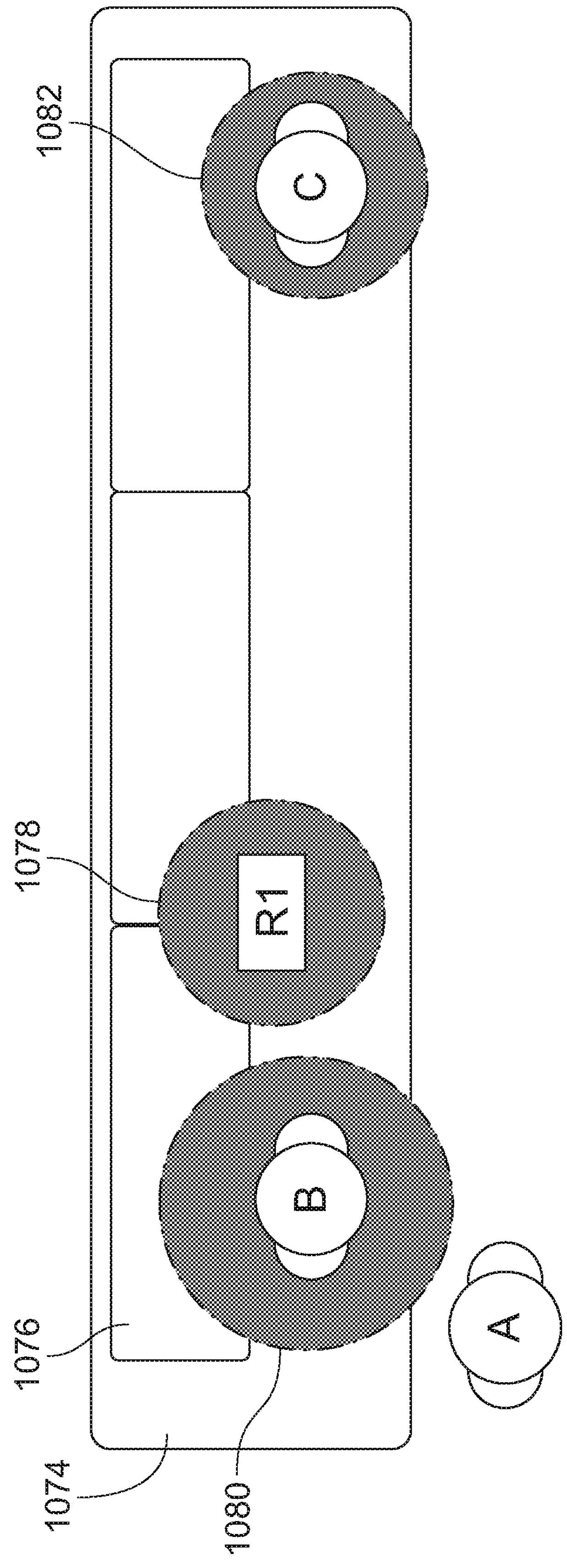
FIG. 10B depicts an illustrative workspace, without a positional envelope of an intruding object overlapping with a safety envelope of a robot, according to some embodiments.
Figure 10C:
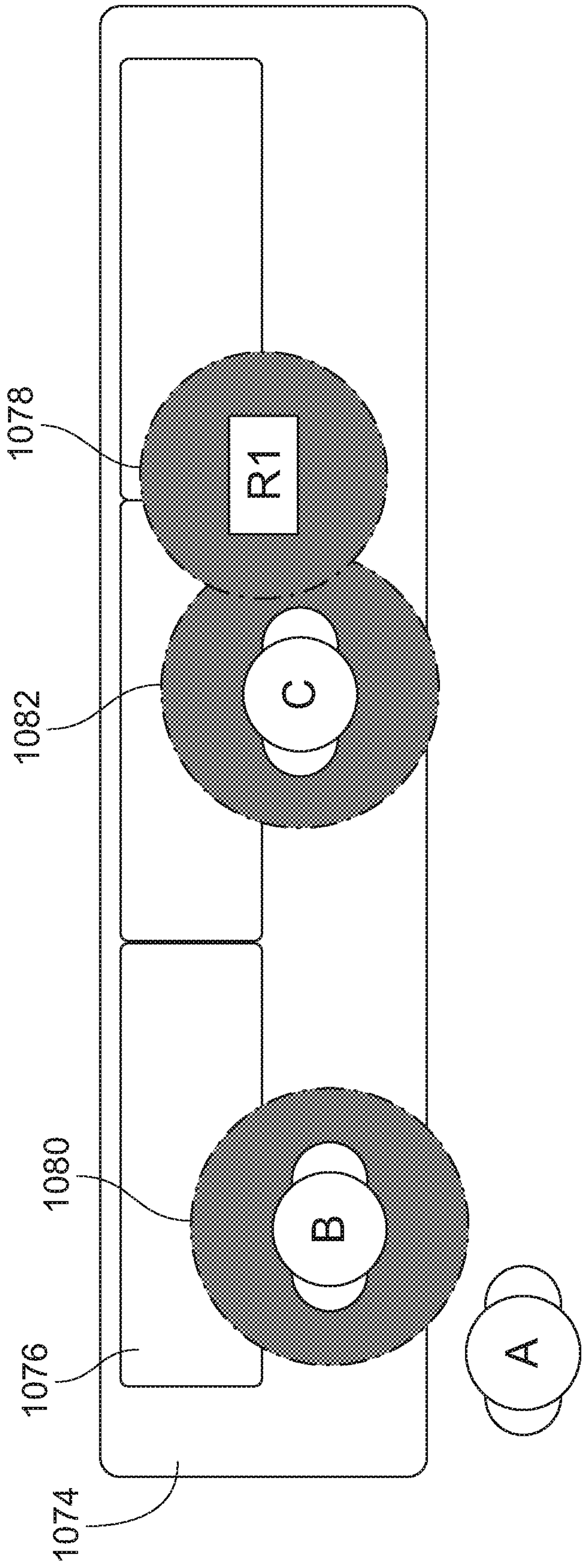
FIG. 10C depicts an illustrative workspace, with a positional envelope of an intruding object overlapping with a safety envelope of a robot, according to some embodiments.

By way of further explanation of certain acts of method 900, an illustrative workspace is depicted in FIGS. 10A-10C. In the example of FIGS. 10A-10C, a workspace 1074 is depicted with a workbench 1076 arranged therein. In the example of FIG. 10A, the robot R1 is present in the workspace 1074 and a user A is situated outside of the workspace 1074. The robot R1 can be assigned to the workspace 1074. For instance, the robot R1 can be attached to a rail 213 in the workspace 1074. No other users, or other intruding objects, are present in the workspace 1074. In the example of FIG. 10A, the method 900 may analyze image data of the depicted workspace and conclude in act 956 that there are no users present in the workspace, and proceed to act 958.

In act 960 of method 900, the system performing method 900 generates an envelope for one or more of the users detected in act 956. An envelope around a user is referred to here as a "positional envelope" to distinguish it from an envelope around the robot R1, which is referred to as a "safety envelope." In general, a positional envelope is an area or volume of space surrounding the user, or other intruding object, identified in the workspace. The envelope may be described by a two-dimensional (2D) area (e.g., stored as a plurality of coordinate positions, an image mask, a boundary, etc.) or as a three-dimensional (3D) volume (e.g., stored as a plurality of voxels, a three-dimensional boundary, etc.). Whether the envelope is described by a 2D area or 3D volume may be based on whether depth information was used in act 956 to identify the user. For instance, when analyzing a depth map in act 956, information generated describing the user's position (or a body part thereof) may be different than when act 956 comprises analyzing a 2D image. As such, information on the user's position at multiple different depths may be determined in act 956 and accessed in act 960 to generate a 3D volumetric envelope for that user.

Generating a positional envelope for a user in act 960 may comprise determining a 2D area by extending outward a fixed distance from the user as depicted by the image data analyzed in act 956. For instance, act 960 may comprise applying an image dilation process to an image mask representing the pixels of a 2D image in which the user was detected to produce a larger image mask arranged around the user. Additionally, or alternatively, generating a positional envelope for a user in act 960 may comprise determining a 3D volume by extending outward a fixed distance from a 3D region determined to contain the user in act 956. For instance, act 960 may comprise scaling and/or extruding a 3D volume in which the user was detected to produce a larger volume arranged around the user.

In some embodiments, the size of the positional envelope is generated (via the above techniques, or otherwise) such that, regardless of the posture subsequently taken by the user in their current position, the user would still be positioned within the positional envelope. In some embodiments, the positional envelope is sized to be, at least, roughly as large as the user's wingspan. In some embodiments, the positional envelope can be sized to accommodate a wingspan of 50%, 75%, 80%, 85%, 90%, or some other percentage of the general population. Such a size may be applied to both 2D and 3D generation methods described above.

In some embodiments, the positional envelope can be centered around the user identified in the workspace. In some embodiments, the positional envelope can be generally positioned around a trunk of the user. For instance, in embodiments where the head, neck, shoulders, torso or other centrally located body part of the user is identified in the imaging data in act 956, the positional envelope can be positioned around the head, neck, shoulders, torso, or other centrally located body part of the user. In some embodiments, the positional envelope can be an area of space surrounding the user and including the user therein. In some embodiments, the positional envelope is fixed in size, but can be moved in the workspace as the user moves. For instance, in some embodiments, as the identified user is tracked in the image data, the positional envelope applied to the user is moved through the workspace along with the user, such that the positional envelope is maintained in a position surrounding the user. In some embodiments, the positional envelope may change shape as the user moves, such as if the user extends their arm. While users are discussed in detail with respect to the method 900, this is merely an example, and the same steps can be taken to generate a positional envelope around any other intruding object identified in the workspace.

In act 962, the system performing method 900 determines a position of one or more robots R1, that are assigned to the workspace, in the workspace. Techniques for determining the position of one or more robots R1 in the workspace by analyzing image data generated by the imaging system and/or from odometry data or other positional data provided by the robot R1 are described above, and any such techniques may be applied in act 962. Image data analyzed in act 962 to determine the position of a robot R1 may be the same, or different, image data analyzed in act 956 to detect the one or more users in the workspace. In some embodiments, a 3D model of a robot R1 may be previously generated or otherwise stored by the system executing method 900 and a location of the robot R1 determined in act 962 by fitting the 3D model to imaging data of the robot R1.

In act 964, the system executing method 900 generates a safety envelope for each robot R1 identified in the workspace in act 962. As with the positional envelope(s) generated in act 960, the safety envelope may be described by a 2D area or as a 3D volume, and may be generated via any of the techniques described above for generating the safety envelope. In cases where a location of the robot R1 is determined in act 962 by fitting a 3D model to imaging data of the robot R1, a positional envelope may be generated in act 964 by extending the 3D model (e.g., through a scaling operation), or may be generated by accessing a 3D volume associated with the 3D model that defines the safety envelope of the robot R1. For instance, for a given robot model the system executing method 900 may obtain a 3D model of the robot R1 along with a 3D model of the safety envelope of the model, and generate the position of the safety envelope in the workspace in act 964 by fitting the 3D model of the robot R1 to the position of the robot R1 indicated by imaging data.

The safety envelope can be an area of space surrounding the robot R1 identified in the workspace. In some embodiments, the safety envelope can be centered around the robot R1 identified in the workspace. In some embodiments, the safety envelope can be generally positioned around a base or cart of the robot R1. In some embodiments, the safety envelope can be generally positioned around a base, cart, or other component of the robot R1 that the robot R1 arm extends from. In some embodiments, the safety envelope can be an area of space surrounding the robot R1 and including the robot R1 therein. In some embodiments, the safety envelope is fixed in size, but can be moved in the workspace as the robot R1 moves. For instance, in some embodiments, as the identified robot R1 is tracked in the workspace, the safety envelope applied to the robot R1 is moved through the workspace along with the robot R1, such that the safety envelope is maintained in a position surrounding the robot R1. In some embodiments, the safety envelope is a set area or boundary surrounding the robot R1. In some embodiments, the size of the safety envelope is set such that, regardless of the posture taken by the robot R1 (and particularly by the robotic arm) in the robot R1's current position, the entire robot R1 would still be positioned within the safety envelope. In some embodiments, the safety envelope is sized to be, at least, roughly as large as the robot R1's "wingspan" (e.g., the maximum extension the robotic arm can take in any direction).

In act 968, the system performing method 900 determines whether any positional envelope generated in act 960 overlaps with the safety envelope of any of the robots R1 detected in the workspace. Act 968 may be performed for each robot R1 detected in act 962 and for which a safety envelope was generated in act 964. For instance, for each robot R1 detected in the workspace, the system performing method 900 may determine whether or not any positional envelopes generated in act 960 overlap with the safety envelope of that robot R1.

If in act 968 it is determined for a given robot R1 that there are no positional envelopes that overlap with the safety envelope of the robot R1, the method 900 proceeds to act 970 in which instructions are generated for the robot R1 to perform a task in a first reduced operation mode. Referring to FIG. 10B as an example, a safety envelope 1078 generated for the robot R1 is depicted, along with a user A detected outside of the workspace 1074, and user B and user C each detected within the workspace 1074. A positional envelope 1080 generated for user B, and a positional envelope 1082 generated for user C, are depicted. Neither the positional envelope 1080 of user B nor the positional envelope 1082 of user C overlaps with the safety envelope 1078 of the robot R1. Therefore, in this illustrative instance the system performing method 900 would proceed from act 968 to act 970.

In act 970, the system performing method 900 generates instructions to perform a task in a first reduced operation mode. For instance, act 970 may generate instructions using any combination of the techniques described above in relation to act 314 described above. The task for which instructions are generated in act 970 may be, for instance, the task the robot R1 is operated to perform in act 316 of the method 300. In the first reduced operation mode, the robot R1's full suite of functionality is not available to the robot R1 to perform the task. For example, instructions may be generated such that the speed and/or acceleration of movements of the robot R1 are limited (e.g., capped) when performing the task.

In some embodiments, in the first reduced operation mode the robot R1 may be restricted from being freely moving within in the workspace. For example, with reference to FIG. 10B, the robot R1 may be restricted to not move in a manner that would cause its safety envelope 1078 to overlap with the positional envelope 1080 of user B or the positional envelope 1082 of the user C. Therefore, in the example of FIG. 10B, the robot R1 can move a comparatively smaller distance to its left than to its right to perform the task, but in neither case can it move such a distance that its safety envelope 1078 overlaps with the positional envelope 1080 of user B or the positional envelope 1082 of the user C. The system performing method 900 may take such restrictions into account when generating instructions in act 970.

In some embodiments, in the first reduced operation mode the robot R1 may be restricted from moving at its maximum speed to perform the task. Such a restriction may include the robot R1 base being limited to move at a reduced speed in the workspace (for instance on the rail 213) and/or an arm of the robot R1 being operated at a reduced speed in the workspace. Merely as examples, the top speed the robot R1 can be actuated at in the first reduced operation mode can be 75%, 50%, or 25% of its maximum available speed in the full operation mode. It should be appreciated that the robot R1 need not operate at the top speed available to it in the first reduced operation mode. For instance, to increase precision of the robot R1, the robot R1 may perform a task at a further reduced speed than the top available speed in the first reduced operation mode. In the first reduced operation mode, the robot R1's full suite of functionality is not available to the robot.

If in act 968 it is determined for a given robot R1 that there are positional envelopes that overlap with the safety envelope of the robot R1, the method 900 proceeds to act 972 in which instructions are generated for the robot R1 to perform a task in a second reduced operation mode. As one example, FIG. 10C depicts the workspace 1074 with the safety envelope 1078 generated for the robot R1, the user A detected outside the workspace 1074, and users B and C detected within the workspace. The positional envelopes 1080 and 1082 generated for users B and C, respectively are also depicted. In the example of FIG. 10C, the positional envelope 1082 of user C overlaps with the safety envelope 1078 of the robot R1. Therefore, in this illustrative instance the system performing method 900 would proceed from act 968 to act 972.

In act 972, the system performing method 900 generates instructions to perform a task in a second reduced operation mode. For instance, act 972 may generate instructions using any combination of the techniques described above in relation to act 314 described above. The task for which instructions are generated in act 972 may be, for instance, the task the robot R1 is operated to perform in act 316 of the method 300. In the second reduced operation mode, the robot R1's full suite of functionality is not available to the robot R1 to perform the task. For example, instructions may be generated such that the speed and/or acceleration of movements of the robot R1 are limited (e.g., capped) when performing the task. In embodiments in which the first reduced operation mode and second reduced operation mode both limit the speed and/or acceleration of the robot R1, the second reduced operation mode may limit the speed and/or acceleration to a greater extent than the first reduced operation mode.

In some embodiments, the robot R1's operation is paused when operating in the second reduced operation mode. Therefore, in the second reduced operation mode, the robot R1 cannot move in the workspace. This can include the robot R1 base or cart not being able to move in the workspace (for instance on the rail 213) and the arm of the robot R1 not being able to move in the workspace. In some embodiments, the robot R1 is instructed to remain in the second reduced operation mode until the safety envelope of the robot R1 no longer overlaps with a positional envelope of a user in the workspace. In the example of FIG. 10C, the robot R1 may be instructed to remain in the second reduced operation mode until the positional envelope 1082 of the user C no longer overlaps with the safety envelope 1078 of the robot R1 (and assuming that neither the User B nor the User A have moved such that a positional envelope of the users is overlapping with the safety envelope 1078 of the robot R1). It should be appreciated that when the positional envelope 1082 of the user C overlaps with the safety envelope 1078 of the robot R1, the user C can be, but need not be, contacting the robot R1. Moreover, when the positional envelope 1082 of the user C overlaps with the safety envelope 1078 of the robot R1, the user C can be, but need not be, within the safety envelope 1078 of the robot R1.

Figure 11:
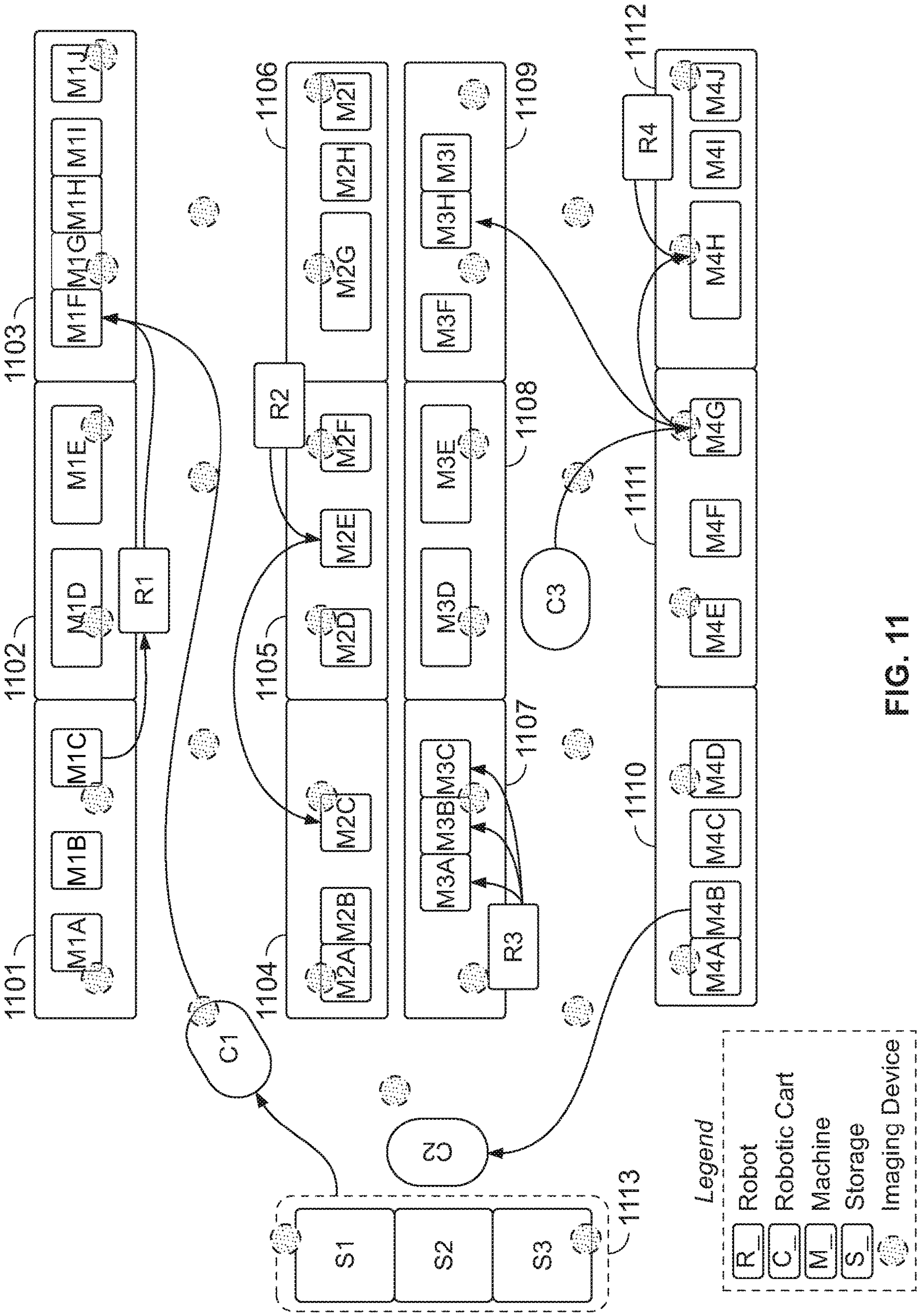
FIG. 11 depicts an illustrative automated laboratory, according to some embodiments.

If there are multiple robots R1 assigned to and in the workspace, each robot R1 need not operate in the same operation mode. For example, if a safety envelope of a first robot R1 overlaps with a positional envelope of a user in the workspace at a first time, the first robot R1 may be instructed to operate in the second reduced operation mode (e.g., pause operation). Simultaneously, if a safety envelope of a second robot R1 does not overlap with a positional envelope of a user in the workspace at the first time, the second robot R1 may be instructed to operate in the first reduced operation mode As described above, according to some embodiments a system to control an automated laboratory may be configured according to the techniques for operating robots to perform tasks based on image data. FIG. 11 depicts an example of such a laboratory, for purposes of illustration. In the example of FIG. 11, workspaces 1101-1110 are arranged in a laboratory, with machines arranged in workspaces 1101-1112 and storage locations S1, S2 and S3 arranged in workspace 1113. Any number of other non-machine components may also be arranged in the workspaces, though are omitted from FIG. 11 for clarity. The three storage locations S1, S2 and S3 may be accessed by robotic carts C1, C2 and C3 to obtain components (e.g., reagents, pipettes) and/or to dispose of components (e.g., sharps), or other objects. In the example of FIG. 11, a number of imaging devices are arranged in the space, which are all or mostly arranged above the depicted space looking down (e.g., as in the example of FIG. 1), and are shown in FIG. 11 using shaded dotted circles.

Figure 18:
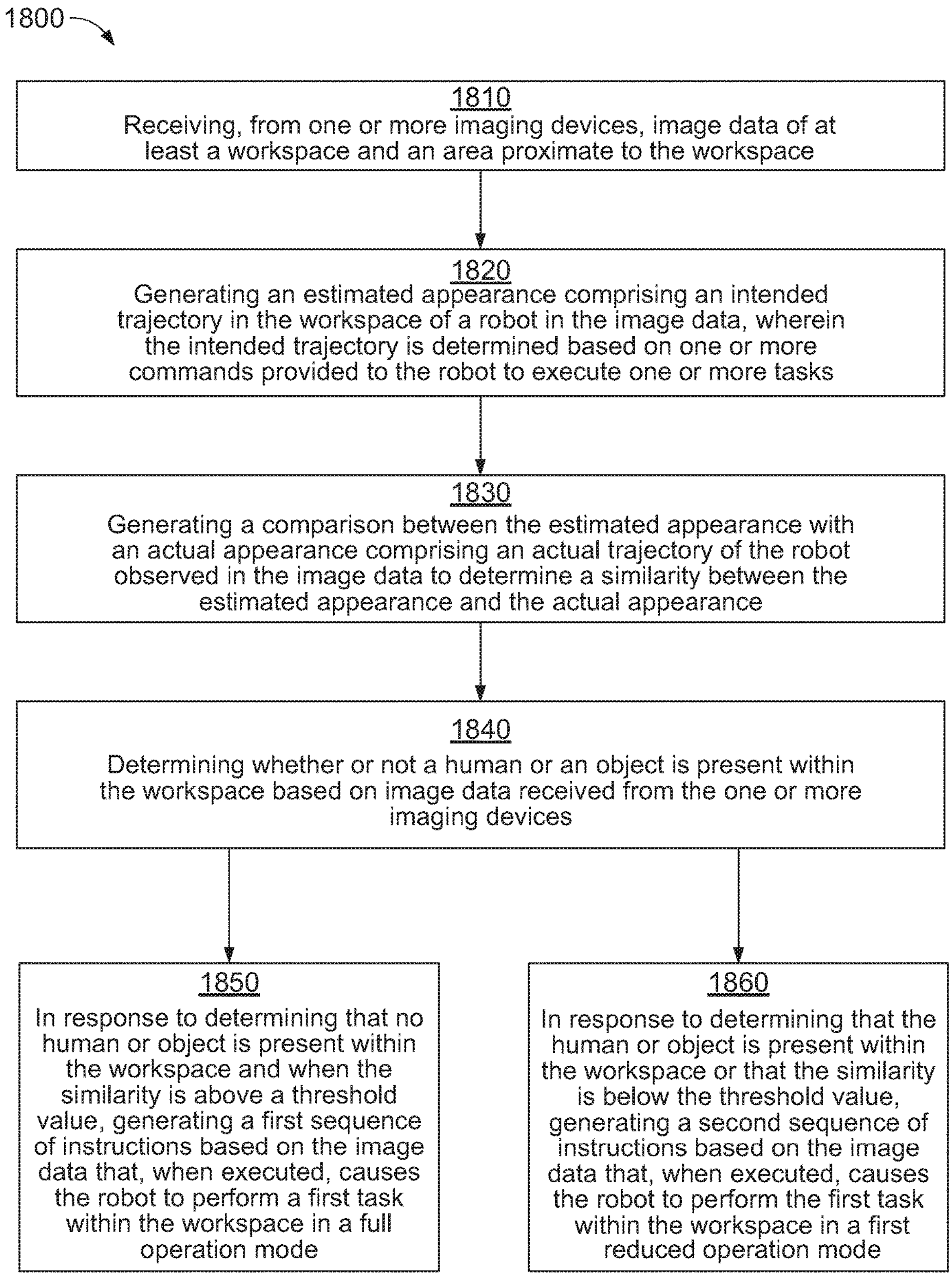
FIG. 18 is a flowchart of a method of generating instructions for a robot to operate in one or more operation modes when performing a task, according to some embodiments.

In reference to FIG. 18, at step 1810, method 1800 comprises receiving, from one or more imaging devices, image data of at least a workspace and an area proximate to the workspace. At step 1820, method 1800 comprises generating an estimated appearance comprising an intended trajectory in the workspace of a robot in the image data, wherein the intended trajectory is determined based on one or more commands provided to the robot to execute one or more tasks. At step 1830, method 1800 comprises generating a comparison between the estimated appearance with an actual appearance comprising an actual trajectory of the robot observed in the image data to determine a similarity between the estimated appearance and the actual appearance. At step 1840, method 1800 comprises determining whether or not a human or an object is present within the workspace based on image data received from the one or more imaging devices. At step 1850, method 1800 comprises in response to determining that no human or object is present within the workspace and when the similarity is above a threshold value, generating a first sequence of instructions based on the image data that, when executed, causes the robot to perform a first task within the workspace in a full operation mode. At step 1860, method 1800 comprises in response to determining that the human or object is present within the workspace or that the similarity is below the threshold value, generating a second sequence of instructions based on the image data that, when executed, causes the robot to perform the first task within the workspace in a first reduced operation mode.

In the example of FIG. 11, some illustrative operations are depicted, which may be performed by a system that receives image data from the imaging devices and controls the robots R1, R2, R3, R4 and robotic carts C1, C2 and C3 to perform tasks. As described above, such a system may control robots to perform tasks within a workspace, to perform transfers between a cart and a workspace, etc. In the example of FIG. 11, the system controlling the depicted automated laboratory is controlling cart C1 to transfer material from storage S1 (e.g., cold storage) while also controlling robot R1 to move a master mix from a centrifuge MIC to an incubator MIF, where the master mix will be combined with the vector for further processing. In addition, the system is controlling cart C2 to move a finished experiment from M4B to storage S2; controlling robot R3 to prepare three parallel experiments on machines M3A, M3B and M3B; and controlling robot R4 to transfer material to M4H, then upon completion transfer that material to the next step in a process at M4G. Finally, in the example of FIG. 11 the system is controlling cart C3 to transfer material from machine M4G to a machine M3H in a different workspace. In this case, the combined workspaces 1110, 1111 and 1112 don't comprise every machine required for the experiment, but workspace 1109 includes available machine M3H. The example of FIG. 11 demonstrates how the techniques described herein are generally more modular, and thereby more flexible, than other approaches that are designed for a single workflow.

Figure 12:
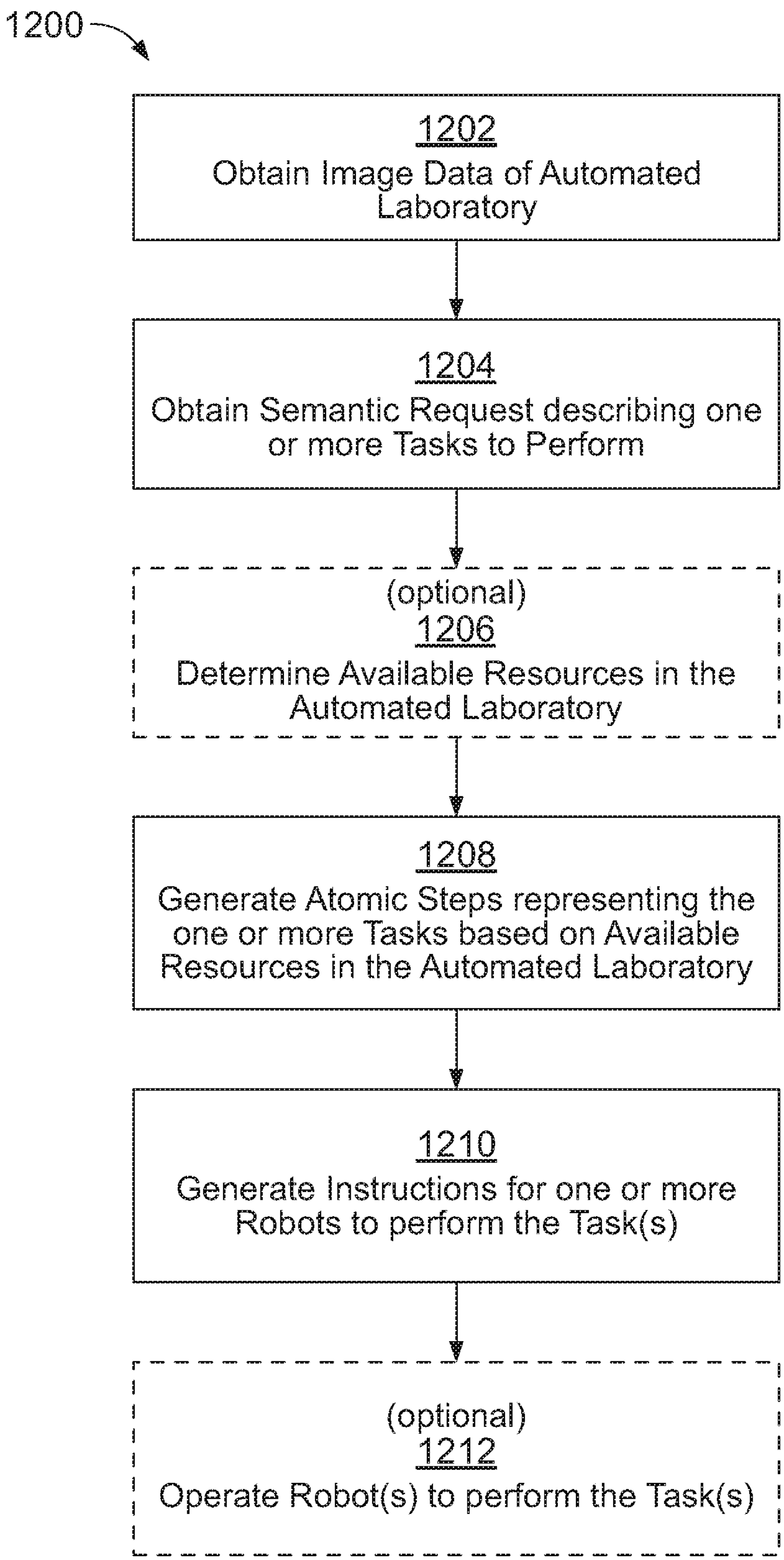
FIG. 12 is a flowchart of a method of generating instructions for one or more robots to perform one or more tasks within an automated laboratory, according to some embodiments.

FIG. 12 is a flowchart of a method of generating instructions for one or more robots to perform one or more tasks within an automated laboratory, according to some embodiments. Method 1200 may be performed by a system comprising one or more processors that performs the acts of the method through any combination of software and/or hardware. In the example of FIG. 12, the system performing method 1200 is communicatively coupled to a plurality of imaging devices arranged to view regions of a laboratory, one or more robots that are arranged to perform tasks in the laboratory, and data describing resources available to the laboratory, which may indicate the availability of, for instance, one or more robots, one or more components (e.g., machines, disposables, etc.) and/or materials in storage. For instance, method 1200 may be performed by system 400 or system 500 shown in FIGS. 4 and 5, respectively, and described above.

In act 1202, image data of a workspace is obtained by the system performing method 1200. Act 1202 may comprise operating one or more imaging devices to generate image data, receiving image data from one or more imaging devices, and/or accessing stored image data previously produced by one or more imaging devices. In the example of FIG. 12, the image data obtained in act 1202 depicts regions of an automated laboratory, such as the illustrative laboratory shown in FIG. 11. For example, the imaging devices depicted in FIG. 11 may each generate image data, which is obtained by (or generated by) the system performing method 1200. In some embodiments, the image data in act 1202 is generated by a plurality of imaging devices arranged in multiple different locations around a laboratory.

In act 1204, a semantic request describing one or more tasks to be performed is obtained by the system performing method 1200. As described above, instructions to perform one or more tasks (e.g., in a workspace and/or in an automated laboratory) may be provided as natural language (NL) input. A system may translate that NL input into a structured task list (an example of which is depicted in FIG. 8), also referred to herein as a semantic request, or a collection of semantic tasks. The semantic request may comprise a list of tasks that are understood by the system, and which can be used to generate instructions to control one or more robots to perform said tasks. Act 1204 may comprise obtaining such a semantic request (e.g., semantic request 820).

In some embodiments, method 1200 may also comprise generating the semantic request from natural language input (e.g., input 810). To generate the semantic request, the system performing method 1200 may provide the natural language input to an LLM trained on, or otherwise having access to, a library of tasks. For instance, an LLM trained on the tasks available to an automated laboratory may interpret the natural language input 810 and produce the semantic request 820. Examples of such LLMs, and ways to configure them to perform the techniques described herein, are provided above.

Optionally, in act 1206, the system performing method 1200 may determine resources available to perform the semantic request obtained in act 1204. In some embodiments, act 1206 comprises obtaining data from one or more sensors, including but not limited to image sensors, to determine available resources. For example, a liquid level sensor and/or weight sensor may produce data indicative of an amount of resource (e.g., a liquid reagent or disposable components such as pipettes, respectively), which may be obtained by the system in act 1206 and a measure of the associated resource generated based on such data. According to some embodiments, a resource may include: a robot (including a robotic arm or a robotic cart), a component (examples of which are given above), a storage location (e.g., a trash container) and/or other objects. In some embodiments, an indication of a resource's availability may indicate whether the resource is currently available for use, when the resource will become available for use, or otherwise indicate when the resource will, and/or will not, be available. Additionally, or alternatively, an indication of a resource's availability may indicate a location of the resource (e.g., based on image data obtained by the system), such as a coordinate location and/or a workspace in which the resource is located.

In act 1208, the system performing method 1200 generates one or more atomic steps representing the one or more tasks of the semantic request obtained in act 1204. Act 1208 may comprise providing the semantic request to an LLM trained on, or otherwise having access to, information describing, for each robot of a plurality of robots in the automated laboratory, tasks that the robot can be controlled to perform. The LLM may be different, or the same as, an LLM that optionally generates the semantic request in method 1200 as described above. The LLM operated in act 1208 may be trained to generate the one or more atomic steps based on the semantic request and on data indicating the resources available to the system performing method 1200. As described above, in some cases, a system may evaluate different sets of atomic steps for a given semantic task and select one set of atomic steps expected to be the most efficient of the different sets of atomic steps. For instance, the atomic steps 830 in the example of FIG. 8 may be generated in act 1208 by an LLM based on semantic request 820 and based on the data indicating the resources available to the system performing method 1200. In some embodiments, act 1208 comprises accessing previously generated data indicating the resources available to the system (e.g., data, updated in real-time, indicating the state of each resource in the system).

Figure 13A:
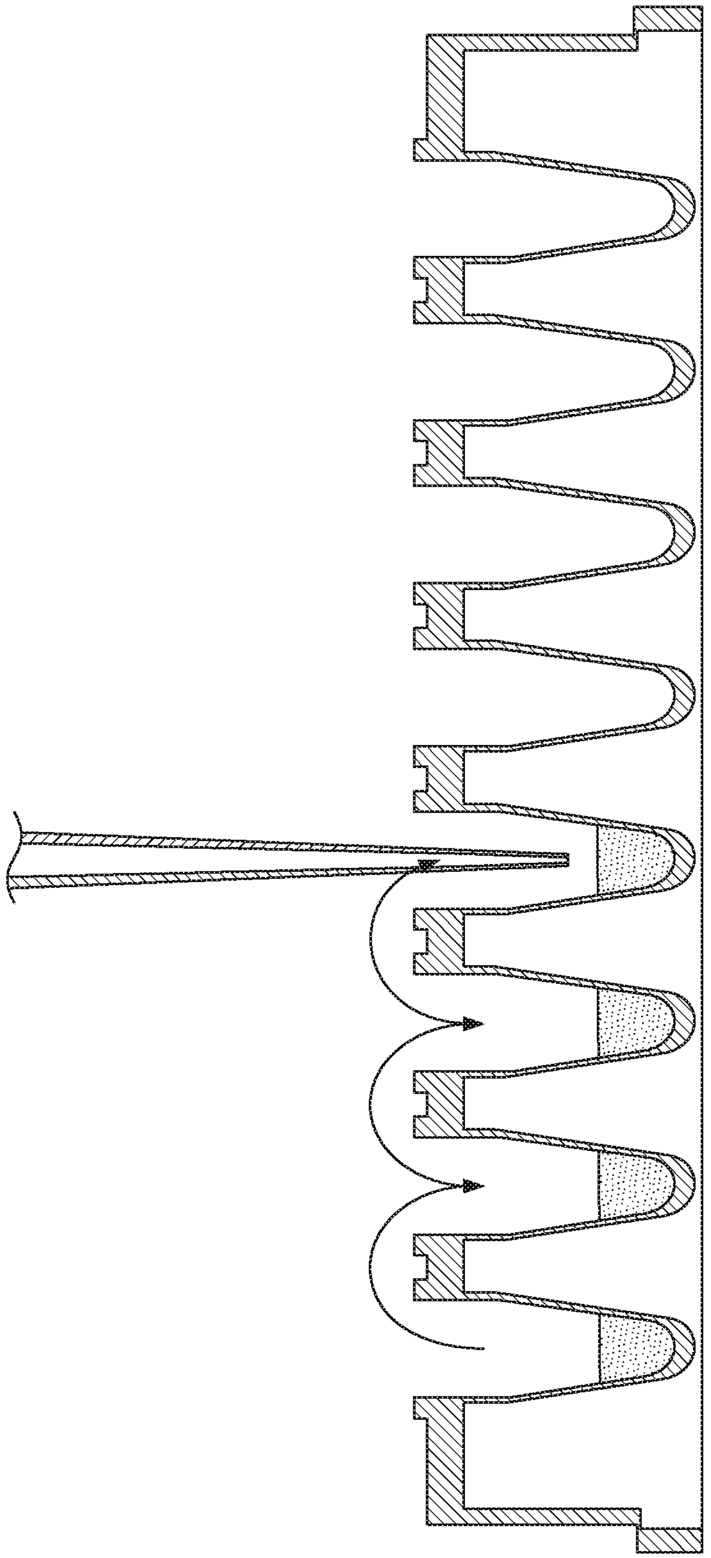
FIGS. 13A and 13B depict two ways to generate atomic tasks for the same semantic task, according to some embodiments.
Figure 13B:
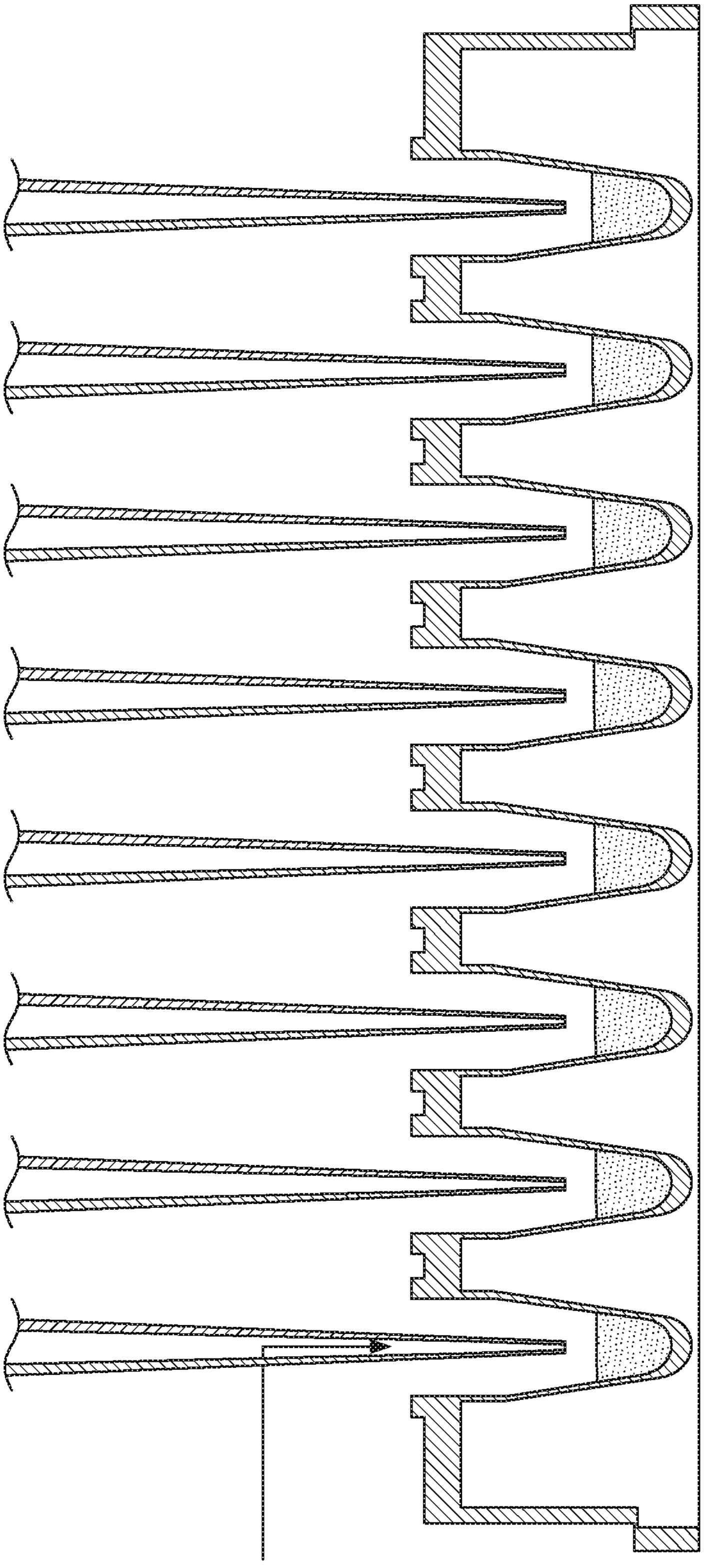

As one example of generating one or more atomic tasks representing the one or more tasks of a semantic request, FIGS. 13A and 13B depict different ways to meet the same semantic request (or a task thereof), according to some embodiments. In the example of FIGS. 13A and 13B, a semantic request comprises a task of filling eight wells. In some cases, a single channel dispenser may be available, in which case the atomic steps generated for this task may comprise dispensing with the single channel dispenser eight times, as depicted in FIG. 13A. In other cases, an eight-channel dispenser may be available, in which case the atomic steps generated for this task may comprise dispensing once with the eight-channel dispenser, as depicted in FIG. 13B. In act 1208, either such atomic steps may be generated for the same semantic request (or task thereof) based on data indicating which type(s) of dispensers are available for that task, and in some cases also based on other information such as their location.

In act 1210, the system performing method 1200 generates instructions that, when executed by one or more robots, will control the robot(s) to perform the one or more tasks represented by the atomic steps generated in act 1208. The instructions may be based on the image data obtained in act 1202 (e.g., to instruct a robot to interact with a component, the location of the component may be identified from image data as described above).

In some embodiments, act 1210 comprises converting the atomic steps generated in act 1208 into standardized, machine-executable commands. In some embodiments, acts 1208 and 1210 may be combined into a single act in which the semantic request obtained in act 1204 is provided to an LLM which generates the instructions that that, when executed by one or more robots, will control the robot(s) to perform one or more tasks that are representative of atomic steps, based on the data indicating the resources available to the system performing method 1200.

Optionally in method 1200, the system performing method 1200 may operate a robot to perform a task for which instructions were generated in act 1212. Operating the robot in act 1212 may comprise sending the instructions generated in act 1210 to the robot and/or directly controlling the robot to execute the instructions generated in act 1210.

As described above, in some cases operating an automated laboratory may comprise maneuvered (e.g., driven) between workspaces to transport components or other objects from one workspace to another, or from a storage location to a workspace (or vice versa). Such operations may comprise transferring a component or other object from the cart to a workspace or storage location, or vice versa.

Figure 14:
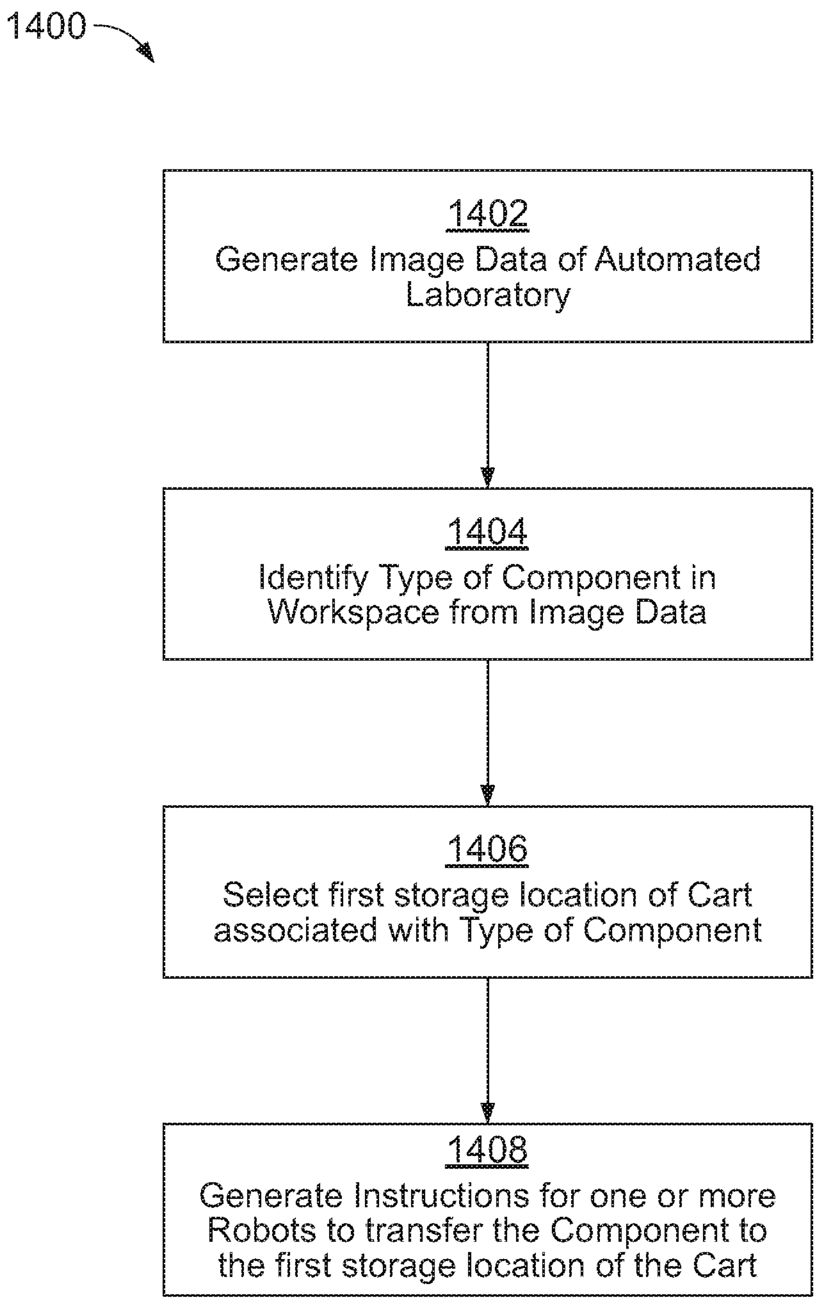
FIG. 14 is a flowchart of a method of generating instructions for one or more robots to perform one or more tasks within an automated laboratory, according to some embodiments.

FIG. 14 is a flowchart of a method of generating instructions for one or more robots to perform one or more tasks within an automated laboratory, according to some embodiments. Method 1400 may be performed by a system comprising one or more processors that performs the acts of the method through any combination of software and/or hardware. In the example of FIG. 14, the system performing method 1400 is communicatively coupled to a plurality of imaging devices arranged to view regions of a laboratory, and one or more robots that are arranged to perform tasks in the laboratory, including at least one robotic cart. For instance, method 1400 may be performed by system 400 or system 500 shown in FIGS. 4 and 5, respectively, and described above.

In act 1402, image data of a workspace is obtained by the system performing method 1400. Act 1402 may comprise operating one or more imaging devices to generate image data, receiving image data from one or more imaging devices, and/or accessing stored image data previously produced by one or more imaging devices. In the example of FIG. 14, the image data obtained in act 1402 depicts at least a robotic cart in addition to a region of the laboratory that is the source location or destination location of a component to be moved to or from the cart, respectively. In some embodiments, the image data in act 1402 is generated by a plurality of imaging devices arranged in multiple different locations around a laboratory.

In act 1404, the system executing method 1400 identifies at least one component in a workspace based on the image data obtained in act 1402. Any number of components may be identified in this act, and identifying a component may be performed based on a single image, on multiple images or frames, and/or from depth information. Techniques for identifying a component from image data are described above in relation to act 306 of method 300, and any such techniques may be applied in act 1404.

In act 1406, the system executing method 1400 selects a storage location in a robotic cart associated with the type of component identified in act 1404. In act 1406, the system may access data describing, for various types of components, associated storage locations on a robotic cart, thereby allowing the system to control one or more robots to move the component to a desired part of the cart. For example, it may be desirable that some components are arranged within another structure in the cart, such as a test tube in a test tube rack, a vial in a tray, tips in a sharps container, liquid waste in a waste container or into a vacuum bottle, a cryovial or biological matter in a refrigerator, etc. The system executing method 1400 may identify such a location in or on the robotic cart by accessing data that indicates, for the type of component identified, which target location is appropriate.

In act 1408, the system performing method 1400 generates instructions that, when executed by one or more robots, will control the robot(s) to transfer the component to the first storage location selected in act 1406. The one or more robots for which such instructions may be generated in act 1408 include a robotic arm within, or proximate to, a workspace, and/or a robotic arm mounted to the cart. In cases where the instructions will, when executed, cause multiple robots to be operated to transfer the component, the robots may work in concert to allow the component to be properly arranged in the storage location. For example, one robot may open and close a refrigerator door, and a second robot moves the component into the refrigerator while the door is open.

According to some embodiments, the instructions may be generated in act 1408 based on the image data obtained in act 1402. For example, to instruct a robot to interact with a component, the location of the component may be identified from image data as described above. In some embodiments, the location of the storage location on the cart may be identified from image data so that a robot can be controlled to move the component to the storage location, even if the storage location has moved to an arbitrary location (e.g., a test tube rack may not need to be attached to the cart to receive a test tube from a workspace). In some embodiments, the position of the cart may be determined based on image data (e.g., by looking for known features, such as fiducial markers) and the instructions generated in act 1408 based on the determined position of the cart.

In some embodiments, the instructions may be generated in act 1408 based on data describing a position of a storage location in or on the cart. For example, the data may indicate a coordinate position of the storage location relative to a known feature on the cart (e.g., a fiducial marker), and the system executing method 1400 may generate the instructions in act 1408 based on this data.

According to some embodiments, a component may be transferred from a cart to a workspace in a similar manner to that of method 1400, except without necessarily identifying a storage location in the workspace based on a type of the component being transferred. In some cases, for example, a component may be moved to an open area in the workspace identified by image data. In some embodiments, the component may be moved to a drop zone in the workspace (which may be identified based on image data, or otherwise).

Figure 15:
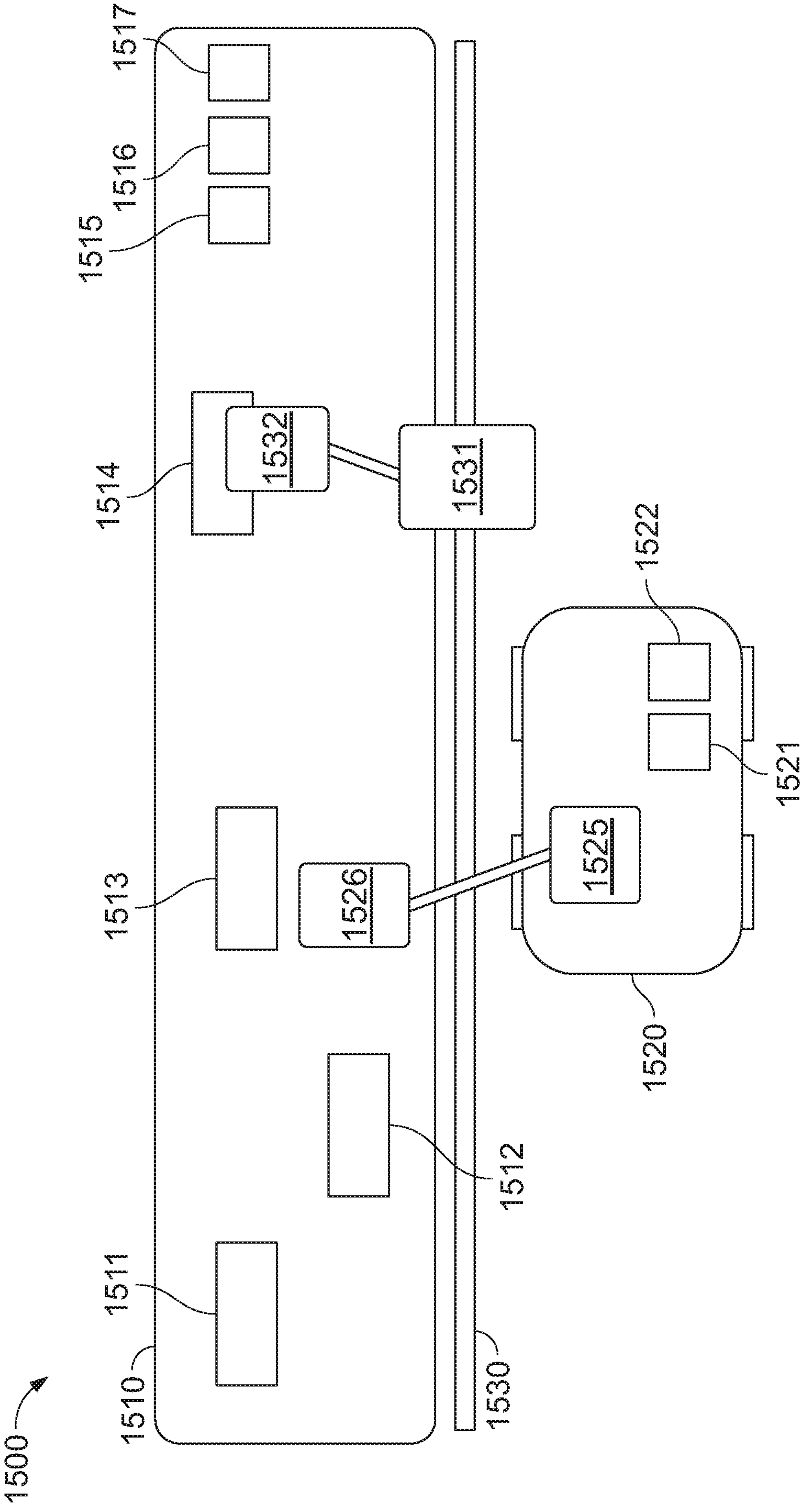
FIG. 15 depicts an illustrative automated laboratory that may be operated to transfer components to or from a robotic cart, according to some embodiments.

According to some embodiments, method 1400 may comprise various acts of logging An illustrative transfer operation is depicted in FIG. 15, according to some embodiments. In the example of FIG. 15, a laboratory 1500 comprises a workspace 1510 (which in this example is a workbench surface), and a cart 1520. Components 1511-1517 are arranged in the workspace, and components 1521 and 1522 arranged on the cart 1520. A first robot 1525 is coupled to the cart and comprises end effector 1526. A second robot 1531 is coupled to rail 1530 and comprises end effector 1532.

In operation, the robot 1525 may be controlled to, for example, transfer the component 1521 from the cart to an open location in the workspace. Similarly, when performing method 1400 with respect to the example of FIG. 15, the robot 1525 may be controlled to move the component 1513 from the workspace to the cart.

Figure 16:
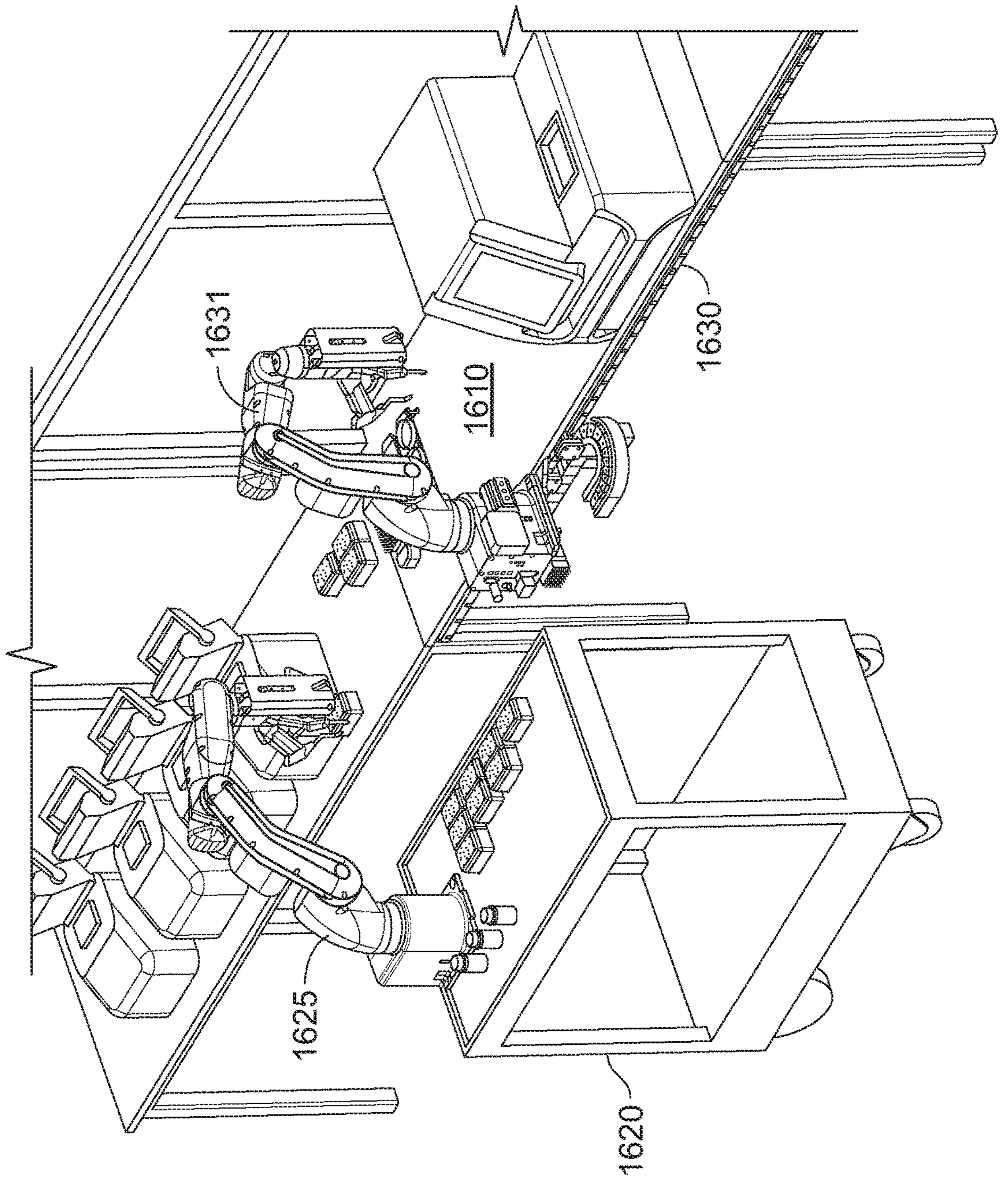
FIG. 16 depicts a three-dimensional view of a robotic cart and workspace of an automated laboratory, according to some embodiments.

For further illustration, FIG. 16 depicts a three-dimensional view of a robotic cart 1620 comprising a robot 1625. A workspace 1610 is arranged with a robot 1631 on a rail 1630.

Figure 17:
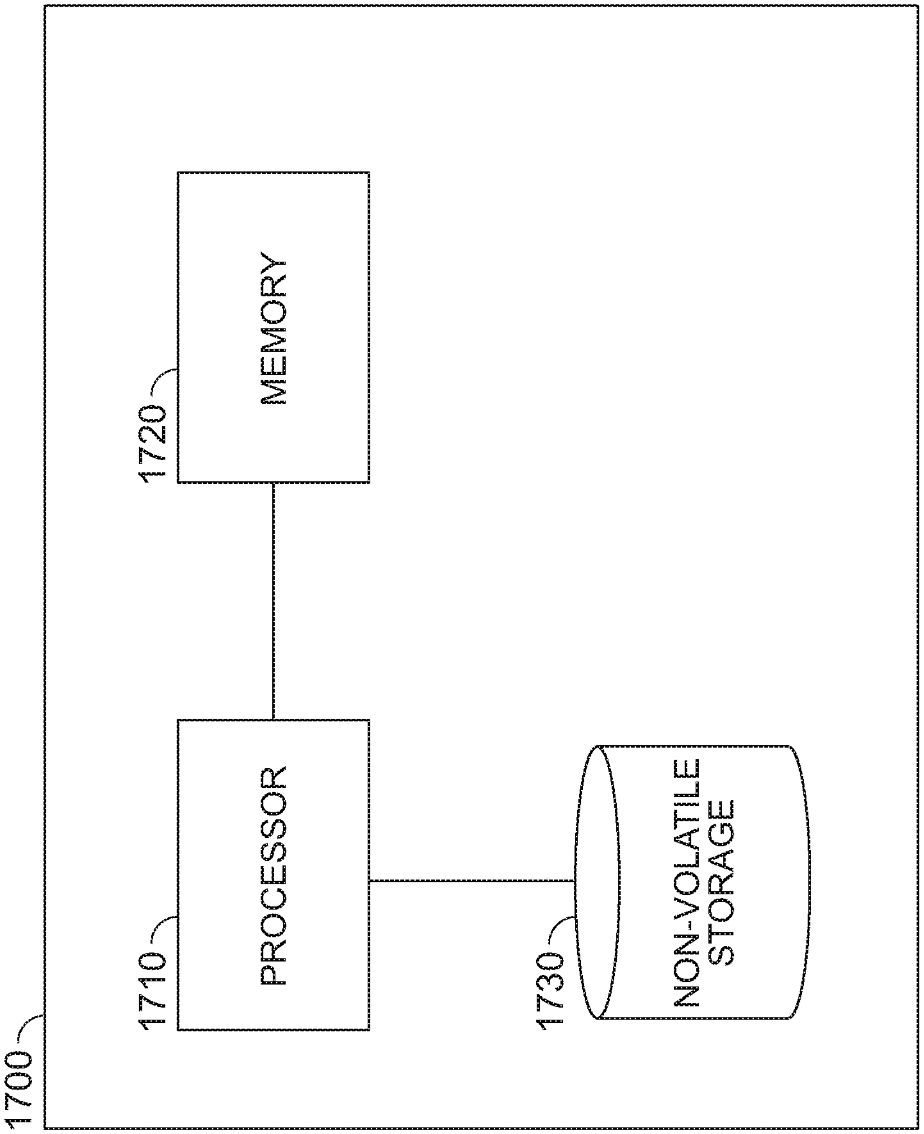
FIG. 17 illustrates an example of a computing system environment on which aspects of the technology may be implemented

An illustrative implementation of a computer system 1700 that may be used to perform any of the techniques described above is shown in FIG. 17. The computer system 1700 may include one or more processors 1710 and one or more non-transitory computer-readable storage media (e.g., memory 1720 and one or more non-volatile storage media 1730). The processor 1710 may control writing data to and reading data from the memory 1720 and the one or more non-volatile storage media 1730 in any suitable manner, as the aspects of the invention described herein are not limited in this respect. To perform functionality and/or techniques described herein, the processor 1710 may execute one or more instructions stored in one or more computer-readable storage media (e.g., the memory 1720, storage media, etc.), which may serve as non-transitory computer-readable storage media storing instructions for execution by the processor 1710.

In connection with techniques described herein, code used to, for example, recognize components based on image data, generate instructions to control a robot to perform a task, etc. may be stored on one or more computer-readable storage media of computer system 1700. Processor 1710 may execute any such code to perform any of the above-described techniques as described herein. Any other software, programs or instructions described herein may also be stored and executed by computer system 1700. It will be appreciated that computer code may be applied to any aspects of methods and techniques described herein. For example, computer code may be applied to receive image data, transmit instructions to a robot, etc. through conventional operating system processes.

The various methods or processes outlined herein may be coded as software that is executable on one or more processors that employ any one of a variety of operating systems or platforms. Additionally, such software may be written using any of numerous suitable programming languages and/or programming or scripting tools, and also may be compiled as executable machine language code or intermediate code that is executed on a virtual machine or a suitable framework.

In this respect, various inventive concepts may be embodied as at least one non-transitory computer readable storage medium (e.g., a computer memory, one or more floppy discs, compact discs, optical discs, magnetic tapes, flash memories, circuit configurations in Field Programmable Gate Arrays or other semiconductor devices, etc.) encoded with one or more programs that, when executed on one or more computers or other processors, implement the various embodiments of the present invention. The non-transitory computer-readable medium or media may be transportable, such that the program or programs stored thereon may be loaded onto any computer resource to implement various aspects of the present invention as discussed above.

The terms "program," "software," and/or "application" are used herein in a generic sense to refer to any type of computer code or set of computer-executable instructions that can be employed to program a computer or other processor to implement various aspects of embodiments as discussed above. Additionally, it should be appreciated that according to one aspect, one or more computer programs that when executed perform methods of the present invention need not reside on a single computer or processor, but may be distributed in a modular fashion among different computers or processors to implement various aspects of the present invention.

Computer-executable instructions may be in many forms, such as program modules, executed by one or more computers or other devices. Generally, program modules include routines, programs, objects, components, data structures, etc. that perform particular tasks or implement particular abstract data types. Typically, the functionality of the program modules may be combined or distributed as desired in various embodiments.

Also, data structures may be stored in non-transitory computer-readable storage media in any suitable form. Data structures may have fields that are related through location in the data structure. Such relationships may likewise be achieved by assigning storage for the fields with locations in a non-transitory computer-readable medium that convey relationship between the fields. However, any suitable mechanism may be used to establish relationships among information in fields of a data structure, including through the use of pointers, tags or other mechanisms that establish relationships among data elements.

Having thus described several aspects of at least one embodiment of this disclosure, it is to be appreciated that various alterations, modifications, and improvements will readily occur to those skilled in the art. For instance, aspects of the techniques described herein may be combined in any of the following ways:

Aspect 1. A method comprising: by at least one processor: determining, based on image data depicting a workspace, that a first component arranged in the workspace is a first type of component; identifying one or more tasks associated with the first type of component; displaying at least part of the image data in a graphical user interface; receiving user input, via the graphical user interface, indicative of a first task of the one or more tasks associated with the first type of component; and generating a sequence of instructions based on the image data that, when executed by a robot, performs the first task.

Aspect 2. The method of aspect 1, further comprising operating the robot to perform the first task by executing the sequence of instructions.

Aspect 3. The method of any of aspects 1-2, further comprising obtaining, based on the image data, geometric data that describes a three-dimensional shape of the first type of component.

Aspect 4. The method of any of aspects 1-3, wherein the sequence of instructions are configured to perform the first task at least in part by moving an end effector of the robot to a first location on the first component, wherein the first location is identified by the geometric data.

Aspect 5. The method of any of aspects 1-4, wherein the first component is a well plate, wherein the first location is a first well on the well plate, and wherein the first task is transporting a liquid from the first well to a second location.

Aspect 6. The method of any of aspects 1-5, further comprising identifying one or more physical properties associated with the first type of component, and wherein generating the sequence of instructions is further based on the one or more physical properties.

Aspect 7. The method of any of aspects 1-6, wherein the image data comprises multiple images of the workspace each produced by one of a plurality of imaging devices, and wherein the method further comprises generating a panoramic image of the workspace from the multiple images of the workspace.

Aspect 8. The method of any of aspects 1-7, wherein the image data comprises depth information, and wherein generating the sequence of instructions is further based on the depth information.

Aspect 9. The method of any of aspects 1-8, wherein determining that the first component is a first type of component comprises providing at least a portion of the image data to a single shot detection model.

Aspect 10. The method of any of aspects 1-9, wherein displaying at least part of the image data in a graphical user interface comprises displaying the first component with a visual indicator of a shape of the first component.

Aspect 11. The method of any of aspects 1-10, wherein the image data comprises a plurality of images depicting the workspace at different times, and wherein the method further comprises predicting a future trajectory of the robot based on the plurality of images.

Aspect 12. A system comprising: one or more imaging devices arranged above a workspace and configured to produce image data of the workspace; a display device; a user input device; a robot; and at least one processor configured to: determine, based on the image data produced by the one or more imaging devices, that a first component depicted in the image data is a first type of component; identify one or more tasks associated with the first type of component; display, via the display device, at least part of the image data; receive, via the user input device, input indicative of a first task of the one or more tasks associated with the first type of component; and control the robot, based on the image data, to perform the first task.

Aspect 13. The system of aspect 12, controlling the robot to perform the first task comprises generating a sequence of instructions and providing the sequence of instructions to the robot.

Aspect 14. The system of any of aspects 12-13, wherein the at least one processor is further configured to obtain, based on the image data, geometric data that describes a three-dimensional shape of the first type of component.

Aspect 15. The system of any of aspects 12-14, wherein controlling the robot to perform the first task comprises moving an end effector of the robot to a first location on the first component, wherein the first location is identified by the geometric data.

Aspect 16. The system of any of aspects 12-15, wherein the at least one processor is further configured to identify one or more physical properties associated with the first type of component, and wherein controlling the robot to perform the first task is further based on the one or more physical properties.

Aspect 17. The system of any of aspects 12-16, comprising a plurality of imaging devices, and wherein the image data comprises multiple images of the workspace each produced by one of the plurality of imaging devices, and wherein the at least one processor is further configured to generate a panoramic image of the workspace from the multiple images of the workspace.

Aspect 18. The system of any of aspects 12-17, wherein the image data comprises depth information, and wherein controlling the robot to perform the first task is further based on the depth information.

Aspect 19. The system of any of aspects 12-18, wherein determining that the first component is a first type of component comprises providing at least a portion of the image data to a single shot detection model.

Aspect 20. The system of any of aspects 12-19, wherein displaying at least part of the image data in a graphical user interface comprises displaying the first component with a visual indicator of a shape of the first component.

Aspect 21. The system of any of aspects 12-20, wherein the image data comprises a plurality of images depicting the workspace at different times, and wherein the at least one processor is further configured to predict a future trajectory of the robot based on the plurality of images.

Aspect 22. A system comprising: one or more imaging devices arranged to produce image data of at least a workspace and an area proximate to the workspace; a robot arranged at least partially within the workspace; and at least one processor configured to: determine whether or not a human is present within the workspace based on the image data produced by the one or more imaging devices; when it is determined that no human is present within the workspace, control the robot, based on the image data, in a full operation mode; and when it is determined that the human is present within the workspace, control the robot, based on the image data, in a first reduced operation mode.

Aspect 23. The system of aspect 22, wherein the first reduced operation mode limits a location, a speed and/or an acceleration of at least part of the robot.

Aspect 24. The system of any of aspects 22-23, wherein the at least one processor is further configured to: generate a positional envelope for the human based on the image data; and determine whether or not the human is present within the workspace by determining whether or not the positional envelope intersects the workspace.

Aspect 25. The system of any of aspects 22-24, wherein the at least one processor is further configured to: generate a safety envelope for the robot based on the image data; determine whether or not the safety envelope intersects with the positional envelope; and when it is determined that the safety envelope intersects with the positional envelope, control the robot, based on the image data, in a second reduced operation mode.

Aspect 26. The system of any of aspects 22-25, wherein the second reduced operation mode inhibits at least part of the robot from moving.

Aspect 27. The system of any of aspects 22-26, wherein generating the safety envelope for the robot is based at least in part on the image data produced by the one or more imaging devices.

Aspect 28. The system of any of aspects 22-27, wherein the first reduced operation mode limits a position of a base of the robot such that the safety envelope does not intersect with the positional envelope.

Aspect 29. The system of any of aspects 22-28, wherein the at least one processor is further configured to: determine, based on the image data, that a first component depicted in the image data is a first type of component; identify at least a first task associated with the first type of component; when it is determined that no human is present within the workspace, control the robot, based on the image data, to perform the first task in the full operation mode; and when it is determined that the human is present within the workspace, control the robot, based on the image data, to perform the first task in the first reduced operation mode.

Aspect 30. A method comprising: by at least one processor: determining whether or not a human is present within a workspace based on image data depicting at least a workspace and an area proximate to the workspace; in response to determining that no human is present within the workspace, generating a first sequence of instructions based on the image data that, when executed by a robot, performs a first task within the workspace in a full operation mode; and in response to determining that the human is present within the workspace, generating a second sequence of instructions based on the image data that, when executed by the robot, performs the first task within the workspace in a first reduced operation mode.

Aspect 31. The method of aspect 30, wherein the first reduced operation mode limits a location, a speed and/or an acceleration of at least part of the robot.

Aspect 32. The method of any of aspects 30-31, further comprising: generating a positional envelope for the human based on the image data; and determining whether or not the human is present within the workspace by determining whether or not the positional envelope intersects the workspace.

Aspect 33. The method of any of aspects 30-32, further comprising: generating a safety envelope for the robot based on the image data; determining whether or not the safety envelope intersects with the positional envelope; and when it is determined that the safety envelope intersects with the positional envelope, generating a third sequence of instructions based on the image data that, when executed by the robot, performs the first task within the workspace in a second reduced operation mode.

Aspect 34. The method of any of aspects 30-33, wherein the second reduced operation mode inhibits at least part of the robot from moving.

Aspect 35. The method of any of aspects 30-34, wherein generating the safety envelope for the robot is based at least in part on the image data.

Aspect 36. The method of any of aspects 30-35, wherein the first reduced operation mode limits a position of a base of the robot such that the safety envelope does not intersect with the positional envelope.

Aspect 37. The method of any of aspects 30-36, further comprising:

determining, based on the image data, that a first component depicted in the image data is a first type of component; and identifying the first task based on the first type of component.

Aspect 38. A method comprising: by at least one processor: generating image data depicting at least part of an automated laboratory using a plurality of imaging devices; obtaining a semantic request describing one or more tasks to be performed within the automated laboratory; and generating, based at least in part on the image data and information indicating available resources within the automated laboratory, a plurality of instructions that, when executed by one or more robots, causes the one or more robots to perform the one or more tasks.

Aspect 39. The method of aspect 38, further comprising: generating a plurality of atomic steps representing the one or more tasks, based on the semantic request and the information indicating the available resources; and generating the plurality of instructions based on the plurality of atomic steps and the image data.

Aspect 40. The method of any of aspects 38-39, wherein generating the plurality of instructions comprises providing the semantic request to a large language model (LLM) trained on, or otherwise having access to, information describing, for each robot of a plurality of robots in the automated laboratory, tasks that the robot can be controlled to perform.

Aspect 41. The method of any of aspects 38-40, further comprising: generating at least a first plurality of atomic steps representing the one or more tasks and a second plurality of atomic steps representing the one or more tasks, different from the first plurality of atomic steps; selecting the first plurality of atomic steps based at least in part on a measure of efficiency of performing the first plurality of atomic steps and a measure of efficiency of performing the second plurality of atomic steps; and generating the plurality of instructions based on the first plurality of atomic steps and the image data.

Aspect 42. The method of any of aspects 38-41, wherein obtaining the semantic request comprises: receiving a natural language input; and generating the semantic request based on the natural language input.

Aspect 43. The method of any of aspects 38-42, wherein generating the semantic request based on the natural language input comprises providing the natural language input to a large language model (LLM) trained on, or otherwise having access to, a library of tasks for the automated laboratory.

Aspect 44. The method of any of aspects 38-43, further comprising generating the information indicating the available resources within the automated laboratory based at least in part on the image data.

Aspect 45. The method of any of aspects 38-44, wherein the plurality of instructions, when executed by the one or more robots, causes a robotic cart to be maneuvered within the automated laboratory.

Aspect 46. The method of any of aspects 38-45, wherein the plurality of instructions, when executed by the one or more robots cause a first robot to transfer a first component from a first cart to a first workspace.

Aspect 47. The method of any of aspects 38-46, wherein the plurality of instructions, when executed by the one or more robots further cause a log entry to be generated indicative of the transfer of the first component, the log entry comprising a unique identifier associated with the first workspace, a unique identifier associated with the first component, and a unique identifier associated with the first cart.

Aspect 48. The method of any of aspects 38-47, wherein the first robot is arranged on the first cart.

Aspect 49. The method of any of aspects 38-48, wherein the first robot is arranged on a rail within, or proximate to, the first workspace.

Aspect 50. The method of any of aspects 38-49, wherein generating the plurality of instructions that, when executed by the one or more robots, causes the one or more robots to perform the one or more tasks is further based on data indicating a position of at least one robot of the one or more robots received from the at least one robot.

Aspect 51. A system comprising: a plurality of imaging devices each arranged to produce image data depicting respective parts of an automated laboratory comprising a plurality of workspaces; a plurality of robots; and at least one processor configured to: obtain a semantic request describing one or more tasks to be performed within the automated laboratory; and control one or more robots of the plurality of robots to perform the one or more tasks based at least in part on the image data produced by the plurality of imaging devices and information indicating available resources within the automated laboratory.

Aspect 52. The system of aspect 51, wherein the plurality of robots comprises one or more robotic carts.

Aspect 53. The system of any of aspects 51-52, wherein controlling the one or more robots to perform the one or more tasks comprises controlling a first robotic cart of the one or more robotic carts to carry a first component to a first workspace of the plurality of workspaces.

Aspect 54. The system of any of aspects 51-53, wherein controlling the one or more robots to perform the one or more tasks comprises controlling a first robot of the one or more robots to transfer a first component from a first robotic cart of the one or more robotic carts to a first workspace.

Aspect 55. The system of any of aspects 51-54, wherein the at least one processor is further configured to cause a log entry to be generated indicative of the transfer of the first component, the log entry comprising a unique identifier associated with the first workspace, a unique identifier associated with the first component, and a unique identifier associated with the first robotic cart.

Aspect 56. The system of any of aspects 51-55, wherein the first robot is arranged on the first robotic cart.

Aspect 57. The system of any of aspects 51-56, wherein the first robot is arranged on a rail within, or proximate to, the first workspace.

Aspect 58. The system of any of aspects 51-57, wherein the at least one processor is further configured to: generate a plurality of atomic steps representing the one or more tasks, based on the semantic request and the information indicating the available resources; and control the one or more robots to perform the one or more tasks based on the plurality of atomic steps and the image data.

Aspect 59. The system of any of aspects 51-58, wherein the at least one processor is further configured to provide the semantic request to a large language model (LLM) trained on, or otherwise having access to, information describing tasks that each of the plurality of robots can be controlled to perform.

Aspect 60. The system of any of aspects 51-59, wherein the at least one processor is further configured to: generate at least a first plurality of atomic steps representing the one or more tasks and a second plurality of atomic steps representing the one or more tasks, different from the first plurality of atomic steps; select the first plurality of atomic steps based at least in part on a measure of efficiency of performing the first plurality of atomic steps and a measure of efficiency of performing the second plurality of atomic steps; and control the one or more robots to perform the one or more tasks based on the first plurality of atomic steps and the image data.

Aspect 61. The system of any of aspects 51-60, wherein the at least one processor is configured to obtain the semantic request by: receiving a natural language input; and generating the semantic request based on the natural language input.

Aspect 62. The system of any of aspects 51-61, wherein generating the semantic request based on the natural language input comprises providing the natural language input to a large language model (LLM) trained on, or otherwise having access to, a library of tasks for the automated laboratory.

Aspect 63. The system of any of aspects 51-62, wherein the at least one processor is further configured to generate the information indicating the available resources within the automated laboratory based at least in part on the image data.

Aspect 64. The system of any of aspects 51-63, wherein controlling the one or more robots to perform the one or more tasks is further based on data indicating a position of a first robot of the one or more robots received from the first robot.

Aspect 65. A method comprising: by at least one processor: determining that a first component arranged in a workspace is a first type of component based on image data depicting at least the workspace and a cart comprising a plurality of storage locations; selecting a first storage location associated with the first type of component from the plurality of storage locations on the cart; and generating a sequence of instructions based on the image data that, when executed by a robot, causes the robot to move at least part of the first component from the workspace to the first storage location on the cart.

Aspect 66. The method of aspect 65, further comprising determining, based on the image data, a position of the first storage location on the cart, and wherein generating the sequence of instructions is based at least in part on the position of the first storage location on the cart.

Aspect 67. The method of any of aspects 65-66, wherein the cart is a robotic cart, and wherein the method further comprises generating a second sequence of instructions that, when executed by the robotic cart, maneuvers the robotic cart away from the workspace while carrying the at least part of the first component.

Aspect 68. The method of any of aspects 65-67, wherein the first storage location is a refrigerated storage location, and wherein the sequence of instructions, when executed by the robot, further causes the robot to insert the at least part of the first component into the refrigerated storage location.

Aspect 69. The method of any of aspects 65-68, wherein the robot is a first robot, wherein the sequence of instructions is a first sequence of instructions, wherein the cart comprises a second robot, and wherein the method comprises generating a second sequence of instructions that, when executed by the second robot, causes the second robot to: open a door of the refrigerated storage location prior to the first robot inserting the at least part of the first component into the refrigerated storage location; and close the door of the refrigerated storage location subsequent to the first robot inserting the at least part of the first component into the refrigerated storage location.

Aspect 70. The method of any of aspects 65-69, further comprising identifying, based on the image data, the plurality of storage locations on the cart.

Aspect 71. The method of any of aspects 65-70, further comprising obtaining information describing the plurality of storage locations on the cart based on a unique identifier associated with the cart.

Aspect 72. The method of any of aspects 65-71, wherein the first storage location is a vial receptacle, a waste receptacle, a bottle, or a slot.

Aspect 73. The method of any of aspects 65-72, further comprising: displaying at least part of the image data in a graphical user interface; and receiving user input, via the graphical user interface, indicating that the at least part of the first component should be transferred from the workspace to the first storage location on the cart.

Aspect 74. The method of any of aspects 65-73, wherein the sequence of instructions, when executed by the robot, causes the robot move the first component from a workbench to the first storage location.

Aspect 75. A method comprising: by at least one processor: generating a first sequence of instructions that, when executed by a robotic cart, maneuvers the robotic cart to a workspace while carrying a first component; selecting a destination location within the workspace associated with a component type of the first component; and generating, based on image data at least in part depicting the workspace and the robotic cart, a second sequence of instructions that, when executed by a robot, causes the robot to move the first component from the robotic cart to the destination location within the workspace.

Aspect 76. The method of aspect 75, further comprising identifying a location of the first component on the robotic cart based on the image data.

Aspect 77. The method of any of aspects 75-76, wherein the destination location is a vial receptacle, a refrigerator, or a location on a countertop.

Aspect 78. The method of any of aspects 75-77, wherein the first component is a bottle or a tray of pipette tips.

Aspect 79. The method of any of aspects 75-78, wherein the robotic cart carries the first component in a refrigerated storage location, and wherein the second sequence of instructions, when executed by the robot, further cause the robot to remove the first component from the refrigerated storage location.

Aspect 80. The method of any of aspects 75-79, wherein the robot is a first robot, wherein the robotic cart comprises a second robot, and wherein the method further comprises generating a third sequence of instructions that, when executed by the second robot, cause the second robot to: open a door of the refrigerated storage location prior to the first robot removing the first component from the refrigerated storage location; and close the door of the refrigerated storage location subsequent to the first robot removing the first component from the refrigerated storage location.

Aspect 81. A system comprising: one or more imaging devices arranged to produce image data of at least a workspace and an area proximate to the workspace; a first robot; a robotic cart comprising a plurality of storage locations; and at least one processor configured to: determine, based on the image data produced by the one or more imaging devices, that a first component depicted in the image data within the workspace is a first type of component; select a first storage location associated with the first type of component from the plurality of storage locations on the robotic cart; and control the first robot, based on the image data, to move at least part of the first component from the workspace to the first storage location on the robotic cart.

Aspect 82. A system comprising: one or more imaging devices arranged to produce image data of at least a workspace and an area proximate to the workspace; a first robot; a robotic cart comprising a plurality of storage locations; and at least one processor configured to: maneuver the robotic cart to the workspace while carrying a first component; selecting, based on the image data at least in part depicting the workspace and the robotic cart, a destination location within the workspace associated with a component type of the first component; and generating a second sequence of instructions based on the image data that, when executed by a robot, causes the robot to move the first component from the robotic cart to the destination location within the workspace.

Such alterations, modifications, and improvements are intended to be part of this disclosure, and are intended to be within the spirit and scope of the invention. Further, though advantages of the present invention are indicated, it should be appreciated that not every embodiment of the technology described herein will include every described advantage. Some embodiments may not implement any features described as advantageous herein and in some instances one or more of the described features may be implemented to achieve further embodiments. Accordingly, the foregoing description and drawings are by way of example only.

Aspects of the above-described embodiments of the technology described herein can be implemented in any of numerous ways. For example, the embodiments may be implemented using hardware, software or a combination thereof. When implemented in software, the software code can be executed on any suitable processor or collection of processors, whether provided in a single computer or distributed among multiple computers. Such processors may be implemented as integrated circuits, with one or more processors in an integrated circuit component, including commercially available integrated circuit components known in the art by names such as CPU chips, GPU chips, microprocessor, microcontroller, or co-processor. Alternatively, a processor may be implemented in custom circuitry, such as an ASIC, or semi-custom circuitry resulting from configuring a programmable logic device. As yet a further alternative, a processor may be a portion of a larger circuit or semiconductor device, whether commercially available, semi-custom or custom. As a specific example, some commercially available microprocessors have multiple cores such that one or a subset of those cores may constitute a processor. Though, a processor may be implemented using circuitry in any suitable format.

The above-described techniques may be embodied as a computer readable storage medium (or multiple computer readable media) (e.g., a computer memory, one or more floppy discs, compact discs (CD), optical discs, digital video disks (DVD), magnetic tapes, flash memories, circuit configurations in Field Programmable Gate Arrays or other semiconductor devices, or other tangible computer storage medium) encoded with one or more programs that, when executed on one or more computers or other processors, perform methods that implement the various embodiments of the invention discussed above. As is apparent from the foregoing examples, a computer readable storage medium may retain information for a sufficient time to provide computer-executable instructions in a non-transitory form. Such a computer readable storage medium or media can be transportable, such that the program or programs stored thereon can be loaded onto one or more different computers or other processors to implement various aspects of the present invention as discussed above. As used herein, the term "computer-readable storage medium" encompasses only a non-transitory computer-readable medium that can be considered to be a manufacture (i.e., article of manufacture) or a machine. Alternatively or additionally, the invention may be embodied as a computer readable medium other than a computer-readable storage medium, such as a propagating signal.

Various aspects of the present invention may be used alone, in combination, or in a variety of arrangements not specifically described in the embodiments described in the foregoing and is therefore not limited in its application to the details and arrangement of components set forth in the foregoing description or illustrated in the drawings. For example, aspects described in one embodiment may be combined in any manner with aspects described in other embodiments.

Also, the invention may be embodied as a method, of which an example has been provided. The acts performed as part of the method may be ordered in any suitable way. Accordingly, embodiments may be constructed in which acts are performed in an order different than illustrated, which may include performing some acts simultaneously, even though shown as sequential acts in illustrative embodiments.

Further, some actions are described as taken by a "user." It should be appreciated that a "user" need not be a single individual, and that in some embodiments, actions attributable to a "user" may be performed by a team of individuals and/or an individual in combination with computer-assisted tools or other mechanisms.

Use of ordinal terms such as "first," "second," "third," etc., in the claims to modify a claim element does not by itself connote any priority, precedence, or order of one claim element over another or the temporal order in which acts of a method are performed, but are used merely as labels to distinguish one claim element having a certain name from another element having a same name (but for use of the ordinal term) to distinguish the claim elements.

Also, the phraseology and terminology used herein is for the purpose of description and should not be regarded as limiting. The use of "including," "comprising," or "having," "containing," "involving," and variations thereof herein, is meant to encompass the items listed thereafter and equivalents thereof as well as additional items.

What is claimed is:

1. A method comprising:

by at least one processor:

receiving, from one or more imaging devices, image data of at least a workspace and an area proximate to the workspace;

generating an estimated appearance comprising an intended trajectory in the workspace of a robot in the image data, wherein the intended trajectory is determined based on one or more commands provided to the robot to execute one or more tasks;

generating a comparison between the estimated appearance with an actual appearance comprising an actual trajectory of the robot observed in the image data to determine a similarity between the estimated appearance and the actual appearance;

determining whether or not a human or an object is present within the workspace based on image data received from the one or more imaging devices;

in response to determining that no human or object is present within the workspace and when the similarity is above a threshold value, generating a first sequence of instructions based on the image data that, when executed, causes the robot to perform a first task within the workspace in a full operation mode; and in response to determining that the human or object is present within the workspace or that the similarity is below the threshold value, generating a second sequence of instructions based on the image data that, when executed, causes the robot to perform the first task within the workspace in a first reduced operation mode.

2. The method of claim 1, wherein the first reduced operation mode limits at least one of a location, a speed or an acceleration of at least part of the robot.

3. The method of claim 1, further comprising:

generating a positional envelope for the human or object based on the image data; and determining whether or not the human or object is present within the workspace by determining whether or not the positional envelope intersects the workspace.

4. The method of claim 3, further comprising:

generating a safety envelope for the robot based on the image data;

determining whether or not the safety envelope intersects with the positional envelope; and when it is determined that the safety envelope intersects with the positional envelope, generating a third sequence of instructions based on the image data that, when executed, causes the robot to perform the first task within the workspace in a second reduced operation mode.

5. The method of claim 4, wherein the second reduced operation mode inhibits at least part of the robot from moving.

6. The method of claim 4, wherein generating the safety envelope for the robot is based at least in part on the image data.

7. The method of claim 4, wherein the first reduced operation mode limits a position of a base of the robot such that the safety envelope does not intersect with the positional envelope.

8. The method of claim 1, further comprising:

determining, based on the image data, that a first component depicted in the image data is a first type of component; and identifying the first task based on the first type of component.

9. At least one computer-readable storage medium comprising instructions that, when executed by at least one processor, perform a method comprising:

receiving, from one or more imaging devices, image data of at least a workspace and an area proximate to the workspace;

generating an estimated appearance comprising an intended trajectory in the workspace of a robot in the image data, wherein the intended trajectory is determined based on one or more commands provided to the robot to execute one or more tasks;

comparing the estimated appearance with an actual appearance comprising an actual trajectory of the robot observed in the image data to determine a similarity between the estimated appearance and the actual appearance;

determining whether or not a human or an object is present within the workspace based on the image data received from the one or more imaging devices;

in response to determining that no human or object is present within the workspace and when the similarity is above a threshold value, generating a first sequence of instructions based on the image data that, when executed, causes the robot to perform a first task within the workspace in a full operation mode; and in response to determining that the human or object is present within the workspace or that the similarity is below the threshold value, generating a second sequence of instructions based on the image data that, when executed, causes the robot to perform the first task within the workspace in a first reduced operation mode.

10. The at least one computer-readable storage medium of claim 9, wherein the first reduced operation mode limits at least one of a location, a speed or an acceleration of at least part of the robot.

11. The at least one computer-readable storage medium of claim 9, further comprising:

generating a positional envelope for the human or object based on the image data; and determining whether or not the human or object is present within the workspace by determining whether or not the positional envelope intersects the workspace.

12. The at least one computer-readable storage medium of claim 11, further comprising:

generating a safety envelope for the robot based on the image data;

determining whether or not the safety envelope intersects with the positional envelope; and when it is determined that the safety envelope intersects with the positional envelope, generating a third sequence of instructions based on the image data that, when executed, causes the robot to perform the first task within the workspace in a second reduced operation mode.

13. The at least one computer-readable storage medium of claim 12, wherein the second reduced operation mode inhibits at least part of the robot from moving.

14. The at least one computer-readable storage medium of claim 12, wherein generating the safety envelope for the robot is based at least in part on the image data.

15. The at least one computer-readable storage medium of claim 12, wherein the first reduced operation mode limits a position of a base of the robot such that the safety envelope does not intersect with the positional envelope.

16. The at least one computer-readable storage medium of claim 9, further comprising:

determining, based on the image data, that a first component depicted in the image data is a first type of component; and identifying the first task based on the first type of component.

17. A system comprising:

one or more imaging devices arranged to capture image data of a workspace;

a robot arranged to move in the workspace; and at least one processor configured to receive image data from the one or more imaging devices and to:

generate an actual appearance observed in the image data, the actual appearance comprising an actual trajectory of the robot;

generate an estimated appearance comprising an intended trajectory of the robot as expected to appear in the image data, wherein the intended trajectory is estimated based on one or more commands provided to the robot to execute one or more tasks;

compare the estimated appearance and the actual appearance;

determine a similarity between the intended trajectory and the actual trajectory;

determine whether or not a human or an object is present within the workspace;

when it is determined that no human or object is present within the workspace and when the similarity is above a threshold value, control the robot in a full operation mode; and when it is determined that the human or object is present within the workspace or that the similarity is below the threshold value, control the robot in a reduced operation mode.

18. A system comprising:

one or more imaging devices arranged to capture image data of at least a workspace and an area proximate to the workspace;

a robot arranged at least partially within the workspace; and at least one processor configured to:

generate an estimated appearance comprising an intended trajectory of the robot in the image data, wherein the intended trajectory is determined based on one or more commands provided to the robot to execute one or more tasks;

compare the estimated appearance with an actual appearance comprising an actual trajectory of the robot observed in the image data to determine a similarity between the estimated appearance and the actual appearance;

determine whether or not a human or an object is present within the workspace based on the image data received from the one or more imaging devices;

when it is determined that no human or object is present within the workspace and when the similarity is above a threshold value, control the robot, based on the image data, in a full operation mode; and when it is determined that the human or object is present within the workspace or that the similarity is below the threshold value, control the robot, based on the image data, in a first reduced operation mode.

19. The system of claim 18, wherein the first reduced operation mode limits at least one of a location, a speed or an acceleration of at least part of the robot.

20. The system of claim 18, wherein the at least one processor is further configured to:

generate a positional envelope for the human or object based on the image data; and determine whether or not the human or object is present within the workspace by determining whether or not the positional envelope intersects the workspace.

21. The system of claim 20, wherein the at least one processor is further configured to:

generate a safety envelope for the robot based on the image data;

determine whether or not the safety envelope intersects with the positional envelope; and when it is determined that the safety envelope intersects with the positional envelope, control the robot, based on the image data, in a second reduced operation mode.

22. The system of claim 21, wherein the second reduced operation mode inhibits at least part of the robot from moving.

23. The system of claim 21, wherein generating the safety envelope for the robot is based at least in part on the image data produced by the one or more imaging devices.

24. The system of claim 21, wherein the first reduced operation mode limits a position of a base of the robot such that the safety envelope does not intersect with the positional envelope.

25. The system of claim 18, wherein the at least one processor is further configured to:

determine, based on the image data, that a first component depicted in the image data is a first type of component;

identify at least a first task associated with the first type of component;

when it is determined that no human or object is present within the workspace, control the robot, based on the image data, to perform the first task in the full operation mode; and when it is determined that the human or object is present within the workspace, control the robot, based on the image data, to perform the first task in the first reduced operation mode.

26. The system of claim 18, wherein the at least one processor is further configured to generate a safety envelope for the robot based on the image data, wherein the safety envelope comprises an image mask.

27. The system of claim 26, wherein the at least one processor is further configured to move the safety envelope through the workspace.

* * * * *